United States Patent
Klebanoff et al.

(10) Patent No.: US 12,492,237 B2
(45) Date of Patent: Dec. 9, 2025

(54) T CELL RECEPTORS TARGETING PIK3CA MUTATIONS AND USES THEREOF

(71) Applicant: MEMORIAL SLOAN-KETTERING CANCER CENTER, New York, NY (US)

(72) Inventors: Christopher A. Klebanoff, New York, NY (US); Smita S. Chandran, Long Island City, NY (US)

(73) Assignee: MEMORIAL SLOAN-KETTERING CANCER CENTER, New York, NY (US)

( * ) Notice: Subject to any disclaimer, the term of this patent is extended or adjusted under 35 U.S.C. 154(b) by 1027 days.

(21) Appl. No.: 17/555,007

(22) Filed: Dec. 17, 2021

(65) Prior Publication Data
US 2022/0110976 A1    Apr. 14, 2022

Related U.S. Application Data

(63) Continuation of application No. PCT/US2020/038592, filed on Jun. 19, 2020.

(60) Provisional application No. 62/864,148, filed on Jun. 20, 2019.

(51) Int. Cl.
| | |
|---|---|
| C07K 14/725 | (2006.01) |
| A61K 40/11 | (2025.01) |
| A61K 40/32 | (2025.01) |
| A61K 40/42 | (2025.01) |
| C07K 16/40 | (2006.01) |
| A61K 38/00 | (2006.01) |

(52) U.S. Cl.
CPC .......... *C07K 14/7051* (2013.01); *A61K 40/11* (2025.01); *A61K 40/32* (2025.01); *A61K 40/4251* (2025.01); *C07K 16/40* (2013.01); *A61K 38/00* (2013.01); *C07K 2317/565* (2013.01)

(58) Field of Classification Search
CPC ................ C07K 14/7051; C07K 16/40; C07K 2317/565; C07K 2317/34; C07K 2317/70; A61K 40/11; A61K 40/32; A61K 40/4251; A61K 38/00; C12N 9/1205; C12Y 207/01153; C12Y 207/11001; C12Y 207/01137; A61P 35/00
See application file for complete search history.

(56) References Cited

U.S. PATENT DOCUMENTS

| | | |
|---|---|---|
| 5,399,346 A | 3/1995 | Anderson et al. |
| 2018/0153975 A1 | 6/2018 | Fritsch et al. |

FOREIGN PATENT DOCUMENTS

| | | |
|---|---|---|
| CN | 102174576 A | 9/2011 |
| JP | 2017-524372 A | 8/2017 |
| WO | WO 2008/016356 A2 | 2/2008 |
| WO | WO 2008/060510 A2 | 5/2008 |
| WO | WO 2009/146179 A1 | 12/2009 |
| WO | WO 2013/163628 A2 | 10/2013 |
| WO | WO 2014/040370 A1 | 3/2014 |
| WO | WO 2014/083173 A1 | 6/2014 |
| WO | WO 2014/093661 A2 | 6/2014 |
| WO | WO 2014/134412 A1 | 9/2014 |
| WO | WO 2015/089354 A1 | 6/2015 |
| WO | WO 2015/123339 A1 | 8/2015 |
| WO | WO 2016/187508 A2 | 11/2016 |
| WO | WO 2018/172533 A2 | 9/2018 |
| WO | WO 2019/217837 A1 | 11/2019 |

OTHER PUBLICATIONS

Gymnopoulos et al., "Rare cancer-specific mutations in PIK3CA show gain of function," PNAS, 104(13):5569-5574 (2007).
Iiizumi et al., "Identification of Novel HLA Class II-Restricted Neoantigens Derived from Driver Mutations," Cancers 11:266 (2019) 16 pgs.
Abhinandan et al., "Analysis and improvements to Kabat and structurally correct numbering of antibody variable domains," Mol. Immunol. 45:3832-3839 (2008).
Altschul et al., "Basic Local Alignment Search Tool," J. Mol. Biol. 215:403-410 (1990).
Altschul et al., "Gapped BLAST and PSI-BLAST: a new generation of protein database search programs," Nucleic Acids Res. 25(17):3389-3402 (1997).
Anderson, "Prospects for Human Gene Therapy," Science 226:401-409 (1984).
Blomer et al., "Highly Efficient and Sustained Gene Transfer in Adult Neurons with a Lentivirus Vector," Journal of Virology 71:6641-6649 (1997).
Bregni, et al., "Human Peripheral Blood Hematopoietic Progenitors Are Optimal Targets of Retroviral-Mediated Gene Transfer," Blood 80:1418-1422 (1992).
Brigham et al., "Rapid Communication: In vivo Transfection of Murine Lungs with a Functioning Prokaryotic Gene Using a Liposome Vehicle," Am. J. Med. Sci. 298:278-281 (1989).

(Continued)

*Primary Examiner* — Misook Yu
*Assistant Examiner* — Grace H Lunde
(74) *Attorney, Agent, or Firm* — Baker Botts L.L.P.

(57) ABSTRACT

The presently disclosed subject matter provides for methods and compositions for treating cancer (e.g., breast cancer). It relates to mutant PIK3CA-targeted TCRs that specifically target a mutant PIK3CA peptide (e.g., a human mutant PIK3CA peptide), and immunoresponsive cells comprising such TCRs. The presently disclosed mutant PIK3CA peptide-specific TCRs have enhanced immune-activating properties, including anti-tumor activity.

32 Claims, 21 Drawing Sheets

Specification includes a Sequence Listing.

(56) References Cited

OTHER PUBLICATIONS

Cayouette et al., "Adenovirus-Mediated Gene Transfer of Ciliary Neurotrophic Factor Can Prevent Photoreceptor Degeneration in the Retinal Degeneration (rd) Mouse," Human Gene Therapy 8:423-430 (1997).
Chothia et al., "Canonical Structures for the Hypervariable Regions of Immunoglobulins," J Mol. Biol. 196:901-917 (1987).
Cohen et al., "Enhanced Antitumor Activity of Murine-Human Hybrid T-Cell Receptor (TCR) in Human Lymphocytes is Associated with Improved Pairing and TCR/CD3 Stability," Cancer Res. 66(17):8878-8886 (2006).
Cohen et al., "Enhanced Antitumor Activity of T Cells Engineered to Express T-cell Receptors with a Second Disulfide Bond," Cancer Res. 67(8):3898-3903 (2007).
Cornetta et al., "Gene Transfer into Primates and Prospects for Gene Therapy in Humans," Nucleic Acid Research and Molecular Biology 36:311-322 (1987).
Danos et al., "Safe and efficient generation of recombinant retroviruses with amphotropic and ecotropic host ranges," Proc. Natl. Acad. Sci. USA 85:6460-6464 (1988).
Dupont et al., "Artificial Antigen-Presenting Cells Transduced with Telomerase Efficiently Expand Epitope-Specific, Human Leukocyte Antigen-Restricted Cytotoxic T Cells," Cancer Res 65:5417-5427 (2005).
Eglitis et al., "Retroviral Vectors for Introduction of Genes into Mammalian Cells," BioTechniques 6:608-614 (1988).
Felgner et al., "Lipofection: A highly efficient, lipid-mediated DNA-transfection procedure," Proc. Nat'l. Acad. Sci. U.S.A. 84:7413-7417 (1987).
Friedmann, "Progress toward Human Gene Therapy," Science 244:1275-1281 (1989).
Haga-Friedman et al., "Incorporation of Transmembrane Hydrophobic Mutations in the TCR Enhance Its Surface Expression and T Cell Functional Avidity," Journal of Immunology 188(11):5538-5546 (2012).
Hughes et al., "Retroviral Gene Transfer to Primitive Normal and Leukemic Hematopoietic Cells Using Clinically Applicable Procedures," J. Clin. Invest. 89:1817-1824 (1992).
International Search Report mailed Oct. 14, 2020 in International Application No. PCT/US20/38592.
Johnson, "Gene Therapy for Cystic Fibrosis," Chest 107:77S-83S (1995).
Kabat et al., Sequences of Proteins of Immunological Interest, Fifth Edition, U.S. Department of Health and Human Services, NIH Publication No. 91-3242 (1991).
Kido et al., "Use of a retroviral vector with an internal opsin promoter to direct gene expression to retinal photoreceptor cells," Current Eye Research 15:833-844 (1996).
Kimmel, "Identification and Characterization of Specific Clones: Strategy for Confirming the Validity of Presumptive Clones," Methods Enzymol. 152:507-511 (1987).
Kuball et al., "Facilitating matched pairing and expression of TCR chains introduced into human T cells," Blood 109(6):2331-2338 (2007).
Le Gal La Salle et al., "An Adenovirus Vector for Gene Transfer into Neurons and Glia in the Brain," Science 259:988-990 (1993).
Miller et al., "Generation of Helper-Free Amphotropic Retroviruses That Transduce a Dominant-Acting, Methotrexate-Resistant Dihydrofolate Reductase Gene," Mol. Cell. Biol. 5:431-437 (1985).
Miller et al., "Improved Retroviral Vectors for Gene Transfer and Expression," Biotechniques 7:980-990 (1989).
Miller et al., "Redesign of Retrovirus Packaging Cell Lines to Avoid Recombination Leading to Helper Virus Production," Mol. Cell. Biol. 6:2895-2902 (1986).
Miller, "Retrovirus Packing Cells," Human Gene Therapy 1:5-14 (1990).
Miyoshi et al., "Stable and efficient gene transfer into the retina using an HIV-based lentiviral vector," Proc. Natl. Acad. Sci. U.S.A. 94:10319-10323 (1997).
Moen, "Directions in Gene Therapy," Blood Cells 17:407-416 (1991).
Morgan et al., "Cancer Regression in Patients After Transfer of Genetically Engineered Lymphocytes," Science 314:126-129 (2006).
Myers et al., "Optimal alignments in linear space," Comput. Appl. Biosci., 4:11-17 (1988).
Naldini et al., "In Vivo Gene Delivery and Stable Transduction of Nondividing Cells by a Lentiviral Vector," Science 272:263-267 (1996).
Needleman et al., "A General Method Applicable to the Search for Similarities in the Amino Acid Sequence of Two Proteins," J. Mol. Biol. 48:443-453 (1970).
Ono et al., "Plasmid DNAs directly injected into mouse brain with lipofectin can be incorporated and expressed by brain cells," Neuroscience Letters 117:259-263 (1990).
Panelli et al., "A Tumor-Infiltrating Lymphocyte from a Melanoma Metastasis with Decreased Expression of Melanoma Differentiation Antigens Recognizes MAGE-12," J Immunol 164:4382-4392 (2000).
Panelli et al., "Expansion of Tumor-T Cell Pairs from Fine Needle Aspirates of Melanoma Metastases," J Immunol 164:495-504 (2000).
Papanicolaou et al., "Rapid expansion of cytomegalovirus-specific cytotoxic T lymphocytes by artificial antigen-presenting cells expressing a single HLA allele," Blood 102:2498-2505 (2003).
Rosenberg et al., "Gene Transfer into Humans - Immunotherapy of Patients With Advanced Melanoma, Using Tumor-Infiltrating Lymphocytes Modified by Retroviral Gene Transduction," N. Engl. J. Med 323:570-578 (1990).
Sadelain et al., "Targeting Tumours With Genetically Enhanced T Lymphocytes," Nat Rev Cancer 3:35-45 (2003).
Sharp, "Gene Therapy," The Lancet 337:1277-1278 (1991).
Straubinger et al., "Liposomes as Carriers for Intracellular Delivery of Nucleic Acids," Methods in Enzymology 101:512-527 (1983).
Tolstoshev et al., "Gene expression using retroviral vectors," Current Opinion in Biotechnology 1:55-61 (1990).
Wahl et al., "Molecular Hybridization of Immobilized Nucleic Acids: Theoretical Concepts and Practical Considerations," Methods Enzymol. 152:399-407 (1987).
Wolff et al., "Direct Gene Transfer into Mouse Muscle in Vivo," Science 247:1465-1468 (1990).
Wu et al., "Receptor-mediated Gene Delivery and Expression in Vivo," Journal of Biological Chemistry 263:14621-14624 (1988).
Wu et al., "Targeting Genes: Delivery and Persistent Expression of a Foreign Gene Driven by Mammalian Regulatory Elements in Vivo," The Journal of Biological Chemistry 264:16985-16987 (1989).
Xu et al., "Correction of the enzyme deficiency in hematopoietic cells of Gaucher patients using a clinically acceptable retroviral supernatant transduction protocol," Exp. Hemat. 22:223-230 (1994).

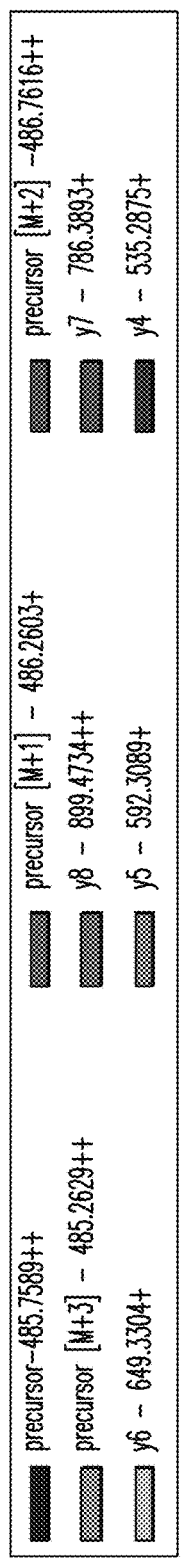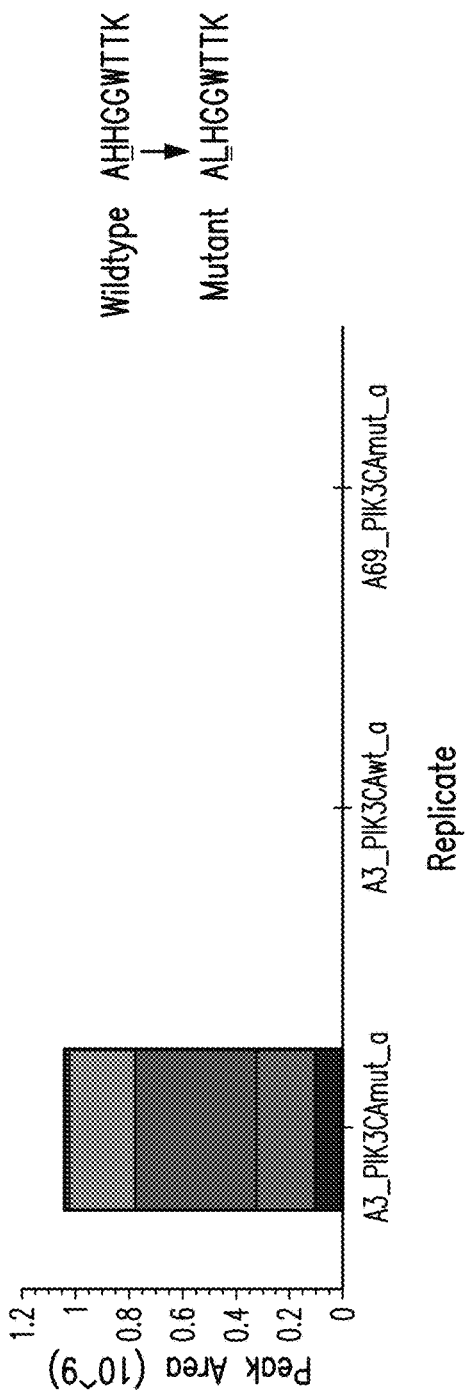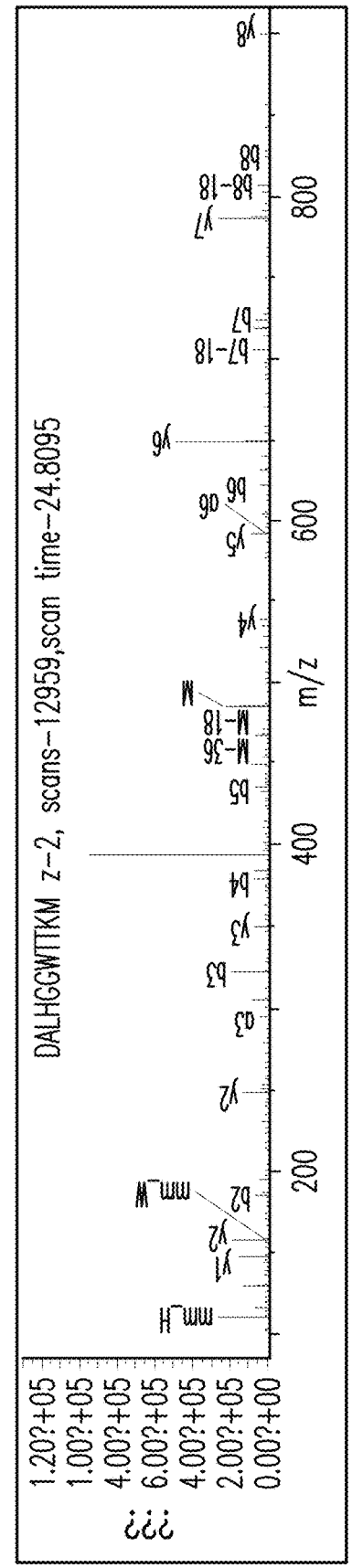
FIG. 2

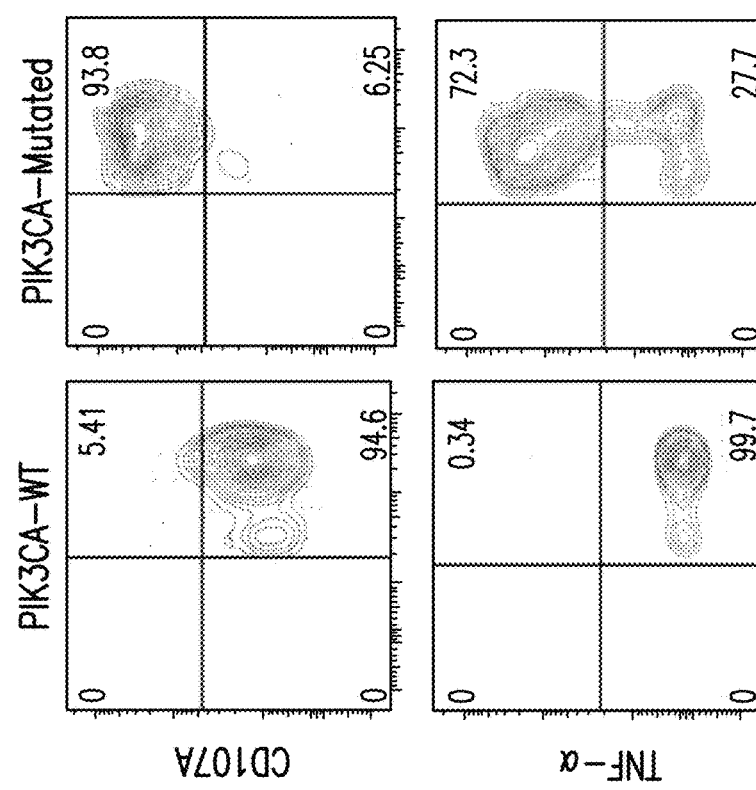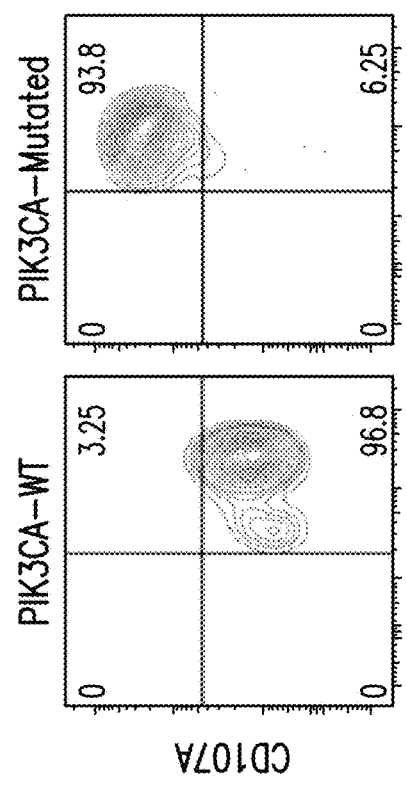
FIG. 6

○ ○ ○  □ ScanProsite  × | +

← → C ⌂  ⊙ 🔒 https://prosite.expasy.org/cgi-bin/prosite/PSScan.cgi  □ | ... ⊠ ☆  ⍰ □  ≡
○OneMSK ⊕MSK Coupa Login ⊕WCM iLab  |🔍 Search|

| ExPASy | PROSITE | Home | Contact |

Home ScanProsite ProRule Documents Downloads Links Funding proSite ScanProsite tool include splice variants (Swiss-Prot)
Output format: Graphical view [help]

Hit for USERPAT1{x-L-H-x-G-W-T-T-K} motif on all UniProtKB/Swiss-Prot (release 2019_03 of 10-Apr-19: 559634 entries) database sequences:

no hit!

△ Back to the Top

SIB Swiss Institute of Bioinformatics Disclaimer

ScanProsite tool include splice variants (Swiss-Prot)
Output format: Graphical view [help]
Hits for USERPAT1(X-L-H-X-G-W-T-T-K) motif on all UniProtKB/Swiss-Prot (release 2020_02 of 22-Apr-20: 562253 entries) database sequences :

no hit!

2. 0606T1-2 ruler: 1 100 200 300 400 500 600 700 800 900 1000

Q96K49
(TM87B_HUMAN) ———————————+——————— (555 aa) View all PROSITE motifs hits on sequence
Transmembrane protein 87B. *Homo sapiens (Human)*

| USERPAT1: |
| Pattern: X-X-X-X-G-W-T-T-K |
| Approximate number of expected random matches [Ref: PMID 11535175] in ~ 100^000 sequences (50^000^000 residues): 7.1 |

407 - 415:   ivfmGWTTK 3. 1022T8

 ScanProsite tool lineage/specied filter = [homo sapiens]; include spice variants Swiss-Prot)
Output format: Graphical view [help]
Hits for USERPAT1{x-L-H-G-G-W-T-T-K} motif on all UniProtKB/Swiss-Prot (release 2020_02 of 22-Apr-20: 562253 entries) database sequences :

no hit!

SEQUENCE LISTING

<160> NUMBER OF SEQ ID NOS: 52

<210> SEQ ID NO 1
<211> LENGTH: 6
<212> TYPE: PRT
<213> ORGANISM: Artificial Sequence
<220> FEATURE:
<223> OTHER INFORMATION: Synthetic polynucleotide

<400> SEQUENCE: 1

Asp Arg Gly Ser Gln Ser
1               5

<210> SEQ ID NO 2
<211> LENGTH: 6
<212> TYPE: PRT
<213> ORGANISM: Artificial Sequence
<220> FEATURE:
<223> OTHER INFORMATION: Synthetic polypeptide

<400> SEQUENCE: 2

Ile Tyr Ser Asn Gly Asp
1               5

<210> SEQ ID NO 3
<211> LENGTH: 13
<212> TYPE: PRT
<213> ORGANISM: Artificial Sequence
<220> FEATURE:
<223> OTHER INFORMATION: Synthetic polypeptide

<400> SEQUENCE: 3

Cys Ala Gly Asn Thr Gly Thr Ala Ser Lys Leu Thr Phe
1               5                   10

<210> SEQ ID NO 4
<211> LENGTH: 5
<212> TYPE: PRT
<213> ORGANISM: Artificial Sequence
<220> FEATURE:
<223> OTHER INFORMATION: Synthetic polypeptide

<400> SEQUENCE: 4

Ser Gly Asp Leu Ser
1               5

<210> SEQ ID NO 5
<211> LENGTH: 6
<212> TYPE: PRT
<213> ORGANISM: Artificial Sequence
<220> FEATURE:
<223> OTHER INFORMATION: Synthetic polypeptide

<400> SEQUENCE: 5

Tyr Tyr Asn Gly Glu Glu
1               5

<210> SEQ ID NO 6
<211> LENGTH: 19
<212> TYPE: PRT
<213> ORGANISM: Artificial Sequence
<220> FEATURE:
<223> OTHER INFORMATION: Synthetic polypeptide

<400> SEQUENCE: 6

Cys Ala Ser Ser Gly Leu Ala Gly Gly Pro Val Ser Gly Ala Asn Val
1               5                   10                  15

Leu Thr Phe

<210> SEQ ID NO 7
<211> LENGTH: 132
<212> TYPE: PRT
<213> ORGANISM: Artificial Sequence
<220> FEATURE:
<223> OTHER INFORMATION: Synthetic polypeptide

<400> SEQUENCE: 7

Met Lys Ser Leu Arg Val Leu Val Ile Leu Trp Leu Gln Leu Ser
1               5                   10                  15

Trp Val Trp Ser Gln Gln Lys Glu Val Glu Gln Asn Ser Gly Pro Leu
            20                  25                  30

Ser Val Pro Glu Gly Ala Ile Ala Ser Leu Asn Cys Thr Tyr Ser Asp
        35                  40                  45

Arg Gly Ser Gln Ser Phe Phe Trp Tyr Arg Gln Tyr Ser Gly Lys Ser
    50                  55                  60

Pro Glu Leu Ile Met Ser Ile Tyr Ser Asn Gly Asp Lys Glu Asp Gly
65                  70                  75                  80

Arg Phe Thr Ala Gln Leu Asn Lys Ala Ser Gln Tyr Val Ser Leu Leu
                85                  90                  95

Ile Arg Asp Ser Gln Pro Ser Asp Ser Ala Thr Tyr Leu Cys Ala Gly
            100                 105                 110

Asn Thr Gly Thr Ala Ser Lys Leu Thr Phe Gly Thr Gly Thr Arg Leu
        115                 120                 125

Gln Val Thr Leu
    130

<210> SEQ ID NO 8
<211> LENGTH: 137
<212> TYPE: PRT
<213> ORGANISM: Artificial Sequence
<220> FEATURE:
<223> OTHER INFORMATION: Synthetic polypeptide

<400> SEQUENCE: 8

Met Gly Phe Arg Leu Leu Cys Cys Val Ala Phe Cys Leu Leu Gly Ala
1               5                   10                  15

Gly Pro Val Asp Ser Gly Val Thr Gln Thr Pro Lys His Leu Ile Thr
            20                  25                  30

Ala Thr Gly Gln Arg Val Thr Leu Arg Cys Ser Pro Arg Ser Gly Asp
        35                  40                  45

Leu Ser Val Tyr Trp Tyr Gln Gln Ser Leu Asp Gln Gly Leu Gln Phe
    50                  55                  60

Leu Ile Gln Tyr Tyr Asn Gly Glu Glu Arg Ala Lys Gly Asn Ile Leu
65                  70                  75                  80

Glu Arg Phe Ser Ala Gln Gln Phe Pro Asp Leu His Ser Glu Leu Asn
                85                  90                  95

Leu Ser Ser Leu Glu Leu Gly Asp Ser Ala Leu Tyr Phe Cys Ala Ser
            100                 105                 110

Ser Gly Leu Ala Gly Gly Pro Val Ser Gly Ala Asn Val Leu Thr Phe
        115                 120                 125

Gly Ala Gly Ser Arg Leu Thr Val Leu
    130                 135

<210> SEQ ID NO 9

<211> LENGTH: 269
<212> TYPE: PRT
<213> ORGANISM: Artificial Sequence
<220> FEATURE:
<223> OTHER INFORMATION: Synthetic polypeptide

<400> SEQUENCE: 9

```
Met Lys Ser Leu Arg Val Leu Leu Val Ile Leu Trp Leu Gln Leu Ser
1               5                   10                  15

Trp Val Trp Ser Gln Gln Lys Glu Val Glu Gln Asn Ser Gly Pro Leu
            20                  25                  30

Ser Val Pro Glu Gly Ala Ile Ala Ser Leu Asn Cys Thr Tyr Ser Asp
        35                  40                  45

Arg Gly Ser Gln Ser Phe Phe Trp Tyr Arg Gln Tyr Ser Gly Lys Ser
    50                  55                  60

Pro Glu Leu Ile Met Ser Ile Tyr Ser Asn Gly Asp Lys Glu Asp Gly
65                  70                  75                  80

Arg Phe Thr Ala Gln Leu Asn Lys Ala Ser Gln Tyr Val Ser Leu Leu
                85                  90                  95

Ile Arg Asp Ser Gln Pro Ser Asp Ser Ala Thr Tyr Leu Cys Ala Gly
            100                 105                 110

Asn Thr Gly Thr Ala Ser Lys Leu Thr Phe Gly Thr Gly Thr Arg Leu
        115                 120                 125

Gln Val Thr Leu Asn Ile Gln Asn Pro Glu Pro Ala Val Tyr Gln Leu
    130                 135                 140

Lys Asp Pro Arg Ser Gln Asp Ser Thr Leu Cys Leu Phe Thr Asp Phe
145                 150                 155                 160

Asp Ser Gln Ile Asn Val Pro Lys Thr Met Glu Ser Gly Thr Phe Ile
                165                 170                 175

Thr Asp Lys Cys Val Leu Asp Met Lys Ala Met Asp Ser Lys Ser Asn
            180                 185                 190

Gly Ala Ile Ala Trp Ser Asn Gln Thr Ser Phe Thr Cys Gln Asp Ile
        195                 200                 205

Phe Lys Glu Thr Asn Ala Thr Tyr Pro Ser Ser Asp Val Pro Cys Asp
    210                 215                 220

Ala Thr Leu Thr Glu Lys Ser Phe Glu Thr Asp Met Asn Leu Asn Phe
225                 230                 235                 240

Gln Asn Leu Leu Val Ile Val Leu Arg Ile Leu Leu Leu Lys Val Ala
                245                 250                 255

Gly Phe Asn Leu Leu Met Thr Leu Arg Leu Trp Ser Ser
            260                 265
```

<210> SEQ ID NO 10
<211> LENGTH: 310
<212> TYPE: PRT
<213> ORGANISM: Artificial Sequence
<220> FEATURE:
<223> OTHER INFORMATION: Synthetic polypeptide

<400> SEQUENCE: 10

```
Met Gly Phe Arg Leu Leu Cys Cys Val Ala Phe Cys Leu Leu Gly Ala
1               5                   10                  15

Gly Pro Val Asp Ser Gly Val Thr Gln Thr Pro Lys His Leu Ile Thr
            20                  25                  30

Ala Thr Gly Gln Arg Val Thr Leu Arg Cys Ser Pro Arg Ser Gly Asp
        35                  40                  45

Leu Ser Val Tyr Trp Tyr Gln Gln Ser Leu Asp Gln Gly Leu Gln Phe
```

```
                    50                  55                  60
Leu Ile Gln Tyr Tyr Asn Gly Glu Glu Arg Ala Lys Gly Asn Ile Leu
 65                  70                  75                  80

Glu Arg Phe Ser Ala Gln Gln Phe Pro Asp Leu His Ser Glu Leu Asn
                 85                  90                  95

Leu Ser Ser Leu Glu Leu Gly Asp Ser Ala Leu Tyr Phe Cys Ala Ser
                100                 105                 110

Ser Gly Leu Ala Gly Gly Pro Val Ser Gly Ala Asn Val Leu Thr Phe
                115                 120                 125

Gly Ala Gly Ser Arg Leu Thr Val Leu Glu Asp Leu Arg Asn Val Thr
                130                 135                 140

Pro Pro Lys Val Ser Leu Phe Glu Pro Ser Lys Ala Glu Ile Ala Asn
145                 150                 155                 160

Lys Gln Lys Ala Thr Leu Val Cys Leu Ala Arg Gly Phe Phe Pro Asp
                165                 170                 175

His Val Glu Leu Ser Trp Trp Val Asn Gly Lys Glu Val His Ser Gly
                180                 185                 190

Val Cys Thr Asp Pro Gln Ala Tyr Lys Glu Ser Asn Tyr Ser Tyr Cys
                195                 200                 205

Leu Ser Ser Arg Leu Arg Val Ser Ala Thr Phe Trp His Asn Pro Arg
                210                 215                 220

Asn His Phe Arg Cys Gln Val Gln Phe His Gly Leu Ser Glu Glu Asp
225                 230                 235                 240

Lys Trp Pro Glu Gly Ser Pro Lys Pro Val Thr Gln Asn Ile Ser Ala
                245                 250                 255

Glu Ala Trp Gly Arg Ala Asp Cys Gly Ile Thr Ser Ala Ser Tyr Gln
                260                 265                 270

Gln Gly Val Leu Ser Ala Thr Ile Leu Tyr Glu Ile Leu Leu Gly Lys
                275                 280                 285

Ala Thr Leu Tyr Ala Val Leu Val Ser Thr Leu Val Val Met Ala Met
                290                 295                 300

Val Lys Arg Lys Asn Ser
305                 310

<210> SEQ ID NO 11
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 11

Ala Leu His Gly Gly Trp Thr Thr Lys
1               5

<210> SEQ ID NO 12
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 12

Ala Ala His Gly Gly Trp Thr Thr Lys
1               5

<210> SEQ ID NO 13
<211> LENGTH: 9
```

```
<212> TYPE: PRT
<213> ORGANISM: Artificial Sequence
<220> FEATURE:
<223> OTHER INFORMATION: Synthetic polypeptide

<400> SEQUENCE: 13

Ala Leu Ala Gly Gly Trp Thr Thr Lys
1               5

<210> SEQ ID NO 14
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 14

Ala Leu His Ala Gly Trp Thr Thr Lys
1               5

<210> SEQ ID NO 15
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 15

Ala Leu His Gly Ala Trp Thr Thr Lys
1               5

<210> SEQ ID NO 16
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 16

Ala Leu His Gly Gly Ala Thr Thr Lys
1               5

<210> SEQ ID NO 17
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 17

Ala Leu His Gly Gly Trp Ala Thr Lys
1               5

<210> SEQ ID NO 18
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 18

Ala Leu His Gly Gly Trp Thr Ala Lys
1               5

<210> SEQ ID NO 19
<211> LENGTH: 9
<212> TYPE: PRT
```

<213> ORGANISM: Artificial Sequence
<220> FEATURE:
<223> OTHER INFORMATION: Synthetic polynucleotide

<400> SEQUENCE: 19

Ala Leu His Gly Gly Trp Thr Thr Ala
1               5

<210> SEQ ID NO 20
<211> LENGTH: 141
<212> TYPE: PRT
<213> ORGANISM: Homo sapiens

<400> SEQUENCE: 20

Asn Ile Gln Asn Pro Asp Pro Ala Val Tyr Gln Leu Arg Asp Ser Lys
1               5                   10                  15

Ser Ser Asp Lys Ser Val Cys Leu Phe Thr Asp Phe Asp Ser Gln Thr
            20                  25                  30

Asn Val Ser Gln Ser Lys Asp Ser Asp Val Tyr Ile Thr Asp Lys Thr
        35                  40                  45

Val Leu Asp Met Arg Ser Met Asp Phe Lys Ser Asn Ser Ala Val Ala
    50                  55                  60

Trp Ser Asn Lys Ser Asp Phe Ala Cys Ala Asn Ala Phe Asn Asn Ser
65                  70                  75                  80

Ile Ile Pro Glu Asp Thr Phe Phe Pro Ser Pro Glu Ser Ser Cys Asp
                85                  90                  95

Val Lys Leu Val Glu Lys Ser Phe Glu Thr Asp Thr Asn Leu Asn Phe
            100                 105                 110

Gln Asn Leu Ser Val Ile Gly Phe Arg Ile Leu Leu Leu Lys Val Ala
        115                 120                 125

Gly Phe Asn Leu Leu Met Thr Leu Arg Leu Trp Ser Ser
    130                 135                 140

<210> SEQ ID NO 21
<211> LENGTH: 137
<212> TYPE: PRT
<213> ORGANISM: Mus musculus

<400> SEQUENCE: 21

Asn Ile Gln Asn Pro Glu Pro Ala Val Tyr Gln Leu Lys Asp Pro Arg
1               5                   10                  15

Ser Gln Asp Ser Thr Leu Cys Leu Phe Thr Asp Phe Asp Ser Gln Ile
            20                  25                  30

Asn Val Pro Lys Thr Met Glu Ser Gly Thr Phe Ile Thr Asp Lys Cys
        35                  40                  45

Val Leu Asp Met Lys Ala Met Asp Ser Lys Ser Asn Gly Ala Ile Ala
    50                  55                  60

Trp Ser Asn Gln Thr Ser Phe Thr Cys Gln Asp Ile Phe Lys Glu Thr
65                  70                  75                  80

Asn Ala Thr Tyr Pro Ser Ser Asp Val Pro Cys Asp Ala Thr Leu Thr
                85                  90                  95

Glu Lys Ser Phe Glu Thr Asp Met Asn Leu Asn Phe Gln Asn Leu Leu
            100                 105                 110

Val Ile Val Leu Arg Ile Leu Leu Leu Lys Val Ala Gly Phe Asn Leu
        115                 120                 125

Leu Met Thr Leu Arg Leu Trp Ser Ser
    130                 135

<210> SEQ ID NO 22
<211> LENGTH: 177
<212> TYPE: PRT
<213> ORGANISM: Homo sapiens

<400> SEQUENCE: 22

Glu Asp Leu Asn Lys Val Phe Pro Pro Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
            35                  40                  45

Gly Lys Glu Val His Ser Gly Val Ser Thr Asp Pro Gln Pro Leu Lys
        50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Val Ser Tyr Gln Gln Gly Val Leu Ser
        130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 23
<211> LENGTH: 173
<212> TYPE: PRT
<213> ORGANISM: Mus musculus

<400> SEQUENCE: 23

Glu Asp Leu Arg Asn Val Thr Pro Pro Lys Val Ser Leu Phe Glu Pro
1               5                   10                  15

Ser Lys Ala Glu Ile Ala Asn Lys Gln Lys Ala Thr Leu Val Cys Leu
            20                  25                  30

Ala Arg Gly Phe Phe Pro Asp His Val Glu Leu Ser Trp Trp Val Asn
            35                  40                  45

Gly Lys Glu Val His Ser Gly Val Cys Thr Asp Pro Gln Ala Tyr Lys
        50                  55                  60

Glu Ser Asn Tyr Ser Tyr Cys Leu Ser Ser Arg Leu Arg Val Ser Ala
65                  70                  75                  80

Thr Phe Trp His Asn Pro Arg Asn His Phe Arg Cys Gln Val Gln Phe
                85                  90                  95

His Gly Leu Ser Glu Glu Asp Lys Trp Pro Glu Gly Ser Pro Lys Pro
            100                 105                 110

Val Thr Gln Asn Ile Ser Ala Glu Ala Trp Gly Arg Ala Asp Cys Gly
            115                 120                 125

Ile Thr Ser Ala Ser Tyr Gln Gln Gly Val Leu Ser Ala Thr Ile Leu
        130                 135                 140

Tyr Glu Ile Leu Leu Gly Lys Ala Thr Leu Tyr Ala Val Leu Val Ser

```
145                 150                 155                 160
Thr Leu Val Val Met Ala Met Val Lys Arg Lys Asn Ser
                165                 170
```

<210> SEQ ID NO 24
<211> LENGTH: 27
<212> TYPE: PRT
<213> ORGANISM: Artificial Sequence
<220> FEATURE:
<223> OTHER INFORMATION: Synthetic polypeptide

<400> SEQUENCE: 24

```
Arg Ala Lys Arg Ser Gly Ser Gly Ala Thr Asn Phe Ser Leu Leu Lys
1               5                   10                  15

Gln Ala Gly Asp Val Glu Glu Asn Pro Gly Pro
            20                  25
```

<210> SEQ ID NO 25
<211> LENGTH: 7
<212> TYPE: PRT
<213> ORGANISM: Artificial Sequence
<220> FEATURE:
<223> OTHER INFORMATION: Synthetic polypeptide

<400> SEQUENCE: 25

```
Asn Ile Ala Thr Asn Asp Tyr
1               5
```

<210> SEQ ID NO 26
<211> LENGTH: 5
<212> TYPE: PRT
<213> ORGANISM: Artificial Sequence
<220> FEATURE:
<223> OTHER INFORMATION: Synthetic polypeptide

<400> SEQUENCE: 26

```
Gly Tyr Lys Thr Lys
1               5
```

<210> SEQ ID NO 27
<211> LENGTH: 15
<212> TYPE: PRT
<213> ORGANISM: Artificial Sequence
<220> FEATURE:
<223> OTHER INFORMATION: Synthetic polypeptide

<400> SEQUENCE: 27

```
Cys Leu Val Gly Gly Ala Tyr Thr Gly Gly Phe Lys Thr Ile Phe
1               5                   10                  15
```

<210> SEQ ID NO 28
<211> LENGTH: 5
<212> TYPE: PRT
<213> ORGANISM: Artificial Sequence
<220> FEATURE:
<223> OTHER INFORMATION: Synthetic polypeptide

<400> SEQUENCE: 28

```
Ser Gly His Ala Thr
1               5
```

<210> SEQ ID NO 29
<211> LENGTH: 6
<212> TYPE: PRT
<213> ORGANISM: Artificial Sequence
<220> FEATURE:

<223> OTHER INFORMATION: Synthetic polypeptide

<400> SEQUENCE: 29

Phe Gln Asn Asn Gly Val
1               5

<210> SEQ ID NO 30
<211> LENGTH: 14
<212> TYPE: PRT
<213> ORGANISM: Artificial Sequence
<220> FEATURE:
<223> OTHER INFORMATION: Synthetic polypeptide

<400> SEQUENCE: 30

Cys Ala Ser Ser Leu Val Ala Glu Thr Tyr Glu Gln Tyr Phe
1               5                   10

<210> SEQ ID NO 31
<211> LENGTH: 129
<212> TYPE: PRT
<213> ORGANISM: Artificial Sequence
<220> FEATURE:
<223> OTHER INFORMATION: Synthetic polypeptide

<400> SEQUENCE: 31

Met Arg Gln Val Ala Arg Val Ile Val Phe Leu Thr Leu Ser Thr Leu
1               5                   10                  15

Ser Leu Ala Lys Thr Thr Gln Pro Ile Ser Met Asp Ser Tyr Glu Gly
                20                  25                  30

Gln Glu Val Asn Ile Thr Cys Ser His Asn Asn Ile Ala Thr Asn Asp
            35                  40                  45

Tyr Ile Thr Trp Tyr Gln Gln Phe Pro Ser Gln Gly Pro Arg Phe Ile
        50                  55                  60

Ile Gln Gly Tyr Lys Thr Lys Val Thr Asn Glu Val Ala Ser Leu Phe
65                  70                  75                  80

Ile Pro Ala Asp Arg Lys Ser Ser Thr Leu Ser Leu Pro Arg Val Ser
                85                  90                  95

Leu Ser Asp Thr Ala Val Tyr Tyr Cys Leu Val Gly Gly Ala Tyr Thr
                100                 105                 110

Gly Gly Phe Lys Thr Ile Phe Gly Ala Gly Thr Arg Leu Phe Val Lys
            115                 120                 125

Ala

<210> SEQ ID NO 32
<211> LENGTH: 133
<212> TYPE: PRT
<213> ORGANISM: Artificial Sequence
<220> FEATURE:
<223> OTHER INFORMATION: Synthetic polypeptide

<400> SEQUENCE: 32

Met Gly Thr Arg Leu Leu Cys Trp Ala Ala Leu Cys Leu Leu Gly Ala
1               5                   10                  15

Glu Leu Thr Glu Ala Gly Val Ala Gln Ser Pro Arg Tyr Lys Ile Ile
                20                  25                  30

Glu Lys Arg Gln Ser Val Ala Phe Trp Cys Asn Pro Ile Ser Gly His
            35                  40                  45

Ala Thr Leu Tyr Trp Tyr Gln Gln Ile Leu Gly Gln Gly Pro Lys Leu
        50                  55                  60

Leu Ile Gln Phe Gln Asn Asn Gly Val Val Asp Asp Ser Gln Leu Pro

```
                65                  70                  75                  80

Lys Asp Arg Phe Ser Ala Glu Arg Leu Lys Gly Val Asp Ser Thr Leu
                    85                  90                  95

Lys Ile Gln Pro Ala Lys Leu Glu Asp Ser Ala Val Tyr Leu Cys Ala
                    100                 105                 110

Ser Ser Leu Val Ala Glu Thr Tyr Glu Gln Tyr Phe Gly Pro Gly Thr
                    115                 120             125

Arg Leu Thr Val Thr
            130

<210> SEQ ID NO 33
<211> LENGTH: 266
<212> TYPE: PRT
<213> ORGANISM: Artificial Sequence
<220> FEATURE:
<223> OTHER INFORMATION: Synthetic polypeptide

<400> SEQUENCE: 33

Met Arg Gln Val Ala Arg Val Ile Val Phe Leu Thr Leu Ser Thr Leu
1               5                   10                  15

Ser Leu Ala Lys Thr Thr Gln Pro Ile Ser Met Asp Ser Tyr Glu Gly
                20                  25                  30

Gln Glu Val Asn Ile Thr Cys Ser His Asn Asn Ile Ala Thr Asn Asp
                35                  40                  45

Tyr Ile Thr Trp Tyr Gln Gln Phe Pro Ser Gln Gly Pro Arg Phe Ile
        50                  55                  60

Ile Gln Gly Tyr Lys Thr Lys Val Thr Asn Glu Val Ala Ser Leu Phe
65                  70                  75                  80

Ile Pro Ala Asp Arg Lys Ser Ser Thr Leu Ser Leu Pro Arg Val Ser
                85                  90                  95

Leu Ser Asp Thr Ala Val Tyr Tyr Cys Leu Val Gly Gly Ala Tyr Thr
                100                 105                 110

Gly Gly Phe Lys Thr Ile Phe Gly Ala Gly Thr Arg Leu Phe Val Lys
                115                 120                 125

Ala Asn Ile Gln Asn Pro Glu Pro Ala Val Tyr Gln Leu Lys Asp Pro
            130                 135                 140

Arg Ser Gln Asp Ser Thr Leu Cys Leu Phe Thr Asp Phe Asp Ser Gln
145                 150                 155                 160

Ile Asn Val Pro Lys Thr Met Glu Ser Gly Thr Phe Ile Thr Asp Lys
                165                 170                 175

Cys Val Leu Asp Met Lys Ala Met Asp Ser Lys Ser Asn Gly Ala Ile
                180                 185                 190

Ala Trp Ser Asn Gln Thr Ser Phe Thr Cys Gln Asp Ile Phe Lys Glu
            195                 200                 205

Thr Asn Ala Thr Tyr Pro Ser Ser Asp Val Pro Cys Asp Ala Thr Leu
210                 215                 220

Thr Glu Lys Ser Phe Glu Thr Asp Met Asn Leu Asn Phe Gln Asn Leu
225                 230                 235                 240

Leu Val Ile Val Leu Arg Ile Leu Leu Leu Lys Val Ala Gly Phe Asn
                245                 250                 255

Leu Leu Met Thr Leu Arg Leu Trp Ser Ser
            260                 265

<210> SEQ ID NO 34
<211> LENGTH: 306
<212> TYPE: PRT
```

<213> ORGANISM: Artificial Sequence
<220> FEATURE:
<223> OTHER INFORMATION: Synthetic polypeptide

<400> SEQUENCE: 34

```
Met Gly Thr Arg Leu Leu Cys Trp Ala Ala Leu Cys Leu Leu Gly Ala
1               5                   10                  15

Glu Leu Thr Glu Ala Gly Val Ala Gln Ser Pro Arg Tyr Lys Ile Ile
            20                  25                  30

Glu Lys Arg Gln Ser Val Ala Phe Trp Cys Asn Pro Ile Ser Gly His
        35                  40                  45

Ala Thr Leu Tyr Trp Tyr Gln Gln Ile Leu Gly Gln Gly Pro Lys Leu
    50                  55                  60

Leu Ile Gln Phe Gln Asn Asn Gly Val Val Asp Asp Ser Gln Leu Pro
65                  70                  75                  80

Lys Asp Arg Phe Ser Ala Glu Arg Leu Lys Gly Val Asp Ser Thr Leu
                85                  90                  95

Lys Ile Gln Pro Ala Lys Leu Glu Asp Ser Ala Val Tyr Leu Cys Ala
            100                 105                 110

Ser Ser Leu Val Ala Glu Thr Tyr Glu Gln Tyr Phe Gly Pro Gly Thr
        115                 120                 125

Arg Leu Thr Val Thr Glu Asp Leu Arg Asn Val Thr Pro Pro Lys Val
    130                 135                 140

Ser Leu Phe Glu Pro Ser Lys Ala Glu Ile Ala Asn Lys Gln Lys Ala
145                 150                 155                 160

Thr Leu Val Cys Leu Ala Arg Gly Phe Phe Pro Asp His Val Glu Leu
                165                 170                 175

Ser Trp Trp Val Asn Gly Lys Glu Val His Ser Gly Val Cys Thr Asp
            180                 185                 190

Pro Gln Ala Tyr Lys Glu Ser Asn Tyr Ser Tyr Cys Leu Ser Ser Arg
        195                 200                 205

Leu Arg Val Ser Ala Thr Phe Trp His Asn Pro Arg Asn His Phe Arg
    210                 215                 220

Cys Gln Val Gln Phe His Gly Leu Ser Glu Glu Asp Lys Trp Pro Glu
225                 230                 235                 240

Gly Ser Pro Lys Pro Val Thr Gln Asn Ile Ser Ala Glu Ala Trp Gly
                245                 250                 255

Arg Ala Asp Cys Gly Ile Thr Ser Ala Ser Tyr Gln Gln Gly Val Leu
            260                 265                 270

Ser Ala Thr Ile Leu Tyr Glu Ile Leu Leu Gly Lys Ala Thr Leu Tyr
        275                 280                 285

Ala Val Leu Val Ser Thr Leu Val Val Met Ala Met Val Lys Arg Lys
    290                 295                 300

Asn Ser
305
```

<210> SEQ ID NO 35
<211> LENGTH: 6
<212> TYPE: PRT
<213> ORGANISM: Artificial Sequence
<220> FEATURE:
<223> OTHER INFORMATION: Synthetic polypeptide

<400> SEQUENCE: 35

```
Ala Thr Gly Tyr Pro Ser
1               5
```

```
<210> SEQ ID NO 36
<211> LENGTH: 7
<212> TYPE: PRT
<213> ORGANISM: Artificial Sequence
<220> FEATURE:
<223> OTHER INFORMATION: Synthetic polypeptide

<400> SEQUENCE: 36

Ala Thr Lys Ala Asp Asp Lys
1               5

<210> SEQ ID NO 37
<211> LENGTH: 13
<212> TYPE: PRT
<213> ORGANISM: Artificial Sequence
<220> FEATURE:
<223> OTHER INFORMATION: Synthetic polypeptide

<400> SEQUENCE: 37

Cys Ala Leu Thr Val Gly Gly Ser Tyr Ile Pro Thr Phe
1               5                   10

<210> SEQ ID NO 38
<211> LENGTH: 5
<212> TYPE: PRT
<213> ORGANISM: Artificial Sequence
<220> FEATURE:
<223> OTHER INFORMATION: Synthetic polypeptide

<400> SEQUENCE: 38

Met Gly His Arg Ala
1               5

<210> SEQ ID NO 39
<211> LENGTH: 6
<212> TYPE: PRT
<213> ORGANISM: Artificial Sequence
<220> FEATURE:
<223> OTHER INFORMATION: Synthetic polypeptide

<400> SEQUENCE: 39

Tyr Ser Tyr Glu Lys Leu
1               5

<210> SEQ ID NO 40
<211> LENGTH: 16
<212> TYPE: PRT
<213> ORGANISM: Artificial Sequence
<220> FEATURE:
<223> OTHER INFORMATION: Synthetic polypeptide

<400> SEQUENCE: 40

Cys Ala Ser Ser Gln Gly Gly Gln Gly Trp Arg Glu Thr Gln Tyr Phe
1               5                   10                  15

<210> SEQ ID NO 41
<211> LENGTH: 131
<212> TYPE: PRT
<213> ORGANISM: Artificial Sequence
<220> FEATURE:
<223> OTHER INFORMATION: Synthetic polypeptide

<400> SEQUENCE: 41

Met Asn Tyr Ser Pro Gly Leu Val Ser Leu Ile Leu Leu Leu Leu Gly
1               5                   10                  15

Arg Thr Arg Gly Asp Ser Val Thr Gln Met Glu Gly Pro Val Thr Leu
```

```
                    20                  25                  30

Ser Glu Glu Ala Phe Leu Thr Ile Asn Cys Thr Tyr Thr Ala Thr Gly
                35                  40                  45

Tyr Pro Ser Leu Phe Trp Tyr Val Gln Tyr Pro Gly Glu Gly Leu Gln
        50                  55                  60

Leu Leu Leu Lys Ala Thr Lys Ala Asp Asp Lys Gly Ser Asn Lys Gly
65                  70                  75                  80

Phe Glu Ala Thr Tyr Arg Lys Glu Thr Thr Ser Phe His Leu Glu Lys
                85                  90                  95

Gly Ser Val Gln Val Ser Asp Ser Ala Val Tyr Phe Cys Ala Leu Thr
            100                 105                 110

Val Gly Gly Ser Tyr Ile Pro Thr Phe Gly Arg Gly Thr Ser Leu Ile
            115                 120                 125

Val His Pro
        130

<210> SEQ ID NO 42
<211> LENGTH: 134
<212> TYPE: PRT
<213> ORGANISM: Artificial Sequence
<220> FEATURE:
<223> OTHER INFORMATION: Synthetic polypeptide

<400> SEQUENCE: 42

Met Gly Cys Arg Leu Leu Cys Cys Ala Val Leu Cys Leu Leu Gly Ala
1               5                   10                  15

Val Pro Ile Asp Thr Glu Val Thr Gln Thr Pro Lys His Leu Val Met
                20                  25                  30

Gly Met Thr Asn Lys Lys Ser Leu Lys Cys Glu Gln His Met Gly His
            35                  40                  45

Arg Ala Met Tyr Trp Tyr Lys Gln Lys Ala Lys Lys Pro Pro Glu Leu
        50                  55                  60

Met Phe Val Tyr Ser Tyr Glu Lys Leu Ser Ile Asn Glu Ser Val Pro
65                  70                  75                  80

Ser Arg Phe Ser Pro Glu Cys Pro Asn Ser Ser Leu Leu Asn Leu His
                85                  90                  95

Leu His Ala Leu Gln Pro Glu Asp Ser Ala Leu Tyr Leu Cys Ala Ser
            100                 105                 110

Ser Gln Gly Gly Gln Gly Trp Arg Glu Thr Gln Tyr Phe Gly Pro Gly
        115                 120                 125

Thr Arg Leu Leu Val Leu
        130

<210> SEQ ID NO 43
<211> LENGTH: 268
<212> TYPE: PRT
<213> ORGANISM: Artificial Sequence
<220> FEATURE:
<223> OTHER INFORMATION: Synthetic polypeptide

<400> SEQUENCE: 43

Met Asn Tyr Ser Pro Gly Leu Val Ser Leu Ile Leu Leu Leu Leu Gly
1               5                   10                  15

Arg Thr Arg Gly Asp Ser Val Thr Gln Met Glu Gly Pro Val Thr Leu
                20                  25                  30

Ser Glu Glu Ala Phe Leu Thr Ile Asn Cys Thr Tyr Thr Ala Thr Gly
            35                  40                  45
```

Tyr Pro Ser Leu Phe Trp Tyr Val Gln Tyr Pro Gly Glu Gly Leu Gln
            50                  55                  60

Leu Leu Leu Lys Ala Thr Lys Ala Asp Asp Lys Gly Ser Asn Lys Gly
65                  70                  75                  80

Phe Glu Ala Thr Tyr Arg Lys Glu Thr Thr Ser Phe His Leu Glu Lys
                85                  90                  95

Gly Ser Val Gln Val Ser Asp Ser Ala Val Tyr Phe Cys Ala Leu Thr
            100                 105                 110

Val Gly Gly Ser Tyr Ile Pro Thr Phe Gly Arg Gly Thr Ser Leu Ile
            115                 120                 125

Val His Pro Asn Ile Gln Asn Pro Glu Pro Ala Val Tyr Gln Leu Lys
130                 135                 140

Asp Pro Arg Ser Gln Asp Ser Thr Leu Cys Leu Phe Thr Asp Phe Asp
145                 150                 155                 160

Ser Gln Ile Asn Val Pro Lys Thr Met Glu Ser Gly Thr Phe Ile Thr
                165                 170                 175

Asp Lys Cys Val Leu Asp Met Lys Ala Met Asp Ser Lys Ser Asn Gly
            180                 185                 190

Ala Ile Ala Trp Ser Asn Gln Thr Ser Phe Thr Cys Gln Asp Ile Phe
            195                 200                 205

Lys Glu Thr Asn Ala Thr Tyr Pro Ser Ser Asp Val Pro Cys Asp Ala
            210                 215                 220

Thr Leu Thr Glu Lys Ser Phe Glu Thr Asp Met Asn Leu Asn Phe Gln
225                 230                 235                 240

Asn Leu Leu Val Ile Val Leu Arg Ile Leu Leu Leu Lys Val Ala Gly
                245                 250                 255

Phe Asn Leu Leu Met Thr Leu Arg Leu Trp Ser Ser
            260                 265

<210> SEQ ID NO 44
<211> LENGTH: 307
<212> TYPE: PRT
<213> ORGANISM: Artificial Sequence
<220> FEATURE:
<223> OTHER INFORMATION: SEQ ID NO: 44

<400> SEQUENCE: 44

Met Gly Cys Arg Leu Leu Cys Cys Ala Val Leu Cys Leu Leu Gly Ala
1               5                   10                  15

Val Pro Ile Asp Thr Glu Val Thr Gln Thr Pro Lys His Leu Val Met
            20                  25                  30

Gly Met Thr Asn Lys Lys Ser Leu Lys Cys Glu Gln His Met Gly His
        35                  40                  45

Arg Ala Met Tyr Trp Tyr Lys Gln Lys Ala Lys Lys Pro Pro Glu Leu
50                  55                  60

Met Phe Val Tyr Ser Tyr Glu Lys Leu Ser Ile Asn Glu Ser Val Pro
65                  70                  75                  80

Ser Arg Phe Ser Pro Glu Cys Pro Asn Ser Ser Leu Leu Asn Leu His
                85                  90                  95

Leu His Ala Leu Gln Pro Glu Asp Ser Ala Leu Tyr Leu Cys Ala Ser
            100                 105                 110

Ser Gln Gly Gly Gln Gly Trp Arg Glu Thr Gln Tyr Phe Gly Pro Gly
            115                 120                 125

Thr Arg Leu Leu Val Leu Glu Asp Leu Arg Asn Val Thr Pro Pro Lys
130                 135                 140

```
Val Ser Leu Phe Glu Pro Ser Lys Ala Glu Ile Ala Asn Lys Gln Lys
145                 150                 155                 160

Ala Thr Leu Val Cys Leu Ala Arg Gly Phe Phe Pro Asp His Val Glu
                165                 170                 175

Leu Ser Trp Trp Val Asn Gly Lys Glu Val His Ser Gly Val Cys Thr
            180                 185                 190

Asp Pro Gln Ala Tyr Lys Glu Ser Asn Tyr Ser Tyr Cys Leu Ser Ser
        195                 200                 205

Arg Leu Arg Val Ser Ala Thr Phe Trp His Asn Pro Arg Asn His Phe
    210                 215                 220

Arg Cys Gln Val Gln Phe His Gly Leu Ser Glu Glu Asp Lys Trp Pro
225                 230                 235                 240

Glu Gly Ser Pro Lys Pro Val Thr Gln Asn Ile Ser Ala Glu Ala Trp
                245                 250                 255

Gly Arg Ala Asp Cys Gly Ile Thr Ser Ala Ser Tyr Gln Gln Gly Val
            260                 265                 270

Leu Ser Ala Thr Ile Leu Tyr Glu Ile Leu Leu Gly Lys Ala Thr Leu
        275                 280                 285

Tyr Ala Val Leu Val Ser Thr Leu Val Val Met Ala Met Val Lys Arg
    290                 295                 300

Lys Asn Ser
305

<210> SEQ ID NO 45
<211> LENGTH: 179
<212> TYPE: PRT
<213> ORGANISM: Homo sapiens

<400> SEQUENCE: 45

Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
                20                  25                  30

Ala Thr Gly Phe Tyr Pro Asp His Val Glu Leu Ser Trp Trp Val Asn
            35                  40                  45

Gly Lys Glu Val His Ser Gly Val Ser Thr Asp Pro Gln Pro Leu Lys
        50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Glu Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Ser Arg Gly

<210> SEQ ID NO 46
<211> LENGTH: 9
```

```
<212> TYPE: PRT
<213> ORGANISM: Artificial Sequence
<220> FEATURE:
<223> OTHER INFORMATION: Synthetic polypeptide

<400> SEQUENCE: 46

Ala His His Gly Gly Trp Thr Thr Lys
1               5

<210> SEQ ID NO 47
<211> LENGTH: 9
<212> TYPE: PRT
<213> ORGANISM: Artificial Sequence
<220> FEATURE:
<223> OTHER INFORMATION: Synthetic polypeptide

<400> SEQUENCE: 47

Ile Val Phe Met Gly Trp Thr Thr Lys
1               5

<210> SEQ ID NO 48
<211> LENGTH: 9
<212> TYPE: PRT
<213> ORGANISM: Artificial Sequence
<220> FEATURE:
<223> OTHER INFORMATION: Synthetic polypeptide
<220> FEATURE:
<221> NAME/KEY: UNSURE
<222> LOCATION: (1)..(9)
<223> OTHER INFORMATION: X is unknown or other amino acid

<400> SEQUENCE: 48

Xaa Leu His Xaa Gly Trp Thr Thr Lys
1               5

<210> SEQ ID NO 49
<211> LENGTH: 9
<212> TYPE: PRT
<213> ORGANISM: Artificial Sequence
<220> FEATURE:
<223> OTHER INFORMATION: Synthetic polypeptide
<220> FEATURE:
<221> NAME/KEY: UNSURE
<222> LOCATION: (1)..(9)
<223> OTHER INFORMATION: X is unknown or other amino acid

<400> SEQUENCE: 49

Xaa Xaa Xaa Xaa Gly Trp Thr Thr Lys
1               5

<210> SEQ ID NO 50
<211> LENGTH: 9
<212> TYPE: PRT
<213> ORGANISM: Artificial Sequence
<220> FEATURE:
<223> OTHER INFORMATION: Synthetic polypeptide
<220> FEATURE:
<221> NAME/KEY: UNSURE
<222> LOCATION: (1)..(9)
<223> OTHER INFORMATION: X is unknown or other amino acid

<400> SEQUENCE: 50

Xaa Leu His Gly Gly Trp Thr Thr Lys
1               5

<210> SEQ ID NO 51
<211> LENGTH: 8
<212> TYPE: PRT
<213> ORGANISM: Artificial Sequence
```

```
<220> FEATURE:
<223> OTHER INFORMATION: Synthetic polypeptide

<400> SEQUENCE: 51

Leu His Gly Gly Trp Thr Thr Lys
1               5

<210> SEQ ID NO 52
<211> LENGTH: 10
<212> TYPE: PRT
<213> ORGANISM: Artificial Sequence
<220> FEATURE:
<223> OTHER INFORMATION: Synthetic polypeptide

<400> SEQUENCE: 52

Asp Ala Leu His Gly Gly Trp Thr Thr Lys
1               5                   10
```

T CELL RECEPTORS TARGETING PIK3CA MUTATIONS AND USES THEREOF

CROSS-REFERENCE TO RELATED APPLICATIONS

This application is a Continuation of International Application No. PCT/US2020/038592 filed Jun. 19, 2020, which claims priority to U.S. Provisional Patent Application Ser. No. 62/864,148, filed Jun. 20, 2019, the contents of each of which are hereby incorporated by reference in their entirety, and to each of which priority is claimed.

SEQUENCE LISTING

The present specification makes reference to a Sequence Listing (submitted electronically as a .txt file named "0727341293SL.txt" on Dec. 17, 2021). The .txt file was generated on Dec. 16, 2021 and is 37,670 bytes in size. The entire contents of the Sequence Listing are hereby incorporated by reference.

INTRODUCTION

The presently disclosed subject matter provides methods and compositions for treating cancer (e.g., breast cancer, endometrial cancer, cervical cancer, head and neck cancer, colon cancer, glioblastoma multiforme). It relates to T cell receptors (TCRs) that specifically target phosphatidylinositol-4,5-bisphosphate 3-kinase catalytic subunit alpha (PIK3CA) that comprises a mutation. The presently disclosed subject matter further provides immunoresponsive cells comprising such TCRs, and methods of using such TCRs and such cells for treating any human PIK3CA-mutated cancers, including but not limited to, breast cancer, endometrial cancer, cervical cancer, anal cancer, bladder cancer, colorectal cancer, head and neck squamous cell carcinoma, nonmelanoma skin cancer and salivary gland cancer.

BACKGROUND OF THE INVENTION

Cell-based immunotherapy is a therapy with curative potential for the treatment of cancer. T cells and other immune cells may be modified to target tumor antigens through the introduction of genetic material coding for TCRs specific to selected antigens. Targeted T cell therapy using specific TCRs has shown recent clinical success in treating hematologic malignancies.

A third of breast cancer patients carry PIK3CA mutations, where location of hotspot mutations in PIK3CA are similar across breast cancer subtypes. Furthermore, PIK3CA has only a limited number of hotspot mutations conserved across patients in breast cancer. These features make targeting specific mutations of PIK3CA a promising strategy for targeting and eliminating breast cancer cells. Accordingly, there are needs for novel therapeutic strategies to identify and generate TCRs targeting PIK3CA comprising mutations, and for strategies capable of inducing potent cancer eradication with minimal toxicity and immunogenicity.

SUMMARY OF THE INVENTION

The presently disclosed subject matter generally provides a T cell receptor (TCR) specifically targeting a PIK3CA peptide, wherein the PIK3CA peptide comprises a mutation. In certain embodiments, the mutation is H1047L. In certain embodiments, the PIK3CA peptide is 8-mer, 9-mer, or 10-mer. In certain embodiments, the PIK3CA peptide is 9-mer. In certain embodiments, the PIK3CA peptide comprises or consists of the amino acid sequence set forth in SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 51, or SEQ ID NO: 52. In certain embodiments, the PIK3CA peptide comprises or consists of the amino acid sequence set forth in SEQ ID NO: 11.

In certain embodiments, the PIK3CA peptide is associated with an HLA class I complex. In certain embodiments, the HLA class I complex is selected from an HLA-A, an HLA-B, and an HLA-C. In certain embodiments, the HLA class I complex is an HLA-A. In certain embodiments, the HLA-A is an HLA-A*03 superfamily. In certain embodiments, the HLA-A*03 superfamily is selected from the group consisting of HLA-A*03, HLA-A*11, HLA-A*31, HLA-A*33, HLA-A*66, HLA-A*68 and HLA-A*74. In certain embodiments, the HLA-A*03 superfamily is HLA-A*03.

In certain embodiments, the TCR comprises an extracellular domain, a transmembrane domain, and an intracellular domain, wherein the extracellular domain binds to the PIK3CA peptide. In certain embodiments, the extracellular domain comprises: a) an α chain variable region CDR3 comprising the amino acid sequence set forth in SEQ ID NO: 3 or a conservative modification thereof, and a β chain variable region CDR3 comprising the amino acid sequence set forth in SEQ ID NO: 6 or a conservative modification thereof; b) an α chain variable region CDR3 comprising the amino acid sequence set forth in SEQ ID NO: 27 or a conservative modification thereof, and a β chain variable region CDR3 comprising the amino acid sequence set forth in SEQ ID NO: 30 or a conservative modification thereof; c) an α chain variable region CDR3 comprising the amino acid sequence set forth in SEQ ID NO: 37 or a conservative modification thereof, and a β chain variable region CDR3 comprising the amino acid sequence set forth in SEQ ID NO: 40 or a conservative modification thereof.

In certain embodiments, the extracellular domain comprises: a) an α chain variable region CDR2 comprising the amino acid sequence set forth in SEQ ID NO: 2 or a conservative modification thereof, and a β chain variable region CDR2 comprising the amino acid sequence set forth in SEQ ID NO: 5 or a conservative modification thereof; b) an α chain variable region CDR2 comprising the amino acid sequence set forth in SEQ ID NO: 26 or a conservative modification thereof, and a β chain variable region CDR2 comprising the amino acid sequence set forth in SEQ ID NO: 29 or a conservative modification thereof; or c) an α chain variable region CDR2 comprising the amino acid sequence set forth in SEQ ID NO: 36 or a conservative modification thereof, and a β chain variable region CDR2 comprising the amino acid sequence set forth in SEQ ID NO: 39 or a conservative modification thereof.

In certain embodiments, the extracellular domain comprises: a) an α chain variable region CDR1 comprising the amino acid sequence set forth in SEQ ID NO: 1 or α conservative modification thereof, and a β chain variable region CDR1 comprising the amino acid sequence set forth in SEQ ID NO: 4 or a conservative modification thereof; b) an α chain variable region CDR1 comprising the amino acid sequence set forth in SEQ ID NO: 25 or a conservative modification thereof, and a β chain variable region CDR1 comprising the amino acid sequence set forth in SEQ ID NO: 28 or a conservative modification thereof; or c) an α chain variable region CDR1 comprising the amino acid sequence set forth in SEQ ID NO: 35 or a conservative modification thereof, and a β chain variable region CDR1 comprising the amino acid sequence set forth in SEQ ID NO: 38 or a conservative modification thereof.

In certain embodiments, the extracellular domain comprises: a) an α chain variable region CDR1 comprising the amino acid sequence set forth in SEQ ID NO: 1; an α chain variable region CDR2 comprising the amino acid sequence set forth in SEQ ID NO: 2; and an α chain variable region CDR3 comprising the amino acid sequence set forth in SEQ ID NO: 3; b) an α chain variable region CDR1 comprising the amino acid sequence set forth in SEQ ID NO: 25; an α chain variable region CDR2 comprising the amino acid sequence set forth in SEQ ID NO: 26; and an α chain variable region CDR3 comprising the amino acid sequence set forth in SEQ ID NO: 27; or c) an α chain variable region CDR1 comprising the amino acid sequence set forth in SEQ ID NO: 35; an α chain variable region CDR2 comprising the amino acid sequence set forth in SEQ ID NO: 36; and an α chain variable region CDR3 comprising the amino acid sequence set forth in SEQ ID NO: 37.

In certain embodiments, the extracellular domain comprises: an α chain variable region CDR1 comprising the amino acid sequence set forth in SEQ ID NO: 1; an α chain variable region CDR2 comprising the amino acid sequence set forth in SEQ ID NO: 2; and an α chain variable region CDR3 comprising the amino acid sequence set forth in SEQ ID NO: 3.

In certain embodiments, the extracellular domain comprises: a) a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6; b) a β chain variable region CDR1 comprising the amino acid sequence set forth in SEQ ID NO: 28; a β chain variable region CDR2 comprising the amino acid sequence set forth in SEQ ID NO: 29; and a β chain variable region CDR3 comprising the amino acid sequence set forth in SEQ ID NO: 30; c) a β chain variable region CDR1 comprising the amino acid sequence set forth in SEQ ID NO: 38; a β chain variable region CDR2 comprising the amino acid sequence set forth in SEQ ID NO: 39; and a β chain variable region CDR3 comprising the amino acid sequence set forth in SEQ ID NO: 40.

In certain embodiments, the extracellular domain comprises: a) an α chain variable region CDR1 comprising the amino acid sequence set forth in SEQ ID NO: 1; an α chain variable region CDR2 comprising the amino acid sequence set forth in SEQ ID NO: 2; an α chain variable region CDR3 comprising the amino acid sequence set forth in SEQ ID NO: 3; a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6; b) an α chain variable region CDR1 comprising the amino acid sequence set forth in SEQ ID NO: 25; an α chain variable region CDR2 comprising the amino acid sequence set forth in SEQ ID NO: 26; an α chain variable region CDR3 comprising the amino acid sequence set forth in SEQ ID NO: 27; a β chain variable region CDR1 comprising the amino acid sequence set forth in SEQ ID NO: 28; a β chain variable region CDR2 comprising the amino acid sequence set forth in SEQ ID NO: 29; and a β chain variable region CDR3 comprising the amino acid sequence set forth in SEQ ID NO: 30; or c) an α chain variable region CDR1 comprising the amino acid sequence set forth in SEQ ID NO: 35; an α chain variable region CDR2 comprising the amino acid sequence set forth in SEQ ID NO: 36; an α chain variable region CDR3 comprising the amino acid sequence set forth in SEQ ID NO: 37; a β chain variable region CDR1 comprising the amino acid sequence set forth in SEQ ID NO: 38; a β chain variable region CDR2 comprising the amino acid sequence set forth in SEQ ID NO: 39; and a β chain variable region CDR3 comprising the amino acid sequence set forth in SEQ ID NO: 40.

In certain embodiments, the extracellular domain comprises an α chain variable region CDR1 comprising the amino acid sequence set forth in SEQ ID NO: 1; an α chain variable region CDR2 comprising the amino acid sequence set forth in SEQ ID NO: 2; an α chain variable region CDR3 comprising the amino acid sequence set forth in SEQ ID NO: 3; a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6.

In certain embodiments, the extracellular domain and comprises an α chain variable region comprising an amino acid sequence that is at least about 80% homologous or identical to the amino acid sequence set forth in SEQ ID NO: 7, SEQ ID NO: 31, or SEQ ID NO: 41.

In certain embodiments, the extracellular domain comprises an α chain variable region comprising the amino acid sequence set forth in SEQ ID NO: 7, SEQ ID NO: 31, or SEQ ID NO: 41. In certain embodiments, the extracellular domain comprises an α chain variable region comprising the amino acid sequence set forth in SEQ ID NO: 7.

In certain embodiments, the extracellular domain comprises a β chain variable region comprising an amino acid sequence that is at least about 80% homologous or identical to the amino acid sequence set forth in SEQ ID NO: 8, SEQ ID NO: 32, or SEQ ID NO: 42.

In certain embodiments, the extracellular domain comprises a β chain variable region comprising the amino acid sequence set forth in SEQ ID NO: 8, SEQ ID NO: 32, or SEQ ID NO: 42. In certain embodiments, the extracellular domain comprises a β chain variable region comprising the amino acid sequence set forth in SEQ ID NO: 8.

In certain embodiments, the extracellular domain comprises: a) an α chain variable region comprising an amino acid sequence that is at least about 80% homologous or identical to the amino acid sequence set forth in SEQ ID NO: 7, and a β chain variable region comprising an amino acid sequence that is at least about 80% homologous or identical to the amino acid sequence set forth in SEQ ID NO: 8; b) an α chain variable region comprising an amino acid sequence that is at least about 80% homologous or identical to the amino acid sequence set forth in SEQ ID NO: 31, and a β chain variable region comprising an amino acid sequence that is at least about 80% homologous or identical to the amino acid sequence set forth in SEQ ID NO: 32; or c) an α chain variable region comprising an amino acid sequence that is at least about 80% homologous or identical to the amino acid sequence set forth in SEQ ID NO: 41, and a β chain variable region comprising an amino acid sequence that is at least about 80% homologous or identical to the amino acid sequence set forth in SEQ ID NO: 42.

In certain embodiments, the extracellular domain comprises: a) an α chain variable region comprising the amino acid sequence set forth in SEQ ID NO: 7; and a β chain variable region comprising the amino acid sequence set forth in SEQ ID NO: 8; b) an α chain variable region comprising the amino acid sequence set forth in SEQ ID NO: 31; and a β chain variable region comprising the amino acid sequence set forth in SEQ ID NO: 32; or c) an α chain variable region comprising the amino acid sequence set forth in SEQ ID NO: 41; and a β chain variable region comprising the amino acid sequence set forth in SEQ ID NO: 42. In certain embodiments, the extracellular domain comprises an α chain variable region comprising the amino acid sequence set forth in SEQ ID NO: 7; and a β chain variable region comprising the amino acid sequence set forth in SEQ ID NO: 8

In certain embodiments, the extracellular domain comprises: a) an α chain comprising the amino acid sequence set forth in SEQ ID NO: 9; and a β chain comprising the amino acid sequence set forth in SEQ ID NO: 10; b) an α chain comprising the amino acid sequence set forth in SEQ ID NO: 33; and a β chain comprising the amino acid sequence set forth in SEQ ID NO: 34; or c) an α chain comprising the amino acid sequence set forth in SEQ ID NO: 43; and a β chain comprising the amino acid sequence set forth in SEQ ID NO: 44. In certain embodiments, the extracellular domain comprises an α chain comprising the amino acid sequence set forth in SEQ ID NO: 9; and a β chain comprising the amino acid sequence set forth in SEQ ID NO: 10.

In certain embodiments, the extracellular domain binds to the same epitope on a human mutant PIK3CA peptide as a reference TCR or a functional fragment thereof, wherein the reference TCR or a functional fragment thereof comprises: a) an α chain variable region CDR1 comprising the amino acid sequence set forth in SEQ ID NO: 1; an α chain variable region CDR2 comprising the amino acid sequence set forth in SEQ ID NO: 2; an α chain variable region CDR3 comprising the amino acid sequence set forth in SEQ ID NO: 3; a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6; b) an α chain variable region CDR1 comprising the amino acid sequence set forth in SEQ ID NO: 25; an α chain variable region CDR2 comprising the amino acid sequence set forth in SEQ ID NO: 26; an α chain variable region CDR3 comprising the amino acid sequence set forth in SEQ ID NO: 27; a β chain variable region CDR1 comprising the amino acid sequence set forth in SEQ ID NO: 28; a β chain variable region CDR2 comprising the amino acid sequence set forth in SEQ ID NO: 29; and a β chain variable region CDR3 comprising the amino acid sequence set forth in SEQ ID NO: 30; or c) an α chain variable region CDR1 comprising the amino acid sequence set forth in SEQ ID NO: 35; an α chain variable region CDR2 comprising the amino acid sequence set forth in SEQ ID NO: 36; an α chain variable region CDR3 comprising the amino acid sequence set forth in SEQ ID NO: 37; a β chain variable region CDR1 comprising the amino acid sequence set forth in SEQ ID NO: 38; a β chain variable region CDR2 comprising the amino acid sequence set forth in SEQ ID NO: 39; and a β chain variable region CDR3 comprising the amino acid sequence set forth in SEQ ID NO: 40.

In certain embodiments, the TCR is recombinantly expressed, or expressed from a vector. In certain embodiments, the TCR does not target a wildtype PIK3CA peptide.

In certain embodiments, the TCR comprises a modified α-chain constant region and/or a modified β-chain constant region. In certain embodiments, the modified α-chain constant region comprises an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 20 or SEQ ID NO: 21. In certain embodiments, the modified α-chain constant region comprises the amino acid sequence set forth in SEQ ID NO: 20. In certain embodiments, the modified β-chain constant region comprises an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 22, SEQ ID NO: 23, or SEQ ID NO: 45. In certain embodiments, the modified β-chain constant region comprises the amino acid sequence set forth in SEQ ID NO: 22.

The presently disclosed subject matter further provides an immunoresponsive cell comprising the TCR disclosed herein. In certain embodiments, the immunoresponsive cell is transduced with the TCR. In certain embodiments, the TCR is constitutively expressed on the surface of the immunoresponsive cell. In certain embodiments, the immunoresponsive cell is selected from the group consisting of a T cell, a Natural Killer (NK) cell, a human embryonic stem cell, a lymphoid progenitor cell, a T cell-precursor cell, and a pluripotent stem cell from which lymphoid cells may be differentiated. In certain embodiments, the immunoresponsive cell is a T cell. In certain embodiments, the T cell is selected from the group consisting of a cytotoxic T lymphocyte (CTL), a regulatory T cell, and central memory T cells.

The presently disclosed subject matter further provides a composition comprising the immunoresponsive cell disclosed herein. In certain embodiments, the composition is a pharmaceutical composition further comprising a pharmaceutically acceptable carrier.

The presently disclosed subject matter further provides a vector comprising the isolated nucleic acid molecule disclosed herein. In certain embodiments, the vector is a γ-retroviral vector.

The presently disclosed subject matter further provides a nucleic acid molecule encoding the T cell receptor (TCR) disclosed herein. The presently disclosed subject matter further provides a method for producing an immunoresponsive cell that binds to a human mutant PIK3CA peptide, comprising introducing into the immunoresponsive cell a nucleic acid molecule that encodes the TCR disclosed herein or a vector comprising the nucleic acid molecule.

The presently disclosed subject matter further provides a host cell comprising the nucleic acid molecule disclosed herein. In certain embodiments, the host cell is a T cell.

The presently disclosed subject matter further provides methods of treating and/or preventing a neoplasm comprising a PIK3CA mutation in a subject. The presently disclosed subject matter further provides use of the immunoresponsive cell or composition disclosed herein in treating and/or preventing a neoplasm comprising a PIK3CA mutation in a subject. In certain embodiments, the PIK3CA mutation comprises or consists of H1047L. In certain embodiments, the method comprises administering to the subject an effective amount of the immunoresponsive cell or composition disclosed herein. In certain embodiments, the neoplasm is selected from the group consisting of breast cancer, endometrial cancer, cervical cancer, anal cancer, bladder cancer, colorectal cancer, head and neck squamous cell carcinoma, nonmelanoma skin cancer and salivary gland cancer. In certain embodiments, the neoplasm is breast cancer. In certain embodiments, the method reduces or eradicates the tumor burden in the subject. In certain embodiments, the subject is a human.

The presently disclosed subject matter further provides kits for treating and/or preventing a neoplasm. In certain embodiments, the kit comprises the immunoresponsive cell disclosed herein, the nucleic acid molecule disclosed herein, or the vector disclosed herein. In certain embodiments, the kit further comprises written instructions for using the immunoresponsive cell, nucleic acid molecule, or vector for treating a subject having a neoplasm.

BRIEF DESCRIPTION OF THE FIGURES

The following Detailed Description, given by way of example but not intended to limit the invention to specific embodiments described, may be understood in conjunction with the accompanying drawings.

FIG. 2 depicts analysis of the sequence of the minimal epitope by mass spectrometry. The upper panel depicts the Skyline analysis that shows enriched signal in the transfectant group that was electroporated with the combination of mutated PIK3CA and HLA-A*03:01. No signal was detected in the two control groups. The lower panel depicts the results of peptide fragmentation spectrum of the enriched signal detected in the mutated PIK3CA+ HLA-A*03:01 group. Based on the fragmentation pattern, the peptide sequence was determined to be "ALHGGWTTK" [SEQ ID NO: 11]. Wildtype peptide consists of the sequence set forth in AHHGGWTTK [SEQ ID NO: 46].

FIG. 6 depicts that PIK3CA-mutant specific TCR, 21LT2-2, recognized endogenously processed antigen and minimal peptide. 21LT2-2 TCR were retrovirally integrated into the genome of healthy donor T cells. At day 4-6 post-transduction, T cells were incubated with monkey-derived antigen-presenting cells that have been electroporated with RNA encoding HLA-A*03:01, and (left) either WT or mutated PIK3CA RNA, or (right) pulsed with the WT or mutated PIK3CA minimal 9aa peptide (1 ug/mL). Cells have been gated on CD8$^+$TCR$^+$ expression. A change in production of the CD107A and TNFα, was used to indicate the presence of mutation-specific reactivity in the context of the HLA-A*03:01. Data demonstrate that 21LT2-2 can recognize both, endogenously processed and presented mutated antigen (left), as well as, passively pulsed mutated minimal peptide (right).

FIG. 9 depicts scanning of human proteome for potential cross-reactivities for 21LT2-2.

FIG. 14A is for P2-P5; FIG. 14B is for P6-P9; and FIG. 14C is for native WT PIK3CA peptide and mutated PIK3CA P1 peptide. P1 peptide consists of the amino acid sequence set forth in SEQ ID NO: 11 (ALHGGWTTK). P2 peptide consists of the amino acid sequence set forth in SEQ ID NO: 12 (AAHGGWTTK). P3 peptide consists of the amino acid sequence set forth in SEQ ID NO: 13 (ALAGGWTTK). P4 peptide consists of the amino acid sequence set forth in SEQ ID NO: 14 (ALHAGWTTK). P5 peptide consists of the amino acid sequence set forth in SEQ ID NO: 15 (ALHGAWTTK). P6 peptide consists of the amino acid sequence set forth in SEQ ID NO: 16 (ALHGGATTK). P7 peptide consists of the amino acid sequence set forth in SEQ ID NO: 17 (ALHGGWATK). P8 peptide consists of the amino acid sequence set forth in SEQ ID NO: 18 (ALHGGWTAK). P9 peptide consists of the amino acid sequence set forth in SEQ ID NO: 19 (ALHGGWTTA). WT PIK3CA peptide consists of the amino acid sequence set forth in SEQ ID NO: 46 (AHHGGWTTK).

FIGS. 16A and 16B depict scanning of the human proteome for potential cross-reactivities. FIG. 16 shows no cross-reactive epitopes are detected for TCRs 21LT2-2 and 1022T8. A single potential cross-reactive epitope (ivfmGWTTK) was detected for TCR 0606T1-2. FIG. 16B shows that HLA*A03:01+ target cells pulsed with the potential cross-reactive epitope did not trigger 0606T1-2. Mutated PIK3CA peptide was used as a control. ALHGGWTTK is SEQ ID NO: 11. ivfmGWTTK is SEQ ID NO: 47.

DETAILED DESCRIPTION OF THE INVENTION

Figure 1:
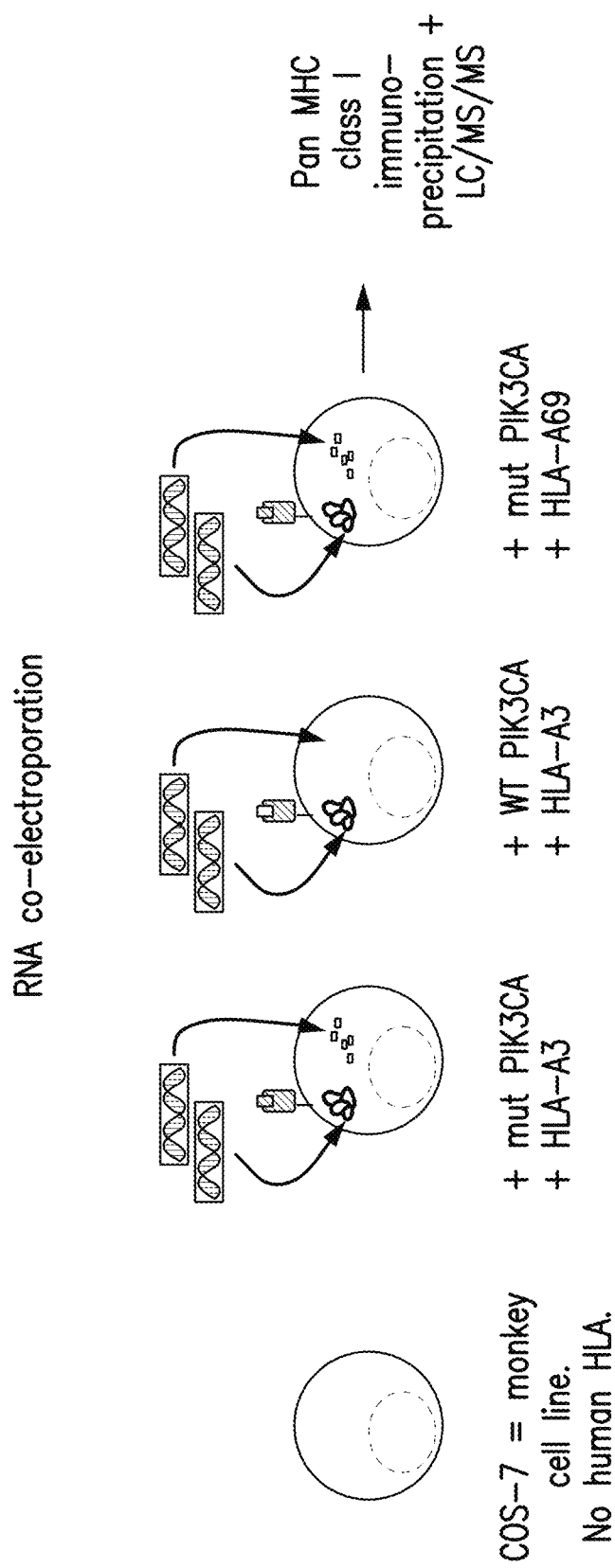
FIG. 1 depicts a schematic of deriving the sequence of the minimal epitope of mutant PIK3CA by mass spectrometry. COS-7 is a monkey-derived cell line that 1) lacks human HLA molecules, and 2) is amenable to electroporation. COS-7 cells are co-electroporated with RNA encoding HLA-A*03:01 and mutated PIK3CA. WT PIK3CA with HLA-A*03:01 and mutated PIK3CA with an irrelevant HLA, HLA-A*69:01, are included as assay controls. Using a pan anti-MHC class I antibody, all class I peptide-MHC complexes are acid eluted off the surface of the transfected COS-7 cells. The sequence and size of the eluted peptides are then derived by LC/MS/MS.

The presently disclosed subject matter provides TCRs targeting PIK3CA (e.g., human PIK3CA) comprising a mutation, e.g., a mutation comprises or consists of H1047L.

The presently disclosed subject matter also provides immunoresponsive cells (e.g., a T cell (e.g., a cytotoxic T lymphocyte (CTL), a regulatory T cell, a central memory T cell, etc.), a Natural Killer (NK) cell, a human embryonic stem cell, a lymphoid progenitor cell, a T cell-precursor cell, and a pluripotent stem cell from which lymphoid cells may be differentiated) comprising the PIK3CA-targeted TCRs, and methods of using such immunoresponsive cells for treating a neoplasm, e.g., breast cancer.

I. Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991).

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, the term "cell population" refers to a group of at least two cells expressing similar or different phenotypes. In non-limiting examples, a cell population can include at least about 10, at least about 100, at least about 200, at least about 300, at least about 400, at least about 500, at least about 600, at least about 700, at least about 800, at least about 900, at least about 1000 cells expressing similar or different phenotypes.

As used herein, the term "vector" refers to any genetic element, such as a plasmid, phage, transposon, cosmid, chromosome, virus, virion, etc., which is capable of replication when associated with the proper control elements and which can transfer gene sequences into cells. Thus, the term includes cloning and expression vehicles, as well as viral vectors and plasmid vectors.

As used herein, the term "expression vector" refers to a recombinant nucleic acid sequence, e.g., a recombinant DNA molecule, containing a desired coding sequence and appropriate nucleic acid sequences necessary for the expression of the operably linked coding sequence in a particular host organism. Nucleic acid sequences necessary for expression in prokaryotes usually include a promoter, an operator (optional), and a ribosome binding site, often along with other sequences. Eukaryotic cells are known to utilize promoters, enhancers, and termination and polyadenylation signals.

As used herein, "CDRs" are defined as the complementarity determining region amino acid sequences of a TCR, which are the hypervariable regions of TCR α-chain and β-chain. Generally, a TCR comprises at least three CDRs in the α-chain variable region and at least three CDRs in the β-chain variable region. CDRs provide the majority of contact residues for the binding of the TCR to the antigen or epitope. CDRs regions can be delineated using the Kabat system (Kabat, E. A., et al. (1991) Sequences of Proteins of Immunological Interest, Fifth Edition, U.S. Department of Health and Human Services, NIH Publication No. 91-3242), the Chothia numbering system (Chothia et al., J Mol Biol. (1987) 196:901-17), the AbM numbering system (Abhinandan et al., Mol. Immunol. 2008, 45, 3832-3839), or the IMGT numbering system (accessible at http://www.imgt.org/IMGTScientificChart/Numbering/IMGTIGVLsuperfamily.html, http://www.imgt.org/IMGTindex/numbering.php). In certain embodiments, the CDRs regions are delineated using the IMGT numbering system.

Nucleic acid molecules useful in the presently disclosed subject matter include any nucleic acid molecule that encodes a polypeptide or a fragment thereof. In certain embodiments, nucleic acid molecules useful in the presently disclosed subject matter include nucleic acid molecules that encode a TCR or a target-binding portion thereof. Such nucleic acid molecules need not be 100% identical with an endogenous nucleic acid sequence, but will typically exhibit substantial identity. Polynucleotides having "substantial homology" or "substantial identity" to an endogenous sequence are typically capable of hybridizing with at least one strand of a double-stranded nucleic acid molecule. By "hybridize" is meant pair to form a double-stranded molecule between complementary polynucleotide sequences (e.g., a gene described herein), or portions thereof, under various conditions of stringency. (See, e.g., Wahl, G. M. and S. L. Berger (1987) Methods Enzymol. 152:399; Kimmel, A. R. (1987) Methods Enzymol. 152:507).

The terms "substantially homologous" or "substantially identical" mean a polypeptide or nucleic acid molecule that exhibits at least 50% homology or identity to a reference amino acid sequence (for example, any one of the amino acid sequences described herein) or nucleic acid sequence (for example, any one of the nucleic acid sequences described herein). For example, such a sequence is at least about 60%, about 65%, about 70%, about 75%, about 80%, about 85%, about 90%, about 95% or even about 99% homologous or identical at the amino acid level or nucleic acid to the sequence used for comparison.

Sequence homology or sequence identity is typically measured using sequence analysis software (for example, Sequence Analysis Software Package of the Genetics Computer Group, University of Wisconsin Biotechnology Center, 1710 University Avenue, Madison, Wis. 53705, BLAST, BESTFIT, GAP, or PILEUP/PRETTYBOX programs). Such software matches identical or similar sequences by assigning degrees of homology to various substitutions, deletions, and/or other modifications. In an exemplary approach to determining the degree of identity, a BLAST program may be used, with a probability score between $e^{-3}$ and $e^{-100}$ indicating a closely related sequence.

As used herein, the term "analog" refers to a structurally related polypeptide or nucleic acid molecule having the function of a reference polypeptide or nucleic acid molecule.

As used herein, the term "ligand" refers to a molecule that binds to a receptor. In particular, the ligand binds a receptor on another cell, allowing for cell-to-cell recognition and/or interaction.

As used herein, the term "disease" refers to any condition or disorder that damages or interferes with the normal function of a cell, tissue, or organ. Examples of diseases include neoplasm or pathogen infection of cell.

An "effective amount" (or "therapeutically effective amount") is an amount sufficient to affect a beneficial or desired clinical result upon treatment. An effective amount can be administered to a subject in one or more doses. In terms of treatment, an effective amount is an amount that is sufficient to palliate, ameliorate, stabilize, reverse or slow the progression of the disease (e.g., a neoplasm), or otherwise reduce the pathological consequences of the disease (e.g., a neoplasm). The effective amount is generally determined by the physician on a case-by-case basis and is within the skill of one in the art. Several factors are typically taken into account when determining an appropriate dosage to achieve an effective amount. These factors include age, sex and weight of the subject, the condition being treated, the severity of the condition and the form and effective concentration of the immunoresponsive cells administered.

As used herein, the term "neoplasm" refers to a disease characterized by the pathological proliferation of a cell or tissue and its subsequent migration to or invasion of other tissues or organs. Neoplasm growth is typically uncontrolled and progressive, and occurs under conditions that would not elicit, or would cause cessation of, multiplication of normal cells. Neoplasms can affect a variety of cell types, tissues, or organs, including but not limited to an organ selected from the group consisting of bladder, colon, bone, brain, breast, cartilage, glia, esophagus, fallopian tube, gallbladder, heart, intestines, kidney, liver, lung, lymph node, nervous tissue, ovaries, pleura, pancreas, prostate, skeletal muscle, skin, spinal cord, spleen, stomach, testes, thymus, thyroid, trachea, urogenital tract, ureter, urethra, uterus, and vagina, or a tissue or cell type thereof. Neoplasms include cancers, such as sarcomas, carcinomas, or plasmacytomas (malignant tumor of the plasma cells).

As used herein, the term "heterologous nucleic acid molecule or polypeptide" refers to a nucleic acid molecule (e.g., a cDNA, DNA or RNA molecule) or polypeptide that is not normally present in a cell or sample obtained from a cell. This nucleic acid may be from another organism, or it may be, for example, an mRNA molecule that is not normally expressed in a cell or sample.

As used herein, the term "immunoresponsive cell" refers to a cell that functions in an immune response or a progenitor, or progeny thereof.

As used herein, the term "modulate" refers positively or negatively alter. Exemplary modulations include an about 1%, about 2%, about 5%, about 10%, about 25%, about 50%, about 75%, or about 100% change.

As used herein, the term "increase" refers to alter positively by at least about 5%, including, but not limited to, alter positively by about 5%, by about 10%, by about 25%, by about 30%, by about 50%, by about 75%, or by about 100%.

As used herein, the term "reduce" refers to alter negatively by at least about 5% including, but not limited to, alter negatively by about 5%, by about 10%, by about 25%, by about 30%, by about 50%, by about 75%, or by about 100%.

As used herein, the term "isolated cell" refers to a cell that is separated from the molecular and/or cellular components that naturally accompany the cell.

As used herein, the term "isolated," "purified," or "biologically pure" refers to material that is free to varying degrees from components which normally accompany it as found in its native state. "Isolate" denotes a degree of separation from original source or surroundings. "Purify" denotes a degree of separation that is higher than isolation. A "purified" or "biologically pure" protein is sufficiently free of other materials such that any impurities do not materially affect the biological properties of the protein or cause other adverse consequences. That is, a nucleic acid or polypeptide of the presently disclosed subject matter is purified if it is substantially free of cellular material, viral material, or culture medium when produced by recombinant DNA techniques, or chemical precursors or other chemicals when chemically synthesized. Purity and homogeneity are typically determined using analytical chemistry techniques, for example, polyacrylamide gel electrophoresis or high performance liquid chromatography. The term "purified" can denote that a nucleic acid or protein gives rise to essentially one band in an electrophoretic gel. For a protein that can be subjected to modifications, for example, phosphorylation or glycosylation, different modifications may give rise to different isolated proteins, which can be separately purified.

As used herein, the term "secreted" is meant a polypeptide that is released from a cell via the secretory pathway through the endoplasmic reticulum, Golgi apparatus, and as a vesicle that transiently fuses at the cell plasma membrane, releasing the proteins outside of the cell.

As used herein, the term "specifically binds" or "specifically binds to" or "specifically target" is meant a polypeptide or fragment thereof that recognizes and binds a biological molecule of interest (e.g., a polypeptide), but which does not substantially recognize and bind other molecules in a sample, for example, a biological sample, which includes or expresses a human mutant PIK3CA peptide.

As used herein, the term "treating" or "treatment" refers to clinical intervention in an attempt to alter the disease course of the individual or cell being treated, and can be performed either for prophylaxis or during the course of clinical pathology. Therapeutic effects of treatment include, without limitation, preventing occurrence or recurrence of disease, alleviation of symptoms, diminishment of any direct or indirect pathological consequences of the disease, preventing metastases, decreasing the rate of disease progression, amelioration or palliation of the disease state, and remission or improved prognosis. By preventing progression of a disease or disorder, a treatment can prevent deterioration due to a disorder in an affected or diagnosed subject or a subject suspected of having the disorder, but also a treatment may prevent the onset of the disorder or a symptom of the disorder in a subject at risk for the disorder or suspected of having the disorder.

As used herein, the term "subject" refers to any animal (e.g., a mammal), including, but not limited to, humans, non-human primates, rodents, and the like (e.g., which is to be the recipient of a particular treatment, or from whom cells are harvested).

II. PIK3CA

Phosphatidylinositol-4,5-bisphosphate 3-kinase catalytic subunit alpha (PIK3CA; Gene ID: 5290; also known as MCM, CWSS, MCAP, PI3K, CLOVE, MCMTC, PI3K-alpha and p110-alpha), is a gene encoding a catalytic subunit of phosphatidylinositol 3 kinase, which uses ATP to phosphorylate PtdIns, PtdIns4P and PtdIns(4,5)P2. PIK3CA has been found to be oncogenic and has been implicated in breast cancer and cervical cancer.

III. T-Cell Receptor (TCR)

A TCR is a disulfide-linked heterodimeric protein consisting of two variable chains expressed as part of a complex with the invariant CD3 chain molecules. A TCR is found on the surface of T cells, and is responsible for recognizing antigens as peptides bound to major histocompatibility complex (MHC) molecules. In certain embodiments, a TCR comprises an α chain and a β chain (encoded by TRA and TRB, respectively). In certain embodiments, a TCR comprises a γ chain and a δ chain (encoded by TRG and TRD, respectively).

Each chain of a TCR comprises two extracellular domains: a variable region and a constant region. The constant region is proximal to the cell membrane, followed by a transmembrane domain and a short cytoplasmic tail (i.e., an intracellular domain). The variable region binds to the peptide/MHC complex. The variable region of both chains each has three complementarity determining regions (CDRs).

In certain embodiments, a TCR can form a receptor complex with three dimeric signaling modules CD3δ/ε, CD3γ/ε and CD247 ζ/λ or ζ/η. When a TCR complex engages with its antigen and MHC (peptide/MHC), the T cell expressing the TCR complex is activated.

In certain embodiments, the presently disclosed subject matter provides a recombinant TCR. In certain embodiments, the TCR is a non-naturally occurring TCR. In certain embodiments, the TCR differs from any naturally occurring TCR by at least one amino acid residue. In certain embodiments, the TCR differs from any naturally occurring TCR by at least 2, 3, 4, 5, 6, 7, 8, 9, 10, 11, 12, 13, 14, 15, 20, 25, 30, 40, 50, 60, 70, 80, 90, 100 or more amino acid residues. In certain embodiments, the TCR is modified from a naturally occurring TCR by at least one amino acid residue. In certain embodiments, the TCR is modified from a naturally occurring TCR by at least 2, 3, 4, 5, 6, 7, 8, 9, 10, 11, 12, 13, 14, 15, 20, 25, 30, 40, 50, 60, 70, 80, 90, 100 or more amino acid residues.

In certain embodiments, the TCR specifically targets a PIK3CA peptide, wherein the PIK3CA peptide comprises or consists of a mutation ("a mutant PIK3CA peptide"). In certain embodiments, the mutation is selected from the group consisting of H1047R, E545K, E542K, N345K, H1047L, E726K, C420R, and any combination thereof. In certain embodiments, the mutation is H1047R or H1047L. In certain embodiments, the mutation is H1047L. In certain embodiments, the PIK3CA peptide consisting of a mutation H1047L comprises or consists of the amino acid sequence set forth in SEQ ID NO: 11. In certain embodiments, the TCR does not target a wildtype PIK3CA peptide. In certain embodiments, the wildtype PIK3CA peptide comprises or consists of the amino acid sequence set forth in SEQ ID NO: 46. SEQ ID NO: 46 is provided below. AHHGGWTTK [SEQ ID NO: 46]

In certain embodiments, the TCR specifically targets a PIK3CA peptide listed in FIG. 8 and FIGS. 14A-14C. In certain embodiments, the PIK3CA peptide comprises or consists of the amino acid sequence set forth in SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO:

18, SEQ ID NO: 19, SEQ ID NO: 51, or SEQ ID NO: 52. SEQ ID NOS: 11-19, 51, and 52 are provided below.

AL̲HGGWTTK  [SEQ ID NO: 11]

AA̲HGGWTTK  [SEQ ID NO: 12]

ALA̲GGWTTK  [SEQ ID NO: 13]

ALHA̲GWTTK  [SEQ ID NO: 14]

ALHGA̲WTTK  [SEQ ID NO: 15]

ALHGGA̲TTK  [SEQ ID NO: 16]

ALHGGWA̲TK  [SEQ ID NO: 17]

ALHGGWTA̲K  [SEQ ID NO: 18]

ALHGGWTTA̲  [SEQ ID NO: 19]

L̲HGGWTTK  [SEQ ID NO: 51]

DAL̲HGGWTTK  [SEQ ID NO: 52]

In certain embodiments, the TCR specifically targets a PIK3CA peptide that comprises or consists of the amino acid sequence set forth in SEQ ID NO: 11. In certain embodiments, the TCR specifically targets a PIK3CA peptide that comprises or consists of the amino acid sequence set forth in SEQ ID NO: 12, SEQ ID NO 13, or SEQ ID NO 14.

In certain embodiments, the TCR specifically targets a PIK3CA peptide associated with an HLA class I complex, e.g., HLA-A, HLA-B and HLA-C. In certain embodiments, the TCR specifically targets a PIK3CA peptide associated with an HLA class II complex, e.g., HLA-DP, HLA-DM, HLA-DO, HLA-DQ and HLA-DR.

In certain embodiments, the TCR specifically targets a PIK3CA peptide associated with an HLA-A*03 superfamily (e.g., in an HLA-A*03 superfamily dependent manner). In certain embodiments, the HLA*A03 superfamily members, include, but not limited to, alleles and sub-alleles in the HLA-A*03, HLA-A*11, HLA-A*31, HLA-A*33, HLA-A*66, HLA-A*68 and HLA-A*74.

TCR Clonotypes

In certain embodiments, the TCR comprises an α chain comprising the amino acid sequence set forth in SEQ ID NO: 9. In certain embodiments, the TCR comprises a β chain comprising the amino acid sequence set forth in SEQ ID NO: 10. SEQ ID NO: 9 and SEQ ID NO: 10 are disclosed in Table 1.

In certain embodiments, the extracellular domain of the TCR comprises an α chain variable region comprising the amino acid sequence set forth in SEQ ID NO: 7. In certain embodiments, the extracellular domain of the TCR comprises a β chain variable region comprising the amino acid sequence set forth in SEQ ID NO: 8. SEQ ID NO: 7 and 8 are disclosed in Table 1.

In certain embodiments, the TCR is a human TCR and specifically binds to a mutant PIK3CA peptide (e.g., a human mutant PIK3CA peptide), which is designated as 21LT2-2.

In certain embodiments, the TCR is a human TCR, which comprises an α chain comprising the amino acid sequence set forth in SEQ ID NO: 9 and/or a β chain comprising the amino acid sequence set forth in SEQ ID NO: 10.

In certain embodiments, the extracellular domain of the TCR comprises an α chain variable region and a β chain variable region or CDRs selected from Table 1. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 7. For example, the extracellular domain of the TCR comprises an α chain variable region comprising an amino acid sequence that is about 80%, 81%, 82%, 83%, 84%, 85%, 86%, 87%, 88%, 89%, 90%, 91%, 92%, 93%, 94%, 95%, 96%, 97%, 98%, or 99% homologous or identical to the amino acid sequence set forth in SEQ ID NO: 7. In certain embodiments, the extracellular domain of the TCR comprises an α chain variable region comprising the amino acid sequence set forth in SEQ ID NO: 7. In certain embodiments, the extracellular domain of the TCR comprises a β chain variable region comprising an amino acid sequence that is at least about 80% (e.g., at least about 85%, at least about 90%, or at least about 95%) homologous or identical to the amino acid sequence set forth in SEQ ID NO: 8. For example, the extracellular domain of the TCR comprises a β chain variable region comprising an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 8. In certain embodiments, the extracellular domain of the TCR comprises a β chain variable region comprising the amino acid sequence set forth in SEQ ID NO: 8. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 7, and a β chain variable region comprising an amino acid sequence that is at least about 80% (e.g., at least about 85%, at least about 90%, or at least about 95%) homologous or identical to the amino acid sequence set forth in SEQ ID NO: 8. In certain embodiments, the extracellular domain of the TCR comprises an α chain variable region comprising the amino acid sequence set forth in SEQ ID NO: 7 and a β chain variable region comprising the amino acid sequence set forth in SEQ ID NO: 8.

In certain embodiments, the extracellular domain of the TCR comprises an α chain variable region CDR1 comprising the amino acid sequence set forth in SEQ ID NO:1 or a conservative modification thereof, an α chain variable region CDR2 comprising the amino acid sequence set forth in SEQ ID NO: 2 or a conservative modification thereof, and an α chain variable region CDR3 comprising the amino acid sequence set forth in SEQ ID NO:3 or a conservative modification thereof. SEQ ID NOS: 1-3 are disclosed in Table 1. In certain embodiments, the extracellular domain of the TCR comprises an α chain variable region CDR1 comprising the amino acid sequence set forth in SEQ ID NO: 1, an α chain variable region CDR2 comprising the amino acid sequence set forth in SEQ ID NO: 2, and an α chain variable region CDR3 comprising the amino acid sequence set forth in SEQ ID NO: 3. In certain embodiments, the extracellular domain of the TCR comprises a β chain variable region CDR1 comprising the amino acid sequence set forth in SEQ ID NO:4 or a conservative modification thereof, a β chain variable region CDR2 comprising the amino acid sequence set forth in SEQ ID NO: 5 or a conservative modification thereof, and a β chain variable region CDR3 comprising the amino acid sequence set forth in SEQ ID NO: 6 or a conservative modification thereof. SEQ ID NOS: 4-6 are disclosed in Table 1. In certain embodiments, the extracellular domain of the TCR comprises a β chain variable region CDR1 comprising the amino acid sequence set forth in SEQ ID NO: 4, a β chain variable region CDR2 comprising the amino acid sequence set forth in SEQ ID NO: 5, and a β chain variable region CDR3 comprising the amino acid sequence set forth in SEQ ID NO: 6. In certain embodiments, the extracellular domain of the TCR comprises an α chain variable region CDR1 comprising the amino acid sequence set forth in SEQ ID NO: 1 or a conservative modification thereof, an α chain variable region CDR2 comprising the amino acid sequence set forth in SEQ ID NO: 2 or a conservative modification thereof, an α chain variable region CDR3 comprising the amino acid sequence set forth in SEQ ID NO: 3 or a conservative modification thereof, a β chain variable region CDR1 comprising the amino acid sequence set forth in SEQ ID NO: 4 or a conservative modification thereof, a β chain variable region CDR2 comprising the amino acid sequence set forth in SEQ ID NO: 5 or a conservative modification thereof, and a β chain variable region CDR3 comprising the amino acid sequence set forth in SEQ ID NO: 6 or a conservative modification thereof. In certain embodiments, the extracellular domain of the TCR comprises an α chain variable region CDR1 comprising the amino acid sequence set forth in SEQ ID NO: 1, an α chain variable region CDR2 comprising the amino acid sequence set forth in SEQ ID NO: 2, an α chain variable region CDR3 comprising the amino acid sequence set forth in SEQ ID NO: 3, a β chain variable region CDR1 comprising the amino acid sequence set forth in SEQ ID NO: 4, a β chain variable region CDR2 comprising the amino acid sequence set forth in SEQ ID NO: 5, and a β chain variable region CDR3 comprising the amino acid sequence set forth in SEQ ID NO: 6.

TABLE 1

| | (21LT2-2) | | |
|---|---|---|---|
| Antigen | PIK3CA H1047L | | |
| CDRs | 1 | 2 | 3 |
| α-chain | DRGSQS [SEQ ID NO: 1] | IYSNGD [SEQ ID NO: 2] | CAGNTGTASKLTF [SEQ ID NO: 3] |
| β-chain | SGDLS [SEQ ID NO: 4] | YYNGEE [SEQ ID NO: 5] | CASSGLAGGPVSGANVLTF SEQ ID NO: 6] |
| α-chain variable | MKSLRVLLVILWLQLSWVWSQQKEVEQNSGPLSVPEGAIASLNCTYSDRGSQSFFWYRQYSG KSPELIMSIYSNGDKEDGRFTAQLNKASQYVSLLIRDSQPSDSATYLCAGNTGTASKLTFGT GTRLQVTL [SEQ ID NO: 7] | | |
| Full α-chain | MKSLRVLLVILWLQLSWVWSQQKEVEQNSGPLSVPEGAIASLNCTYSDRGSQSFFWYRQYSG KSPELIMSIYSNGDKEDGRFTAQLNKASQYVSLLIRDSQPSDSATYLCAGNTGTASKLTFGT GTRLQVTLNIQNPEPAVYQLKDPRSQDSTLCLFTDFDSQINVPKTMESGTFITDKCVLDMKA MDSKSNGAIAWSNQTSFTCQDIFKETNATYPSSDVPCDATLTEKSFETDMNLNFQNLLVIVL RILLLKVAGFNLLMTLRLWSS [SEQ ID NO: 9] | | |
| β-chain variable | MGFRLLCCVAFCLLGAGPVDSGVTQTPKHLITATGQRVTLRCSPRSGDLSVYWYQQSLDQGL QFLIQYYNGEERAKGNILERFSAQQFPDLHSELNLSSLELGDSALYFCASSGLAGGPVSGAN VLTFGAGSRLTVL [SEQ ID NO: 8] | | |
| Full β-chain | MGFRLLCCVAFCLLGAGPVDSGVTQTPKHLITATGQRVTLRCSPRSGDLSVYWYQQSLDQGL QFLIQYYNGEERAKGNILERFSAQQFPDLHSELNLSSLELGDSALYFCASSGLAGGPVSGAN VLTFGAGSRLTVLEDLRNVTPPKVSLFEPSKAEIANKQKATLVCLARGFFPDHVELSWWVNG KEVHSGVCTDPQAYKESNYSYCLSSRLRVSATFWHNPRNHFRCQVQFHGLSEEDKWPEGSPK PVTQNISAEAWGRADCGITSASYQQGVLSATILYEILLGKATLYAVLVSTLVVMAMVKRKNS [SEQ ID NO: 10] | | |

In certain embodiments, the CDRs regions described above including Table 1 are delineated using the IMGT numbering system (accessible at http://www.imgtorg/IMGT-ScientificChart/Numbering/IMGTIGVLsuperfamily.html, http://www.imgtorg/IMGTindex/numbering.php).

In certain embodiments, the TCR comprises an α chain comprising the amino acid sequence set forth in SEQ ID NO: 33. In certain embodiments, the TCR comprises a β chain comprising the amino acid sequence set forth in SEQ ID NO: 34. SEQ ID NO: 33 and SEQ ID NO: 34 are disclosed in Table 2.

In certain embodiments, the extracellular domain of the TCR comprises an α chain variable region comprising the amino acid sequence set forth in SEQ ID NO: 31. In certain embodiments, the extracellular domain of the TCR comprises a β chain variable region comprising the amino acid sequence set forth in SEQ ID NO: 32. SEQ ID NO: 31 and SEQ ID NO: 32 are disclosed in Table 2.

In certain embodiments, the TCR is a human TCR and specifically binds to a mutant PIK3CA peptide (e.g., a human mutant PIK3CA peptide), which is designated as 0606T1-2.

In certain embodiments, the TCR is a human TCR, which comprises an α chain comprising the amino acid sequence set forth in SEQ ID NO: 33 and/or a β chain comprising the amino acid sequence set forth in SEQ ID NO: 34.

In certain embodiments, the extracellular domain of the TCR comprises an α chain variable region and a β chain variable region or CDRs selected from Table 2. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 31. For example, the extracellular domain of the TCR comprises an α chain variable region comprising an amino acid sequence that is about 80%, 81%, 82%, 83%, 84%, 85%, 86%, 87%, 88%, 89%, 90%, 91%, 92%, 93%, 94%, 95%, 96%, 97%, 98%, or 99% homologous or identical to the amino acid sequence set forth in SEQ ID NO: 31. In certain embodiments, the extracellular domain of the TCR comprises an α chain variable region comprising the amino acid sequence set forth in SEQ ID NO: 31. In certain embodiments, the extracellular domain of the TCR comprises a β chain variable region comprising an amino acid sequence that is at least about 80% (e.g., at least about 85%, at least about 90%, or at least about 95%) homologous or identical to the amino acid sequence set forth in SEQ ID NO: 32. For example, the extracellular domain of the TCR comprises a β chain variable region comprising an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 32. In certain embodiments, the extracellular domain of the TCR comprises a β chain variable region comprising the amino acid sequence set forth in SEQ ID NO: 32. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 31, and a β chain variable region comprising an amino acid sequence that is at least about 80% (e.g., at least about 85%, at least about 90%, or at least about 95%) homologous or identical to the amino acid sequence set forth in SEQ ID NO: 32. In certain embodiments, the extracellular domain of the TCR comprises an α chain variable region comprising the amino acid sequence set forth in SEQ ID NO: 31 and a β chain variable region comprising the amino acid sequence set forth in SEQ ID NO: 32.

In certain embodiments, the extracellular domain of the TCR comprises an α chain variable region CDR1 comprising the amino acid sequence set forth in SEQ ID NO: 25 or a conservative modification thereof, an α chain variable region CDR2 comprising the amino acid sequence set forth in SEQ ID NO: 26 or a conservative modification thereof, and an α chain variable region CDR3 comprising the amino acid sequence set forth in SEQ ID NO: 27 or a conservative modification thereof. SEQ ID NO: 25-27 as disclosed in Table 2. In certain embodiments, the extracellular domain of the TCR comprises an α chain variable region CDR1 comprising the amino acid sequence set forth in SEQ ID NO: 25, an α chain variable region CDR2 comprising the amino acid sequence set forth in SEQ ID NO: 26, and an α chain variable region CDR3 comprising the amino acid sequence set forth in SEQ ID NO: 27. In certain embodiments, the extracellular domain of the TCR comprises a β chain variable region CDR1 comprising the amino acid sequence set forth in SEQ ID NO: 28 or a conservative modification thereof, a β chain variable region CDR2 comprising the amino acid sequence set forth in SEQ ID NO: 29 or a conservative modification thereof, and a β chain variable region CDR3 comprising the amino acid sequence set forth in SEQ ID NO: 30 or a conservative modification thereof. In certain embodiments, the extracellular domain of the TCR comprises a β chain variable region CDR1 comprising the amino acid sequence set forth in SEQ ID NO: 28, a β chain variable region CDR2 comprising the amino acid sequence set forth in SEQ ID NO: 29, and a β chain variable region CDR3 comprising the amino acid sequence set forth in SEQ ID NO: 30. SEQ ID NO: 28-30 as disclosed in Table 2. In certain embodiments, the extracellular domain of the TCR comprises an α chain variable region CDR1 comprising the amino acid sequence set forth in SEQ ID NO: 25 or a conservative modification thereof, an α chain variable region CDR2 comprising the amino acid sequence set forth in SEQ ID NO: 26 or a conservative modification thereof, an α chain variable region CDR3 comprising the amino acid sequence set forth in SEQ ID NO: 27 or a conservative modification thereof, a β chain variable region CDR1 comprising the amino acid sequence set forth in SEQ ID NO: 28 or a conservative modification thereof, a β chain variable region CDR2 comprising the amino acid sequence set forth in SEQ ID NO: 29 or a conservative modification thereof, and a β chain variable region CDR3 comprising the amino acid sequence set forth in SEQ ID NO: 30 or a conservative modification thereof. In certain embodiments, the extracellular domain of the TCR comprises an α chain variable region CDR1 comprising the amino acid sequence set forth in SEQ ID NO: 25, an α chain variable region CDR2 comprising the amino acid sequence set forth in SEQ ID NO: 26, an α chain variable region CDR3 comprising the amino acid sequence set forth in SEQ ID NO: 27, a β chain variable region CDR1 comprising the amino acid sequence set forth in SEQ ID NO: 28, a β chain variable region CDR2 comprising the amino acid sequence set forth in SEQ ID NO: 29, and a β chain variable region CDR3 comprising the amino acid sequence set forth in SEQ ID NO: 30.

TABLE 2

(0606T1-2)

| | | | |
|---|---|---|---|
| Antigen | | PIK3CA H1047L | |
| CDRs | 1 | 2 | 3 |
| α-chain | NIATNDY [SEQ ID NO: 25] | GYKTK [SEQ ID NO: 26] | CLVGGAYTGGFKTIF [SEQ ID NO: 27] |
| β-chain | SGHAT [SEQ ID NO: 28] | FQNNGV [SEQ ID NO: 29] | CASSLVAETYEQYF [SEQ ID NO: 30] |
| α-chain variable | MRQVARVIVFLTLSTLSLAKTTQPISMDSYEGQEVNITCSHNNIATNDYITWYQQFPSQGPR FIIQGYKTKVTNEVASLFIPADRKSSTLSLPRVSLSDTAVYYCLVGGAYTGGFKTIFGAGTR LFVKA [SEQ ID NO: 31] | | |
| Full α-chain | MRQVARVIVFLTLSTLSLAKTTQPISMDSYEGQEVNITCSHNNIATNDYITWYQQFPSQGPR FIIQGYKTKVTNEVASLFIPADRKSSTLSLPRVSLSDTAVYYCLVGGAYTGGFKTIFGAGTR LFVKANIQNPEPAVYQLKDPRSQDSTLCLFTDFDSQINVPKTMESGTFITDKCVLDMKAMDS KSNGAIAWSNQTSFTCQDIFKETNATYPSSDVPCDATLTEKSFETDMNLNFQNLLVIVLRIL LLKVAGFNLLMTLRLWSS [SEQ ID NO: 33] | | |
| β-chain variable | MGTRLLCWAALCLLGAELTEAGVAQSPRYKIIEKRQSVAFWCNPISGHATLYWYQQILGQGP KLLIQFQNNGVVDDSQLPKDRFSAERLKGVDSTLKIQPAKLEDSAVYLCASSLVAETYEQYF GPGTRLTVT [SEQ ID NO: 32] | | |
| Full β-chain | MGTRLLCWAALCLLGAELTEAGVAQSPRYKIIEKRQSVAFWCNPISGHATLYWYQQILGQGP KLLIQFQNNGVVDDSQLPKDRFSAERLKGVDSTLKIQPAKLEDSAVYLCASSLVAETYEQYF GPGTRLTVTEDLRNVTPPKVSLFEPSKAEIANKQKATLVCLARGFFPDHVELSWWVNGKEVH SGVCTDPQAYKESNYSYCLSSRLRVSATFWHNPRNHFRCQVQFHGLSEEDKWPEGSPKPVTQ NISAEAWGRADCGITSASYQQGVLSATILYEILLGKATLYAVLVSTLVVMAMVKRKNS [SEQ ID NO: 34] | | |

In certain embodiments, the CDRs regions described above including Table 2 are delineated using the IMGT numbering system (accessible at http://www.imgtorg/IMGT-ScientificChart/Numbering/IMGTIGVLsuperfamily.html, http://www.imgtorg/IMGTindex/numbering.php).

In certain embodiments, the TCR comprises an α chain comprising the amino acid sequence set forth in SEQ ID NO: 43. In certain embodiments, the TCR comprises a β chain comprising the amino acid sequence set forth in SEQ ID NO: 44. SEQ ID NO: 43 and SEQ ID NO: 44 are disclosed in Table 2.

In certain embodiments, the extracellular domain of the TCR comprises an α chain variable region comprising the amino acid sequence set forth in SEQ ID NO: 41. In certain embodiments, the extracellular domain of the TCR comprises a β chain variable region comprising the amino acid sequence set forth in SEQ ID NO: 42. SEQ ID NO 41 and 42 are disclosed in Table 3.

In certain embodiments, the TCR is a human TCR and specifically binds to a mutant PIK3CA peptide (e.g., a human mutant PIK3CA peptide), which is designated as 1022T8.

In certain embodiments, the TCR is a human TCR, which comprises an α chain comprising the amino acid sequence set forth in SEQ ID NO: 43 and/or a β chain comprising the amino acid sequence set forth in SEQ ID NO: 44.

In certain embodiments, the extracellular domain of the TCR comprises an α chain variable region and a β chain variable region or CDRs selected from Table 3. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 41. For example, the extracellular domain of the TCR comprises an α chain variable region comprising an amino acid sequence that is about 80%, 81%, 82%, 83%, 84%, 85%, 86%, 87%, 88%, 89%, 90%, 91%, 92%, 93%, 94%, 95%, 96%, 97%, 98%, or 99% homologous or identical to the amino acid sequence set forth in SEQ ID NO: 41. In certain embodiments, the extracellular domain of the TCR comprises an α chain variable region comprising the amino acid sequence set forth in SEQ ID NO: 41. In certain embodiments, the extracellular domain of the TCR comprises a β chain variable region comprising an amino acid sequence that is at least about 80% (e.g., at least about 85%, at least about 90%, or at least about 95%) homologous or identical to the amino acid sequence set forth in SEQ ID NO: 42. For example, the extracellular domain of the TCR comprises a β chain variable region comprising an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 42. In certain embodiments, the extracellular domain of the TCR comprises a β chain variable region comprising the amino acid sequence set forth in SEQ ID NO: 42. In certain embodiments, the extracellular domain of the TCR comprises an α chain variable region comprising an amino acid sequence that is at least about 80% (e.g., at least about 85%, at least about 90%, or at least about 95%) homologous or identical to the amino acid sequence set forth in SEQ ID NO: 41, and a β chain variable region comprising an amino acid sequence that is at least about 80% (e.g., at least about 85%, at least about 90%, or at least about 95%) homologous or identical to the amino acid sequence set forth in SEQ ID NO: 42. In certain embodiments, the extracellular domain of the TCR comprises an α chain variable region comprising the amino acid sequence set forth in SEQ ID NO: 41 and a β chain variable region comprising the amino acid sequence set forth in SEQ ID NO: 42.

In certain embodiments, the extracellular domain of the TCR comprises an α chain variable region CDR1 comprising the amino acid sequence set forth in SEQ ID NO: 35 or a conservative modification thereof, an α chain variable region CDR2 comprising the amino acid sequence set forth in SEQ ID NO: 36 or a conservative modification thereof, and an α chain variable region CDR3 comprising the amino acid sequence set forth in SEQ ID NO: 37 or a conservative modification thereof. SEQ ID NOS: 35-37 are disclosed in Table 3. In certain embodiments, the extracellular domain of the TCR comprises an α chain variable region CDR1 comprising the amino acid sequence set forth in SEQ ID NO: 35, an α chain variable region CDR2 comprising the amino acid sequence set forth in SEQ ID NO: 36, and an α chain variable region CDR3 comprising the amino acid sequence set forth in SEQ ID NO: 37. In certain embodiments, the extracellular domain of the TCR comprises a β chain variable region CDR1 comprising the amino acid sequence set forth in SEQ ID NO: 38 or a conservative modification thereof, a β chain variable region CDR2 comprising the amino acid sequence set forth in SEQ ID NO: 39 or a conservative modification thereof, and a β chain variable region CDR3 comprising the amino acid sequence set forth in SEQ ID NO: 40 or a conservative modification thereof. SEQ ID NOS: 38-40 are disclosed in Table 3. In certain embodiments, the extracellular domain of the TCR comprises a β chain variable region CDR1 comprising the amino acid sequence set forth in SEQ ID NO: 38, a β chain variable region CDR2 comprising the amino acid sequence set forth in SEQ ID NO: 39, and a β chain variable region CDR3 comprising the amino acid sequence set forth in SEQ ID NO: 40. In certain embodiments, the extracellular domain of the TCR comprises an α chain variable region CDR1 comprising the amino acid sequence set forth in SEQ ID NO: 35 or a conservative modification thereof, an α chain variable region CDR2 comprising the amino acid sequence set forth in SEQ ID NO: 36 or a conservative modification thereof, an α chain variable region CDR3 comprising the amino acid sequence set forth in SEQ ID NO: 37 or a conservative modification thereof, a β chain variable region CDR1 comprising the amino acid sequence set forth in SEQ ID NO: 38 or a conservative modification thereof, a β chain variable region CDR2 comprising the amino acid sequence set forth in SEQ ID NO: 39 or a conservative modification thereof, and a β chain variable region CDR3 comprising the amino acid sequence set forth in SEQ ID NO: 40 or a conservative modification thereof. In certain embodiments, the extracellular domain of the TCR comprises an α chain variable region CDR1 comprising the amino acid sequence set forth in SEQ ID NO: 35, an α chain variable region CDR2 comprising the amino acid sequence set forth in SEQ ID NO: 36, an α chain variable region CDR3 comprising the amino acid sequence set forth in SEQ ID NO: 37, a β chain variable region CDR1 comprising the amino acid sequence set forth in SEQ ID NO:38, a β chain variable region CDR2 comprising the amino acid sequence set forth in SEQ ID NO: 39, and a β chain variable region CDR3 comprising the amino acid sequence set forth in SEQ ID NO: 40.

TABLE 3

| | (1022T8) | | |
|---|---|---|---|
| Antigen | PIK3CA H1047L | | |
| CDRs | 1 | 2 | 3 |
| α-chain | ATGYPS [SEQ ID NO: 35] | ATKADDK [SEQ ID NO: 36] | CALTVGGSYIPTF [SEQ ID NO: 37] |
| β-chain | MGHRA [SEQ ID NO: 38] | YSYEKL [SEQ ID NO: 39] | CASSQGGQGWRETQYF [SEQ ID NO: 40] |
| α-chain variable | MNYSPGLVSLILLLLGRTRGDSVTQMEGPVTLSEEAFLTINCTYTATGYPSLFWYVQYPGEG LQLLLLKATKADDKGSNKGFEATYRKETTSFPHLEKGSVQVSDSAVYFCALTVGGSYIPTFGRG TSLIVHP [SEQ ID NO: 41] | | |
| Full α-chain | MNYSPGLVSLILLLLGRTRGDSVTQMEGPVTLSEEAFLTINCTYTATGYPSLFWYVQYPGEG LQLLLLKATKADDKGSNKGFEATYRKETTSFPHLEKGSVQVSDSAVYFCALTVGGSYIPTFGRG TSLIVHPNIQNPEPAVYQLKDPRSQDSTLCLFTDFDSQINVPKTMESGTFITDKCVLDMKAM DSKSNGAIAWSNQTSFTCQDIFKETNATYPSSDVPCDATLTEKSFETDMNLNFQNLLVIVLR ILLLKVAGFNLLMTLRLWSS [SEQ ID NO: 43] | | |
| β-chain variable | MGCRLLCCAVLCLLGAVPIDTEVTQTPKHLVMGMTNKKSLKCEQHMGHRAMYWYKQKAKKPP ELMFVYSYEKLSINESVPSRFSPECPNSSLLNLHLHALQPEDSALYLCASSQGGQGWRETQY FGPGTRLLVL [SEQ ID NO: 42] | | |
| Full β-chain | MGCRLLCCAVLCLLGAVPIDTEVTQTPKHLVMGMTNKKSLKCEQHMGHRAMYWYKQKAKKPP ELMFVYSYEKLSINESVPSRFSPECPNSSLLNLHLHALQPEDSALYLCASSQGGQGWRETQY FGPGTRLLVLEDLRNVTPPKVSLFEPSKAEIANKQKATLVCLARGFFPDHVELSWWVNGKEV HSGVCTDPQAYKESNYSYCLSSRLRVSATFWHNPRNHFRCQVQFHGLSEEDKWPEGSPKPVT QNISAEAWGRADCGITSASYQQGVLSATILYEILLGKATLYAVLVSTLVVMAMVKRKNS [SEQ ID NO: 44] | | |

In certain embodiments, the CDRs regions described above including Table 3 are delineated using the IMGT numbering system (accessible at http://www.imgt.org/IMGTScientificChart/Numbering/IMGTIGVLsuperfamily.html,http://www.imgt.org/IMGTindex/numbering.php).

As used herein, the term "a conservative sequence modification" refers to an amino acid modification that does not significantly affect or alter the binding characteristics of the presently disclosed TCR comprising the amino acid sequence. Conservative modifications can include amino acid substitutions, additions and deletions. Amino acids can be classified into groups according to their physicochemical properties such as charge and polarity. Conservative amino acid substitutions are ones in which the amino acid residue is replaced with an amino acid within the same group. For example, amino acids can be classified by charge: positively-charged amino acids include lysine, arginine, histidine, negatively-charged amino acids include aspartic acid, glutamic acid, neutral charge amino acids include alanine, asparagine, cysteine, glutamine, glycine, isoleucine, leucine, methionine, phenylalanine, proline, serine, threonine, tryptophan, tyrosine, and valine. In addition, amino acids can be classified by polarity: polar amino acids include arginine (basic polar), asparagine, aspartic acid (acidic polar), glutamic acid (acidic polar), glutamine, histidine (basic polar), lysine (basic polar), serine, threonine, and tyrosine; non-polar amino acids include alanine, cysteine, glycine, isoleucine, leucine, methionine, phenylalanine, proline, tryptophan, and valine. Thus, one or more amino acid residues within a CDR region can be replaced with other amino acid residues from the same group and the altered TCR can be tested for retained function (i.e., the functions set forth in (c) through (l) above) using the functional assays described herein. In certain embodiments, no more than one, no more than two, no more than three, no more than four, no more than five residues within a specified sequence or a CDR region are altered.

In certain embodiments, the α chain variable region and/or the β chain variable region amino acid sequences have at least about 80%, at least about 85%, at least about 90%, or at least about 95% (e.g., about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99%) homology or identity to the specified sequences (e.g., SEQ ID NOs: 7, 8, 31, 32, 41, and 42) comprise modifications, including, but not limited to, substitutions (e.g., conservative substitutions), insertions, or deletions relative to the specified sequence(s), but retain the ability to bind to a mutant PIK3CA peptide (e.g., a human mutant PIK3CA peptide). In certain embodiments, such modifications are not within the CDR domains of the variable regions.

In certain embodiments, the extracellular domain specifically binds to a mutant PIK3CA peptide (e.g., a human mutant PIK3CA peptide) and not the corresponding wild-type peptide sequence.

In certain embodiments, a total of 1 to 10 amino acids are substituted, inserted and/or deleted in SEQ ID NO: 7, SEQ ID NO: 8, SEQ ID NO: 31, SEQ ID NO: 32, SEQ ID NO: 41, or SEQ ID NO: 42. In certain embodiments, substitutions, insertions, or deletions occur in regions outside the CDRs of the extracellular domain. In certain embodiments, the extracellular domain comprises an α chain variable region and/or a β chain variable region sequence selected from the group consisting of SEQ ID NOs: 7, 8, 31, 32, 41, and 42, including post-translational modifications of that sequence (SEQ ID NO: 7, SEQ ID NO: 8, SEQ ID NO: 31, SEQ ID NO: 32, SEQ ID NO: 41, or SEQ ID NO: 42).

As used herein, the percent homology between two amino acid sequences is equivalent to the percent identity between the two sequences. The percent identity between the two sequences is a function of the number of identical positions shared by the sequences (i.e., % homology=# of identical positions/total # of positions×100), taking into account the number of gaps, and the length of each gap, which need to be introduced for optimal alignment of the two sequences. The comparison of sequences and determination of percent identity between two sequences can be accomplished using a mathematical algorithm.

The percent homology between two amino acid sequences can be determined using the algorithm of E. Meyers and W. Miller (Comput. Appl. Biosci., 4:11-17 (1988)) which has been incorporated into the ALIGN program (version 2.0), using a PAM120 weight residue table, a gap length penalty of 12 and a gap penalty of 4. In addition, the percent homology between two amino acid sequences can be determined using the Needleman and Wunsch (J. Mol. Biol. 48:444-453 (1970)) algorithm which has been incorporated into the GAP program in the GCG software package (available at www.gcg.com), using either a Blossum 62 matrix or a PAM250 matrix, and a gap weight of 16, 14, 12, 10, 8, 6, or 4 and a length weight of 1, 2, 3, 4, 5, or 6.

Additionally or alternatively, the amino acids sequences of the presently disclosed subject matter can further be used as a "query sequence" to perform a search against public databases to, for example, identify related sequences. Such searches can be performed using the XBLAST program (version 2.0) of Altschul, et al. (1990) J. Mol. Biol. 215: 403-10. BLAST protein searches can be performed with the XBLAST program, score=50, wordlength=3 to obtain amino acid sequences homologous to the specified sequences disclosed herein. To obtain gapped alignments for comparison purposes, Gapped BLAST can be utilized as described in Altschul et al., (1997) Nucleic Acids Res. 25(17):3389-3402. When utilizing BLAST and Gapped BLAST programs, the default parameters of the respective programs (e.g., XBLAST and NBLAST) can be used.

In certain embodiments, the extracellular domain of the TCR binds to the same epitope on a mutant PIK3CA peptide (e.g., a human mutant PIK3CA peptide) as the reference TCR. For example, the extracellular domain of a presently disclosed TCR binds to the same epitope on a mutant PIK3CA peptide (e.g., a human mutant PIK3CA peptide) as a reference TCR or a functional fragment thereof comprising the an α chain variable region CDR1, CDR2, and CDR3 sequences and the a β chain variable region CDR1, CDR2, and CDR3 sequences of, for example, any one of the presently disclosed TCRs. In certain embodiments, the extracellular domain of a presently disclosed TCR binds to the same epitope on a mutant PIK3CA peptide (e.g., a human mutant PIK3CA peptide) as a reference TCR or a functional fragment thereof comprising the an α chain variable region and a β chain variable region sequences of, for example, any one of the presently disclosed TCRs.

It is well known in the art that the CDR3 domain, independently from the CDR1 and/or CDR2 domain(s), alone can determine the binding specificity of a TCR or a functional fragment thereof, for a cognate antigen and that multiple TCRs can predictably be generated having the same binding specificity based on a common CDR3 sequence.

In certain embodiments, the extracellular domain of the TCR comprises an α chain variable region CDR3 comprising the amino acid sequence set forth in SEQ ID NO: 3 or a conservative modification thereof; and a β chain variable region CDR3 comprising the amino acid sequence set forth in SEQ ID NO: 6 or a conservative modification thereof. In certain embodiments, the extracellular domain of the TCR further comprises an α chain variable region CDR2 comprising the amino acid sequence set forth in SEQ ID NO: 2 or a conservative modification thereof; and a β chain variable region CDR2 comprising the amino acid sequence set forth in SEQ ID NO: 5 or a conservative modification thereof. In certain embodiments, the extracellular domain of the TCR further comprises an α chain variable region CDR1 comprising the amino acid sequence set forth in SEQ ID NO: 1 or a conservative modification thereof; and a β chain variable region CDR1 comprising the amino acid sequence set forth in SEQ ID NO: 4 or a conservative modification thereof.

In certain embodiments, the extracellular domain of the TCR comprises an α chain variable region CDR3 comprising the amino acid sequence set forth in SEQ ID NO: 27 or a conservative modification thereof; and a β chain variable region CDR3 comprising the amino acid sequence set forth in SEQ ID NO: 30 or a conservative modification thereof. In certain embodiments, the extracellular domain of the TCR further comprises an α chain variable region CDR2 comprising the amino acid sequence set forth in SEQ ID NO: 26 or a conservative modification thereof; and a β chain variable region CDR2 comprising the amino acid sequence set forth in SEQ ID NO: 29 or a conservative modification thereof. In certain embodiments, the extracellular domain of the TCR further comprises an α chain variable region CDR1 comprising the amino acid sequence set forth in SEQ ID NO: 25 or a conservative modification thereof; and a β chain variable region CDR1 comprising the amino acid sequence set forth in SEQ ID NO: 28 or a conservative modification thereof.

In certain embodiments, the extracellular domain of the TCR comprises an α chain variable region CDR3 comprising the amino acid sequence set forth in SEQ ID NO: 37 or a conservative modification thereof; and a β chain variable region CDR3 comprising the amino acid sequence set forth in SEQ ID NO: 40 or a conservative modification thereof. In certain embodiments, the extracellular domain of the TCR further comprises an α chain variable region CDR2 comprising the amino acid sequence set forth in SEQ ID NO: 36 or a conservative modification thereof; and a β chain variable region CDR2 comprising the amino acid sequence set forth in SEQ ID NO: 39 or a conservative modification thereof. In certain embodiments, the extracellular domain of the TCR further comprises an α chain variable region CDR1 comprising the amino acid sequence set forth in SEQ ID NO: 35 or a conservative modification thereof; and a β chain variable region CDR1 comprising the amino acid sequence set forth in SEQ ID NO: 38 or a conservative modification thereof.

In certain embodiments, the TCR of the presently disclosed subject matter further comprises an inducible promoter, for expressing nucleic acid sequences in human cells. Promoters for use in expressing TCR genes can be a constitutive promoter, such as ubiquitin C (UbiC) promoter.

The presently disclosed subject matter also provides a nucleic acid molecule encoding the mutant PIK3CA-targeted TCR described herein or a functional portion thereof. In certain embodiments, the nucleic acid molecule encodes both an α chain and a β chain of a presently disclosed TCR. In certain embodiments, the α chain and the β chain are separated by a self-cleavage peptide, e.g., a 2A-peptide. In certain embodiments, the α chain and the β chain are separated by a furin-2A-peptide. In certain embodiments, the peptide comprises the amino acid sequence set forth in SEQ ID NO: 24.

RAKRSGSGATNFSLLKQAGDVEENPGP [SEQ ID NO: 24]

In certain embodiments, the nucleic acid molecule encodes a functional portion/fragment of a presently disclosed mutant PIK3CA-targeted TCR. As used herein, the term "functional portion" or "functional fragment" refers to any portion, part or fragment of a presently disclosed mutant PIK3CA-targeted TCR, which portion, part or fragment retains the biological activity of the mutant PIK3CA-targeted TCR (the parent TCR). For example, functional portions encompass the portions, parts or fragments of a presently disclosed mutant PIK3CA-targeted TCR that retains the ability to recognize a target cell, to treat a disease, e.g., breast cancer, to a similar, same, or even a higher extent as the parent TCR. In certain embodiments, the nucleic acid molecule encoding a functional portion of a presently disclosed mutant PIK3CA-targeted TCR encodes a protein comprising, e.g., about 10%, about 20%, about 25%, about 30%, about 35%, about 40%, about 45%, about 50%, about 55%, about 60%, about 65%, about 70%, about 75%, about 80%, about 85%, about 90%, and about 95%, or more of the parent TCR.

TCRs with Modifications within CDRs

In certain embodiments, a presently disclosed TCR (or a functional fragment thereof) comprises an α chain variable region comprising CDR1, CDR2 and CDR3 sequences and a β chain variable region comprising CDR1, CDR2 and CDR3 sequences, wherein one or more of these CDR sequences comprise specified amino acid sequences based on the TCRs (or a functional fragments thereof) described herein (see Tables 1-3), or modifications thereof, and wherein the TCRs (or a functional fragments thereof) retain the desired functional properties of the mutant PIK3CA peptide-specific TCRs (or a functional fragments thereof) of the presently disclosed subject matter.

In certain embodiments, a presently disclosed TCR (or a functional fragment thereof) comprises an α chain constant region and a β chain constant region, wherein at least one of the constant regions comprises specified amino acid sequences based on the TCRs (or a functional fragments thereof) described herein (see Tables 1-3), or modifications thereof, and wherein the TCR (or a functional fragment thereof) retains the desired functional properties of the mutant PIK3CA peptide-specific TCRs (or a functional fragments thereof) of the presently disclosed subject matter.

In certain embodiments, such modifications do not significantly affect or alter the binding characteristics of the TCR containing the amino acid sequence. Non-limiting examples of such modifications include amino acid substitutions, additions and deletions. Modifications can be introduced into the presently disclosed TCR or a functional fragment thereof by standard techniques known in the art, such as site-directed mutagenesis and PCR-mediated mutagenesis.

The modifications can be conservative modifications, non-conservative modifications, or mixtures of conservative and non-conservative modifications. As discussed above, conservative amino acid substitutions are ones in which the amino acid residue is replaced with an amino acid residue having a similar side chain. Families of amino acid residues having similar side chains have been defined in the art. Exemplary conservative amino acid substitutions are shown in Table 4. In certain embodiments, amino acid substitutions may be introduced into a TCR of interest and the products screened for a desired activity, e.g., retained/improved antigen binding, decreased immunogenicity, or improved ADCC or CDC.

TABLE 4

| Original Residue | Exemplary conservative amino acid Substitutions |
| --- | --- |
| Ala (A) | Val; Leu; Ile |
| Arg (R) | Lys; Gln; Asn |
| Asn (N) | Gln; His; Asp, Lys; Arg |
| Asp (D) | Glu; Asn |

TABLE 4-continued

| Original Residue | Exemplary conservative amino acid Substitutions |
|---|---|
| Cys (C) | Ser; Ala |
| Gln (Q) | Asn; Glu |
| Glu (E) | Asp; Gln |
| Gly (G) | Ala |
| His (H) | Asn; Gln; Lys; Arg |
| Ile (I) | Leu; Val; Met; Ala; Phe |
| Leu (L) | Ile; Val; Met; Ala; Phe |
| Lys (K) | Arg; Gln; Asn |
| Met (M) | Leu; Phe; Ile |
| Phe (F) | Trp; Leu; Val; Ile; Ala; Tyr |
| Pro (P) | Ala |
| Ser (S) | Thr |
| Thr (T) | Val; Ser |
| Trp (W) | Tyr; Phe |
| Tyr (Y) | Trp; Phe; Thr; Ser |
| Val (V) | Ile, Leu, Met, Phe, Ala |

Amino acids may be grouped according to common side-chain properties:
hydrophobic: Norleucine, Met, Ala, Val, Leu, Ile;
neutral hydrophilic: Cys, Ser, Thr, Asn, Gln;
acidic: Asp, Glu;
basic: His, Lys, Arg;
residues that influence chain orientation: Gly, Pro;
aromatic: Trp, Tyr, Phe.

In certain embodiments, one or more amino acid residues within a CDR region can be replaced with other amino acid residues from the same group and the altered TCR can be tested for retained function using the functional assays described herein.

Non-conservative substitutions entail exchanging a member of one of these classes for another class.

In certain embodiments, no more than one, no more than two, no more than three, no more than four, no more than five residues within a specified sequence or a CDR region are altered.

In certain embodiments, one or more amino acid residues within a constant region of a TCR can be modified to enhance stability and/or cell surface expression of the TCR. In certain embodiments, no more than one, no more than two, no more than three, no more than four, no more than five residues within a specified sequence or a constant region are altered. In certain embodiments, the modification includes but is not limited to, murinization, cysteine modification and transmembrane modification (see Cohen et al. Enhanced antitumor activity of murine-human hybrid T-cell receptor (TCR) in human lymphocytes is associated with improved pairing and TCR/CD3 stability, *Cancer Res.* 2006; 66(17):8878-8886; Cohen et al. Enhanced antitumor activity of T cells engineered to express T-cell receptors with a second disulfide bond, *Cancer Res.* 2007; 67(8):3898-3903; Kuball et al. Facilitating matched pairing and expression of TCR chains introduced into human T cells, *Blood* 2007; 109(6):2331-2338; Haga-Friedman et al. Incorporation of transmembrane hydrophobic mutations in the TCR enhance its surface expression and T cell functional avidity, *Journal of immunology* 2012; 188(11):5538-5546, the contents of each of which are incorporated by reference in their entireties).

In certain embodiments, a TCR disclosed herein comprises a modified TCR α-chain constant region that comprises an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 20 or SEQ ID NO: 21. In certain embodiments, the modified TCR α-chain constant region comprises the amino acid sequence set forth in SEQ ID NO: 20. In certain embodiments, the modified TCR α-chain constant region comprises the amino acid sequence set forth in SEQ ID NO: 21.

In certain embodiments, a TCR disclosed herein comprises a modified TCR β-chain constant region that comprises an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% homologous or identical to the amino acid sequence set forth in SEQ ID NO: 22, SEQ ID NO: 23, SEQ ID NO: 45. In certain embodiments, the modified TCR β-chain constant region comprises the amino acid sequence set forth in SEQ ID NO: 22. In certain embodiments, the modified TCR β-chain constant region comprises the amino acid sequence set forth in SEQ ID NO: 23. In certain embodiments, the modified TCR β-chain constant region comprises the amino acid sequence set forth in SEQ ID NO: 45.

Human α-chain constant region:

[SEQ ID NO: 20]
NIQNPDPAVYQLRDSKSSDKSVCLFTDFDSQTNVSQSKDSDVYITDKT

VLDMRSMDFKSNSAVAWSNKSDFACANAFNNSIIPEDTFFPSPESSCD

VKLVEKSFETDTNLNFQNLSVIGFRILLLKVAGFNLLMTLRLWSS

Mouse α-chain constant region: (cysteine-modification and LVL modification in transmembrane domain underlined)

[SEQ ID NO: 21]
NIQNPEPAVYQLKDPRSQDSTLCLFTDFDSQINVPKTMESGTFITDK<u>C</u>

VLDMKAMDSKSNGAIAWSNQTSFTCQDIFKETNATYPSSDVPCDATLT

EKSFETDMNLNFQNL<u>LVIVL</u>RILLLKVAGFNLLMTLRLWSS

Human β-chain constant region:

[SEQ ID NO: 22]
EDLNKVFPPEVAVFEPSEAEISHTQKATLVCLATGFFPDHVELSWWVN

GKEVHSGVSTDPQPLKEQPALNDSRYCLSSRLRVSATFWQNPRNHFRC

QVQFYGLSENDEWTQDRAKPVTQIVSAEAWGRADCGFTSVSYQQGVLS

ATILYEILLGKATLYAVLVSALVLMAMVKRKDF

Mouse β-chain constant region: (cysteine-modification underlined)

[SEQ ID NO: 23]
EDLRNVTPPKVSLFEPSKAEIANKQKATLVCLARGFFPDHVELSWWVN

GKEVHSGV<u>C</u>TDPQAYKESNYSYCLSSRLRVSATFWHNPRNHFRCQVQF

HGLSEEDKWPEGSPKPVTQNISAEAWGRADCGITSASYQQGVLSATIL

YEILLGKATLYAVLVSTLVVMAMVKRKNS

Human β-chain constant region:

[SEQ ID NO: 45]
EDLKNVFPPEVAVFEPSEAEISHTQKATLVCLATGFYPDHVELSWWVN

GKEVHSGVSTDPQPLKEQPALNDSRYCLSSRLRVSATFWQNPRNHFRC

QVQFYGLSENDEWTQDRAKPVTQIVSAEAWGRADCGFTSESYQQGVLS

ATILYEILLGKATLYAVLVSALVLMAMVKRKDSRG

V. Immunoresponsive Cells

The presently disclosed subject matter provides cells comprising a TCR targeting a mutant PIK3CA peptide, e.g., a TCR disclosed herein. Such cells are administered to a human subject in need thereof for treating and/or preventing a neoplasm, e.g., breast cancer. In certain embodiments, the cell is an immunoresponsive cell.

The presently disclosed subject matter provides immunoresponsive cells comprising a TCR that specifically binds to a mutant PIK3CA peptide (e.g., a human mutant PIK3CA peptide) as described above.

The immunoresponsive cells can be transduced with a presently disclosed TCR such that the cells express the TCR. The presently disclosed subject matter also provides methods of using such cells for the treatment of a neoplasm, e.g., breast cancer.

The immunoresponsive cells of the presently disclosed subject matter can be cells of the lymphoid lineage. The lymphoid lineage, comprising B, T and natural killer (NK) cells, provides for the production of TCRs, regulation of the cellular immune system, detection of foreign agents in the blood, detection of cells foreign to the host, and the like. Non-limiting examples of immunoresponsive cells of the lymphoid lineage include T cells, Natural Killer (NK) cells, embryonic stem cells, and pluripotent stem cells (e.g., those from which lymphoid cells may be differentiated). T cells can be lymphocytes that mature in the thymus and are chiefly responsible for cell-mediated immunity. T cells are involved in the adaptive immune system. The T cells of the presently disclosed subject matter can be any type of T cells, including, but not limited to, T helper cells, cytotoxic T cells, memory T cells (including central memory T cells, stem-cell-like memory T cells (or stem-like memory T cells), and two types of effector memory T cells: e.g., $T_{EM}$ cells and $T_{EMRA}$ cells, Regulatory T cells (also known as suppressor T cells), Natural killer T cells, Mucosal associated invariant T cells, and γδ T cells. Cytotoxic T cells (CTL or killer T cells) are a subset of T lymphocytes capable of inducing the death of infected somatic or tumor cells. In certain embodiments, the TCR-expressing T cells express Foxp3 to achieve and maintain a T regulatory phenotype.

Natural killer (NK) cells can be lymphocytes that are part of cell-mediated immunity and act during the innate immune response. NK cells do not require prior activation in order to perform their cytotoxic effect on target cells.

The immunoresponsive cells of the presently disclosed subject matter can express a TCR that specifically binds to a mutant PIK3CA peptide (e.g., a human mutant PIK3CA peptide), for treating cancer, e.g., breast cancer. Such immunoresponsive cells can be administered to a subject (e.g., a human subject) in need thereof for the treatment of cancer, e.g., breast cancer. In certain embodiments, the immunoresponsive cell is a T cell. The T cell can be a CD4$^+$ T cell or a CD8$^+$ T cell. In certain embodiments, the T cell is a CD4$^+$ T cell. In certain embodiments, the T cell is a CD8$^+$ T cell.

A presently disclosed immunoresponsive cell can further include at least one recombinant or exogenous co-stimulatory ligand. For example, a presently disclosed immunoresponsive cell can be further transduced with at least one co-stimulatory ligand, such that the immunoresponsive cell co-expresses or is induced to co-express the PIK3CA-targeted TCR and the at least one co-stimulatory ligand. The interaction between the PIK3CA-targeted TCR and at least one co-stimulatory ligand provides a non-antigen-specific signal important for full activation of an immunoresponsive cell (e.g., T cell). Co-stimulatory ligands include, but are not limited to, members of the tumor necrosis factor (TNF) superfamily, and immunoglobulin (Ig) superfamily ligands. TNF is a cytokine involved in systemic inflammation and stimulates the acute phase reaction. Its primary role is in the regulation of immune cells. Members of TNF superfamily share a number of common features. The majority of TNF superfamily members are synthesized as type II transmembrane proteins (extracellular C-terminus) containing a short cytoplasmic segment and a relatively long extracellular region. TNF superfamily members include, without limitation, nerve growth factor (NGF), CD40L (CD40L)/CD154, CD137L/4-1BBL, TNF-α, CD134L/OX40L/CD252, CD27L/CD70, Fas ligand (FasL), CD30L/CD153, tumor necrosis factor beta (TNFβ)/lymphotoxin-alpha (LTα), lymphotoxin-beta (LTβ), CD257/B cell-activating factor (BAFF)/Blys/THANK/Tall-1, glucocorticoid-induced TNF Receptor ligand (GITRL), and TNF-related apoptosis-inducing ligand (TRAIL), LIGHT (TNFSF14). The immunoglobulin (Ig) superfamily is a large group of cell surface and soluble proteins that are involved in the recognition, binding, or adhesion processes of cells. These proteins share structural features with immunoglobulins—they possess an immunoglobulin domain (fold). Immunoglobulin superfamily ligands include, but are not limited to, CD80 and CD86, both ligands for CD28, PD-L1/(B7-H1) that ligands for PD-1. In certain embodiments, the at least one co-stimulatory ligand is selected from the group consisting of 4-1BBL, CD80, CD86, CD70, OX40L, CD48, TNFRSF14, PD-L1, and combinations thereof. In certain embodiments, the immunoresponsive cell comprises one recombinant co-stimulatory ligand that is 4-1BBL. In certain embodiments, the immunoresponsive cell comprises two recombinant co-stimulatory ligands that are 4-1BBL and CD80.

Furthermore, a presently disclosed immunoresponsive cell can further comprise at least one exogenous cytokine. For example, a presently disclosed immunoresponsive cell can be further transduced with at least one cytokine, such that the immunoresponsive cell secretes the at least one cytokine as well as expresses the mutant PIK3CA-targeted TCR. In certain embodiments, the at least one cytokine is selected from the group consisting of IL-2, IL-3, IL-6, IL-7, IL-11, IL-12, IL-15, IL-17, IL-18, and IL-21. In certain embodiments, the cytokine is IL-12.

The mutant PIK3CA peptide-specific or mutant PIK3CA-targeted human lymphocytes that can be used in peripheral donor lymphocytes, e.g., those disclosed in Sadelain, M., et al. 2003 *Nat Rev Cancer* 3:35-45 (disclosing peripheral donor lymphocytes genetically modified to express TCRs), in Morgan, R. A., et al. 2006 *Science* 314:126-129 (disclosing peripheral donor lymphocytes genetically modified to express a full-length tumor antigen-recognizing T cell receptor complex comprising the a and β heterodimer), in Panelli, M. C., et al. 2000 *J Immunol* 164:495-504; Panelli, M. C., et al. 2000 *J Immunol* 164:4382-4392 (disclosing lymphocyte cultures derived from tumor infiltrating lymphocytes (TILs) in tumor biopsies), and in Dupont, J., et al. 2005

Cancer Res 65:5417-5427; Papanicolaou, G. A., et al. 2003 Blood 102:2498-2505 (disclosing selectively in vitro-expanded antigen-specific peripheral blood leukocytes employing artificial antigen-presenting cells (AAPCs) or pulsed dendritic cells). The immunoresponsive cells (e.g., T cells) can be autologous, non-autologous (e.g., allogeneic), or derived in vitro from engineered progenitor or stem cells.

The unpurified source of CTLs may be any known in the art, such as the bone marrow, fetal, neonate or adult or other hematopoietic cell source, e.g., fetal liver, peripheral blood or umbilical cord blood. Various techniques can be employed to separate the cells. For instance, negative selection methods can remove non-CTLs initially.

A large proportion of terminally differentiated cells can be initially removed by a relatively crude separation. For example, magnetic bead separations can be used initially to remove large numbers of irrelevant cells. Preferably, at least about 80%, usually at least about 70% of the total hematopoietic cells will be removed prior to cell isolation.

Procedures for separation include, but are not limited to, density gradient centrifugation; resetting; coupling to particles that modify cell density; magnetic separation with TCR-coated magnetic beads; affinity chromatography; cytotoxic agents joined to or used in conjunction with a mAb, including, but not limited to, complement and cytotoxins; and panning with TCR attached to a solid matrix, e.g. plate, chip, elutriation or any other convenient technique.

Techniques for separation and analysis include, but are not limited to, flow cytometry, which can have varying degrees of sophistication, e.g., a plurality of color channels, low angle and obtuse light scattering detecting channels, impedance channels.

The cells can be selected against dead cells, by employing dyes associated with dead cells such as propidium iodide (PI). Preferably, the cells are collected in a medium comprising 2% fetal calf serum (FCS) or 0.2% bovine serum albumin (BSA) or any other suitable, preferably sterile, isotonic medium.

VI. Vectors

Genetic modification of immunoresponsive cells (e.g., T cells, NK cells) can be accomplished by transducing a substantially homogeneous cell composition with a recombinant DNA or RNA construct. The vector can be a retroviral vector (e.g., gamma retroviral), which is employed for the introduction of the DNA or RNA construct into the host cell genome. For example, a polynucleotide encoding the mutant PIK3CA-targeted TCR can be cloned into a retroviral vector and expression can be driven from its endogenous promoter, from the retroviral long terminal repeat, or from an alternative internal promoter.

Non-viral vectors or RNA may be used as well. Random chromosomal integration, or targeted integration (e.g., using a nuclease, transcription activator-like effector nucleases (TALENs), Zinc-finger nucleases (ZFNs), and/or clustered regularly interspaced short palindromic repeats (CRISPRs), or transgene expression (e.g., using a natural or chemically modified RNA) can be used.

For initial genetic modification of the cells to provide mutant PIK3CA-targeted TCR expressing cells, a retroviral vector is generally employed for transduction, however any other suitable viral vector or non-viral delivery system can be used. For subsequent genetic modification of the cells to provide cells comprising an antigen presenting complex comprising at least two co-stimulatory ligands, retroviral gene transfer (transduction) likewise proves effective. Combinations of retroviral vector and an appropriate packaging line are also suitable, where the capsid proteins will be functional for infecting human cells. Various amphotropic virus-producing cell lines are known, including, but not limited to, PA12 (Miller, et al. (1985) Mol. Cell. Biol. 5:431-437); PA317 (Miller, et al. (1986) Mol. Cell. Biol. 6:2895-2902); and CRIP (Danos, et al. (1988) Proc. Natl. Acad. Sci. USA 85:6460-6464). Non-amphotropic particles are suitable too, e.g., particles pseudotyped with VSVG, RD114 or GALV envelope and any other known in the art.

Possible methods of transduction also include direct co-culture of the cells with producer cells, e.g., by the method of Bregni, et al. (1992) Blood 80:1418-1422, or culturing with viral supernatant alone or concentrated vector stocks with or without appropriate growth factors and polycations, e.g., by the method of Xu, et al. (1994) Exp. Hemat. 22:223-230; and Hughes, et al. (1992) J. Clin. Invest. 89:1817.

Transducing viral vectors can be used to express a co-stimulatory ligand and/or secrets a cytokine (e.g., 4-1BBL and/or IL-12) in an immunoresponsive cell. Preferably, the chosen vector exhibits high efficiency of infection and stable integration and expression (see, e.g., Cayouette et al., Human Gene Therapy 8:423-430, 1997; Kido et al., Current Eye Research 15:833-844, 1996; Bloomer et al., Journal of Virology 71:6641-6649, 1997; Naldini et al., Science 272: 263 267, 1996; and Miyoshi et al., Proc. Natl. Acad. Sci. U.S.A. 94:10319, 1997). Other viral vectors that can be used include, for example, adenoviral, lentiviral, and adeno-associated viral vectors, vaccinia virus, a bovine papilloma virus, or a herpes virus, such as Epstein-Barr Virus (also see, for example, the vectors of Miller, Human Gene Therapy 15-14, 1990; Friedman, Science 244:1275-1281, 1989; Eglitis et al., BioTechniques 6:608-614, 1988; Tolstoshev et al., Current Opinion in Biotechnology 1:55-61, 1990; Sharp, The Lancet 337:1277-1278, 1991; Cornetta et al., Nucleic Acid Research and Molecular Biology 36:311-322, 1987; Anderson, Science 226:401-409, 1984; Moen, Blood Cells 17:407-416, 1991; Miller et al., Biotechnology 7:980-990, 1989; Le Gal La Salle et al., Science 259:988-990, 1993; and Johnson, Chest 107:77S-83S, 1995). Retroviral vectors are particularly well developed and have been used in clinical settings (Rosenberg et al., N. Engl. J. Med 323:370, 1990; Anderson et al., U.S. Pat. No. 5,399,346).

In certain non-limiting embodiments, the vector expressing a presently disclosed mutant PIK3CA-targeted TCR is a retroviral vector, e.g., an oncoretroviral vector.

Non-viral approaches can also be employed for the expression of a protein in cell. For example, a nucleic acid molecule can be introduced into a cell by administering the nucleic acid in the presence of lipofection (Feigner et al., Proc. Nat'l. Acad. Sci. U.S.A. 84:7413, 1987; Ono et al., Neuroscience Letters 17:259, 1990; Brigham et al., Am. J. Med. Sci. 298:278, 1989; Staubinger et al., Methods in Enzymology 101:512, 1983), asialoorosomucoid-polylysine conjugation (Wu et al., Journal of Biological Chemistry 263:14621, 1988; Wu et al., Journal of Biological Chemistry 264:16985, 1989), or by micro-injection under surgical conditions (Wolff et al., Science 247:1465, 1990). Other non-viral means for gene transfer include transfection in vitro using calcium phosphate, DEAE dextran, electroporation, and protoplast fusion. Liposomes can also be potentially beneficial for delivery of DNA into a cell. Transplantation of normal genes into the affected tissues of a subject can also be accomplished by transferring a normal nucleic acid into a cultivatable cell type ex vivo (e.g., an autologous or heterologous primary cell or progeny thereof), after which the cell (or its descendants) are injected into a targeted tissue or are injected systemically. Recombinant receptors can also be derived or obtained using transposases or targeted nucleases (e.g., Zinc finger nucleases, meganucleases, or TALE nucleases). Transient expression may be obtained by RNA electroporation.

cDNA expression for use in polynucleotide therapy methods can be directed from any suitable promoter (e.g., the human cytomegalovirus (CMV), simian virus 40 (SV40), or metallothionein promoters), and regulated by any appropriate mammalian regulatory element or intron (e.g., the elongation factor 1a enhancer/promoter/intron structure). For example, if desired, enhancers known to preferentially direct gene expression in specific cell types can be used to direct the expression of a nucleic acid. The enhancers used can include, without limitation, those that are characterized as tissue- or cell-specific enhancers. Alternatively, if a genomic clone is used as a therapeutic construct, regulation can be mediated by the cognate regulatory sequences or, if desired, by regulatory sequences derived from a heterologous source, including any of the promoters or regulatory elements described above.

The resulting cells can be grown under conditions similar to those for unmodified cells, whereby the modified cells can be expanded and used for a variety of purposes.

VII. Genomic Integration into Immunoresponsive Cell

In certain embodiments, a presently disclosed TCR can be integrated into a selected locus of the genome of an immunoresponsive cell. Any targeted genome editing methods can be used to integrate the TCR in selected loci of the genome of an immunoresponsive cell. In certain embodiments, the expression of the TCR is driven by an endogenous promoter/enhancer within or near the locus. In certain embodiments, the expression of the TCR is driven by an exogenous promoter integrated into the locus. The locus where the TCR is integrated is selected based on the expression level of the genes within the locus, and timing of the gene expression of the genes within the locus. The expression level and timing can vary under different stages of cell differentiation and mitogen/cytokine microenvironment, which are among the factors to be considered when making the selection.

In certain embodiments, the CRISPR system is used to integrate the TCR in selected loci of the genome of an immunoresponsive cell. Clustered regularly-interspaced short palindromic repeats (CRISPR) system is a genome editing tool discovered in prokaryotic cells. When utilized for genome editing, the system includes Cas9 (a protein able to modify DNA utilizing crRNA as its guide), CRISPR RNA (crRNA, contains the RNA used by Cas9 to guide it to the correct section of host DNA along with a region that binds to tracrRNA (generally in a hairpin loop form) forming an active complex with Cas9), trans-activating crRNA (tracrRNA, binds to crRNA and forms an active complex with Cas9), and an optional section of DNA repair template (DNA that guides the cellular repair process allowing insertion of a specific DNA sequence). CRISPR/Cas9 often employs a plasmid to transfect the target cells. The crRNA needs to be designed for each application as this is the sequence that Cas9 uses to identify and directly bind to the target DNA in a cell. The repair template carrying TCR expression cassette need also be designed for each application, as it must overlap with the sequences on either side of the cut and code for the insertion sequence. Multiple crRNA's and the tracrRNA can be packaged together to form a single-guide RNA (sgRNA). This sgRNA can be joined together with the Cas9 gene and made into a plasmid in order to be transfected into cells. Methods of using the CRISPR system are described, for example, in WO 2014093661 A2, WO 2015123339 A1 and WO 2015089354 A1, which are incorporated by reference in their entireties.

In certain embodiments, zinc-finger nucleases are used to integrate the TCR in selected loci of the genome of an immunoresponsive cell. A zinc-finger nuclease (ZFN) is an artificial restriction enzyme, which is generated by combining a zinc finger DNA-binding domain with a DNA-cleavage domain. A zinc finger domain can be engineered to target specific DNA sequences which allows a zinc-finger nuclease to target desired sequences within genomes. The DNA-binding domains of individual ZFNs typically contain a plurality of individual zinc finger repeats and can each recognize a plurality of basepairs. The most common method to generate new zinc-finger domain is to combine smaller zinc-finger "modules" of known specificity. The most common cleavage domain in ZFNs is the non-specific cleavage domain from the type IIs restriction endonuclease FokI. Using the endogenous homologous recombination (HR) machinery and a homologous DNA template carrying TCR expression cassette, ZFNs can be used to insert the TCR expression cassette into genome. When the targeted sequence is cleaved by ZFNs, the HR machinery searches for homology between the damaged chromosome and the homologous DNA template, and then copies the sequence of the template between the two broken ends of the chromosome, whereby the homologous DNA template is integrated into the genome. Methods of using the ZFN system are described, for example, in WO 2009146179 A1, WO 2008060510 A2 and CN 102174576 A, which are incorporated by reference in their entireties.

In certain embodiments, the TALEN system is used to integrate the TCR in selected loci of the genome of an immunoresponsive cell. Transcription activator-like effector nucleases (TALEN) are restriction enzymes that can be engineered to cut specific sequences of DNA. TALEN system operates on almost the same principle as ZFNs. They are generated by combining a transcription activator-like effectors DNA-binding domain with a DNA cleavage domain. Transcription activator-like effectors (TALEs) are composed of 33-34 amino acid repeating motifs with two variable positions that have a strong recognition for specific nucleotides. By assembling arrays of these TALEs, the TALE DNA-binding domain can be engineered to bind desired DNA sequence, and thereby guide the nuclease to cut at specific locations in genome. Methods of using the TALEN system are described, for example, in WO 2014134412 A1, WO 2013163628 A2 and WO 2014040370 A1, which are incorporated by reference in their entireties.

Methods for delivering the genome editing agents can vary depending on the need. In certain embodiments, the components of a selected genome editing method are delivered as DNA constructs in one or more plasmids. In certain embodiments, the components are delivered via viral vectors. Common delivery methods include but is not limited to, electroporation, microinjection, gene gun, impalefection, hydrostatic pressure, continuous infusion, sonication, magnetofection, adeno-associated viruses, envelope protein pseudotyping of viral vectors, replication-competent vectors cis and trans-acting elements, herpes simplex virus, and chemical vehicles (e.g., oligonucleotides, lipoplexes, polymersomes, polyplexes, dendrimers, inorganic Nanoparticles, and cell-penetrating peptides).

Modification can be made anywhere within the selected locus, or anywhere that can influence gene expression of the integrated TCR. In certain embodiments, the modification is introduced upstream of the transcriptional start site of the integrated TCR. In certain embodiments, the modification is introduced between the transcriptional start site and the protein coding region of the integrated TCR) In certain embodiments, the modification is introduced downstream of the protein coding region of the integrated TCR.

VIII. Polypeptides and Analogs and Polynucleotides

Also included in the presently disclosed subject matter are TCRs that specifically binds to a mutant PIK3CA peptide (e.g., a human mutant PIK3CA peptide) functional fragments thereof, and polynucleotides encoding thereof that are modified in ways that enhance their anti-tumor activity when expressed in an immunoresponsive cell. The presently disclosed subject matter provides methods for optimizing an amino acid sequence or a nucleic acid sequence by producing an alteration in the sequence. Such alterations may comprise certain mutations, deletions, insertions, or post-translational modifications. The presently disclosed subject matter further comprises analogs of any naturally-occurring polypeptide of the presently disclosed subject matter. Analogs can differ from a naturally-occurring polypeptide of the presently disclosed subject matter by amino acid sequence differences, by post-translational modifications, or by both. Analogs of the presently disclosed subject matter can generally exhibit at least about 85%, about 90%, about 91%, about 92%, about 93%, about 94%, about 95%, about 96%, about 97%, about 98%, about 99% or more identity or homology with all or part of a naturally-occurring amino, acid sequence of the presently disclosed subject matter. The length of sequence comparison is at least about 5, about 10, about 15, about 20, about 25, about 50, about 75, about 100 or more amino acid residues. Again, in an exemplary approach to determining the degree of identity, a BLAST program may be used, with a probability score between $e^{-3}$ and $e^{-100}$ indicating a closely related sequence. Modifications comprise in vivo and in vitro chemical derivatization of polypeptides, e.g., acetylation, carboxylation, phosphorylation, or glycosylation; such modifications may occur during polypeptide synthesis or processing or following treatment with isolated modifying enzymes. Analogs can also differ from the naturally-occurring polypeptides of the presently disclosed subject matter by alterations in primary sequence. These include genetic variants, both natural and induced (for example, resulting from random mutagenesis by irradiation or exposure to ethanemethylsulfate or by site-specific mutagenesis as described in Sambrook, Fritsch and Maniatis, Molecular Cloning: A Laboratory Manual (2d ed.), CSH Press, 1989, or Ausubel et al., supra). Also included are cyclized peptides, molecules, and analogs which contain residues other than L-amino acids, e.g., D-amino acids or non-naturally occurring or synthetic amino acids, e.g., beta ($\beta$) or gamma ($\gamma$) amino acids.

In addition to full-length polypeptides, the presently disclosed subject matter also provides fragments of any one of the polypeptides or peptide domains of the presently disclosed subject matter. A fragment can be at least about 5, about 10, about 13, or about 15 amino acids. In some embodiments, a fragment is at least about 20 contiguous amino acids, at least about 30 contiguous amino acids, or at least about 50 contiguous amino acids. In some embodiments, a fragment is at least about 60 to about 80, about 100, about 200, about 300 or more contiguous amino acids. Fragments of the presently disclosed subject matter can be generated by methods known to those of ordinary skill in the art or may result from normal protein processing (e.g., removal of amino acids from the nascent polypeptide that are not required for biological activity or removal of amino acids by alternative mRNA splicing or alternative protein processing events).

Non-protein analogs have a chemical structure designed to mimic the functional activity of a protein of the invention. Such analogs are administered according to methods of the presently disclosed subject matter. Such analogs may exceed the physiological activity of the original polypeptide. Methods of analog design are well known in the art, and synthesis of analogs can be carried out according to such methods by modifying the chemical structures such that the resultant analogs increase the anti-neoplastic activity of the original polypeptide when expressed in an immunoresponsive cell. These chemical modifications include, but are not limited to, substituting alternative R groups and varying the degree of saturation at specific carbon atoms of a reference polypeptide. The protein analogs can be relatively resistant to in vivo degradation, resulting in a more prolonged therapeutic effect upon administration. Assays for measuring functional activity include, but are not limited to, those described in the Examples below.

In accordance with the presently disclosed subject matter, the polynucleotides encoding an extracellular domain that specifically binds to a mutant PIK3CA peptide (e.g., a human mutant PIK3CA peptide) can be modified by codon optimization. Codon optimization can alter both naturally occurring and recombinant gene sequences to achieve the highest possible levels of productivity in any given expression system. Factors that are involved in different stages of protein expression include codon adaptability, mRNA structure, and various cis-elements in transcription and translation. Any suitable codon optimization methods or technologies that are known to ones skilled in the art can be used to modify the polynucleotides of the presently disclosed subject matter, including, but not limited to, OptimumGene™, Encor optimization, and Blue Heron.

X. Administration

The presently disclosed PIK3CA-targeted TCRs and immunoresponsive cells comprising thereof can be provided systemically or directly to a subject for treating and/or preventing a neoplasm. In certain embodiments, the presently disclosed mutant PIK3CA-targeted TCRs and immunoresponsive cells comprising thereof are directly injected into an organ of interest (e.g., an organ affected by a neoplasm). Alternatively or additionally, the presently disclosed mutant PIK3CA-targeted TCRs and immunoresponsive cells comprising thereof are provided indirectly to the organ of interest, for example, by administration into the circulatory system (e.g., the tumor vasculature). Expansion and differentiation agents can be provided prior to, during or after administration of cells and compositions to increase production of T cells in vitro or in vivo.

Mutant PIK3CA-targeted TCRs and immunoresponsive cells comprising thereof of the presently disclosed subject matter can be administered in any physiologically acceptable vehicle, normally intravascularly, although they may also be introduced into bone or other convenient site where the cells may find an appropriate site for regeneration and differentiation (e.g., thymus). In certain embodiments, at least about $1\times10^5$ cells can be administered, eventually reaching about $1 \times 10^{10}$ or more. In certain embodiments, at least about $1 \times 10^6$ cells can be administered. A cell population comprising immunoresponsive cells comprising an mutant PIK3CA-targeted TCR can comprise a purified population of cells. Those skilled in the art can readily determine the percentage of immunoresponsive cells in a cell population using various well-known methods, such as fluorescence activated cell sorting (FACS). The ranges of purity in cell populations comprising genetically modified immunoresponsive cells comprising a mutant PIK3CA peptide-specific TCR can be from about 50% to about 55%, from about 55% to about 60%, from about 65% to about 70%, from about 70% to about 75%, from about 75% to about 80%, from about 80% to about 85%; from about 85% to about 90%, from about 90% to about 95%, or from about 95 to about 100%. Dosages can be readily adjusted by those skilled in the art (e.g., a decrease in purity may require an increase in dosage). The immunoresponsive cells can be introduced by injection, catheter, or the like. If desired, factors can also be included, including, but not limited to, interleukins, e.g. IL-2, IL-3, IL 6, IL-11, IL-7, IL-12, IL-15, IL-21, as well as the other interleukins, the colony stimulating factors, such as G-, M- and GM-CSF, interferons, e.g., y-interferon.

The presently disclosed subject matter further provides compositions comprising presently disclosed immunoresponsive cells comprising a mutant PIK3CA-targeted TCR. In certain embodiments, the composition is a pharmaceutical composition further comprising a pharmaceutically acceptable carrier. Administration can be autologous or non-autologous. For example, immunoresponsive cells comprising a mutant PIK3CA-targeted TCR and compositions comprising thereof can be obtained from one subject, and administered to the same subject or a different, compatible subject. Peripheral blood derived T cells of the presently disclosed subject matter or their progeny (e.g., in vivo, ex vivo or in vitro derived) can be administered via localized injection, including catheter administration, systemic injection, localized injection, intravenous injection, or parenteral administration. When administering a pharmaceutical composition of the presently disclosed subject matter (e.g., a pharmaceutical composition comprising immunoresponsive cells comprising a mutant PIK3CA-targeted TCR), it can be formulated in a unit dosage injectable form (solution, suspension, emulsion).

XI. Formulations

The presently disclosed immunoresponsive cells comprising a presently disclosed mutant PIK3CA-targeted TCR and compositions comprising thereof can be conveniently provided as sterile liquid preparations, e.g., isotonic aqueous solutions, suspensions, emulsions, dispersions, or viscous compositions, which may be buffered to a selected pH. Liquid preparations are normally easier to prepare than gels, other viscous compositions, and solid compositions. Additionally, liquid compositions are somewhat more convenient to administer, especially by injection. Viscous compositions, on the other hand, can be formulated within the appropriate viscosity range to provide longer contact periods with specific tissues. Liquid or viscous compositions can comprise carriers, which can be a solvent or dispersing medium containing, for example, water, saline, phosphate buffered saline, polyol (for example, glycerol, propylene glycol, liquid polyethylene glycol, and the like) and suitable mixtures thereof.

Sterile injectable solutions can be prepared by incorporating the compositions of the presently disclosed subject matter, e.g., a composition comprising immunoresponsive cells comprising a presently disclosed mutant PIK3CA-targeted TCR, in the required amount of the appropriate solvent with various amounts of the other ingredients, as desired. Such compositions may be in admixture with a suitable carrier, diluent, or excipient such as sterile water, physiological saline, glucose, dextrose, or the like. The compositions can also be lyophilized. The compositions can contain auxiliary substances such as wetting, dispersing, or emulsifying agents (e.g., methylcellulose), pH buffering agents, gelling or viscosity enhancing additives, preservatives, flavoring agents, colors, and the like, depending upon the route of administration and the preparation desired. Standard texts, such as "REMINGTON'S PHARMACEUTICAL SCIENCE", 17th edition, 1985, incorporated herein by reference, may be consulted to prepare suitable preparations, without undue experimentation.

Various additives which enhance the stability and sterility of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, sorbic acid, and the like. Prolonged absorption of the injectable pharmaceutical form can be brought about by the use of agents delaying absorption, for example, aluminum monostearate and gelatin. According to the presently disclosed subject matter, however, any vehicle, diluent, or additive used would have to be compatible with the immunoresponsive cells comprising a generally mutant PIK3CA-targeted TCR of the presently disclosed subject matter.

The compositions can be isotonic, i.e., they can have the same osmotic pressure as blood and lacrimal fluid. The desired isotonicity of the compositions of the presently disclosed subject matter may be accomplished using sodium chloride, or other pharmaceutically acceptable agents such as dextrose, boric acid, sodium tartrate, propylene glycol or other inorganic or organic solutes. Sodium chloride is preferred particularly for buffers containing sodium ions.

Viscosity of the compositions, if desired, can be maintained at the selected level using a pharmaceutically acceptable thickening agent. Methylcellulose can be used because it is readily and economically available and is easy to work with. Other suitable thickening agents include, for example, xanthan gum, carboxymethyl cellulose, hydroxypropyl cellulose, carbomer, and the like. The concentration of the thickener can depend upon the agent selected. The important point is to use an amount that will achieve the selected viscosity. Obviously, the choice of suitable carriers and other additives will depend on the exact route of administration and the nature of the particular dosage form, e.g., liquid dosage form (e.g., whether the composition is to be formulated into a solution, a suspension, gel or another liquid form, such as a time release form or liquid-filled form).

Those skilled in the art will recognize that the components of the compositions should be selected to be chemically inert and will not affect the viability or efficacy of the immunoresponsive cells as describe in the presently disclosed subject matter. This will present no problem to those skilled in chemical and pharmaceutical principles, or problems can be readily avoided by reference to standard texts or by simple experiments (not involving undue experimentation), from this disclosure and the documents cited herein.

One consideration concerning the therapeutic use of the immunoresponsive cells of the presently disclosed subject matter is the quantity of cells necessary to achieve an optimal effect. The quantity of cells to be administered will vary for the subject being treated. In certain embodiments, from about $10^4$ to about $10^{10}$, from about $10^5$ to about $10^9$, or from about $10^6$ to about $10^8$ immunoresponsive cells of the presently disclosed subject matter are administered to a subject. More effective cells may be administered in even smaller numbers. In some embodiments, at least about $1\times10^8$, about $2\times10^8$, about $3\times10^8$, about $4\times10^8$, and about $5\times10^8$ immunoresponsive cells of the presently disclosed subject matter are administered to a human subject. The precise determination of what would be considered an effective dose may be based on factors individual to each subject, including their size, age, sex, weight, and condition of the particular subject. Dosages can be readily ascertained by those skilled in the art from this disclosure and the knowledge in the art.

The skilled artisan can readily determine the amount of cells and optional additives, vehicles, and/or carrier in compositions and to be administered in methods of the presently disclosed subject matter. Typically, any additives (in addition to the active cell(s) and/or agent(s)) are present in an amount of from about 0.001% to about 50% by weight) solution in phosphate buffered saline, and the active ingredient is present in the order of micrograms to milligrams, such as from about 0.0001 wt % to about 5 wt %, from about 0.0001 wt % to about 1 wt %, from about 0.0001 wt % to about 0.05 wt %, from about 0.001 wt % to about 20 wt %, from about 0.01 wt % to about 10 wt %, or from about 0.05 wt % to about 5 wt %. For any composition to be administered to an animal or human, and for any particular method of administration, toxicity should be determined, such as by determining the lethal dose (LD) and LD50 in a suitable animal model e.g., rodent such as mouse; and, the dosage of the composition(s), concentration of components therein and timing of administering the composition(s), which elicit a suitable response. Such determinations do not require undue experimentation from the knowledge of the skilled artisan, this disclosure and the documents cited herein. And, the time for sequential administrations can be ascertained without undue experimentation.

XII. Methods of Treatment

Provided herein are methods for treating a neoplasm in a subject. The methods comprise administering the presently disclosed immunoresponsive cells in an amount effective to achieve the desired effect, be it palliation of an existing condition or prevention of recurrence. For treatment, the amount administered is an amount effective in producing the desired effect. An effective amount can be provided in one or a series of administrations. An effective amount can be provided in a bolus or by continuous perfusion.

For adoptive immunotherapy using antigen-specific T cells, cell doses in the range of about $10^6$ to about $10^{10}$ (e.g., about $10^9$ or about $10^6$) are typically infused. Upon administration of the immunoresponsive cells into the subject and subsequent differentiation, the immunoresponsive cells are induced that are specifically directed against one specific antigen (e.g., mutant PIK3CA peptides). "Induction" of T cells can include inactivation of antigen-specific T cells such as by deletion or anergy. Inactivation is particularly useful to establish or reestablish tolerance such as in autoimmune disorders. The immunoresponsive cells of the presently disclosed subject matter can be administered by any methods known in the art, including, but not limited to, pleural administration, intravenous administration, subcutaneous administration, intranodal administration, intratumoral administration, intrathecal administration, intrapleural administration, intraperitoneal administration, and direct administration to the thymus. In certain embodiments, the immunoresponsive cells and the compositions comprising thereof are intravenously administered to the subject in need.

The presently disclosed subject matter provides various methods of using the immunoresponsive cells (e.g., T cells) comprising a mutant PIK3CA-targeted TCR. For example, the presently disclosed subject matter provides methods of reducing tumor burden in a subject. In certain embodiments, the method of reducing tumor burden comprises administering an effective amount of the presently disclosed immunoresponsive cell to the subject. The presently disclosed immunoresponsive cell can reduce the number of tumor cells, reduce tumor size, and/or eradicate the tumor in the subject.

The presently disclosed subject matter also provides methods of increasing or lengthening survival of a subject having a neoplasm. In certain embodiments, the method of increasing or lengthening survival of a subject having a neoplasm comprises administering an effective amount of the presently disclosed immunoresponsive cell to the subject.

Cancers whose growth may be inhibited using the immunoresponsive cells of the presently disclosed subject matter comprise cancers typically responsive to immunotherapy. Non-limiting examples of cancers for treatment include any PIK3CA mutated cancers, including and are not limited to, breast cancer, endometrial cancer, cervical cancer, anal cancer, bladder cancer, colorectal cancer, head and neck squamous cell carcinoma, nonmelanoma skin cancer and salivary gland cancer. In certain embodiments, the cancer is breast cancer.

Additionally, the presently disclosed subject matter provides methods of increasing immune-activating cytokine production in response to a cancer cell in a subject. In certain embodiments, the method comprises administering the presently disclosed immunoresponsive cell to the subject. The immune-activating cytokine can be granulocyte macrophage colony stimulating factor (GM-CSF), IFN-α, IFN-β, IFN-γ, TNF-α, IL-2, IL-3, IL-6, IL-11, IL-7, IL-12, IL-15, IL-21, IL-18, interferon regulatory factor 7 (IRF7), and combinations thereof. In certain embodiments, the immunoresponsive cells comprising a mutant PIK3CA peptide-specific TCR of the presently disclosed subject matter increase the production of GM-CSF, IFN-γ, and/or TNF-α.

Suitable human subjects for therapy typically comprise two treatment groups that can be distinguished by clinical criteria. Subjects with "advanced disease" or "high tumor burden" are those who bear a clinically measurable tumor (e.g., breast cancer). A clinically measurable tumor is one that can be detected on the basis of tumor mass (e.g., by palpation, CAT scan, sonogram, mammogram or X-ray; positive biochemical or histopathologic markers on their own are insufficient to identify this population). A pharmaceutical composition embodied in the presently disclosed subject matter is administered to these subjects to elicit an anti-tumor response, with the objective of palliating their condition. Ideally, reduction in tumor mass occurs as a result, but any clinical improvement constitutes a benefit. Clinical improvement comprises decreased risk or rate of progression or reduction in pathological consequences of the tumor (e.g., breast cancer).

A second group of suitable subjects is known in the art as the "adjuvant group." These are individuals who have had a history of neoplasm (e.g., breast cancer), but have been responsive to another mode of therapy. The prior therapy can have included, but is not restricted to, surgical resection, radiotherapy, and traditional chemotherapy. As a result, these individuals have no clinically measurable tumor. However, they are suspected of being at risk for progression of the disease, either near the original tumor site, or by metastases. This group can be further subdivided into high-risk and low-risk individuals. The subdivision is made on the basis of features observed before or after the initial treatment. These features are known in the clinical arts, and are suitably defined for each different neoplasm. Features typical of high-risk subgroups are those in which the tumor (e.g., breast cancer) has invaded neighboring tissues, or who show involvement of lymph nodes. Another group has a genetic predisposition to neoplasm (e.g., breast cancer) but has not yet evidenced clinical signs of neoplasm (e.g., breast cancer). For instance, women testing positive for a genetic mutation associated with breast cancer, but still of childbearing age, can wish to receive one or more of the TCRs described herein in treatment prophylactically to prevent the occurrence of neoplasm until it is suitable to perform preventive surgery.

The subjects can have an advanced form of disease (e.g., breast cancer), in which case the treatment objective can include mitigation or reversal of disease progression, and/or amelioration of side effects. The subjects can have a history of the condition, for which they have already been treated, in which case the therapeutic objective will typically include a decrease or delay in the risk of recurrence.

XIII. Kits

The presently disclosed subject matter provides kits for the treatment and/or prevention of a neoplasm (e.g., breast cancer). In certain embodiments, the kit comprises a therapeutic or prophylactic composition containing an effective amount of an immunoresponsive cell comprising a mutant PIK3CA-targeted TCR in unit dosage form. In particular embodiments, the cells further expresses at least one co-stimulatory ligand.

If desired, the immunoresponsive cell can be provided together with instructions for administering the cell to a subject having or at risk of developing a neoplasm (e.g., breast cancer). The instructions will generally include information about the use of the composition for the treatment or prevention of a neoplasm (e.g., breast cancer). In other embodiments, the instructions include at least one of the following: description of the therapeutic agent; dosage schedule and administration for treatment or prevention of a neoplasm (e.g., breast cancer) or symptoms thereof; precautions; warnings; indications; counter-indications; overdosage information; adverse reactions; animal pharmacology; clinical studies; and/or references. The instructions may be printed directly on the container (when present), or as a label applied to the container, or as a separate sheet, pamphlet, card, or folder supplied in or with the container.

EXAMPLES

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", second edition (Sambrook, 1989); "Oligonucleotide Synthesis" (Gait, 1984); "Animal Cell Culture" (Freshney, 1987); "Methods in Enzymology" "Handbook of Experimental Immunology" (Weir, 1996); "Gene Transfer Vectors for Mammalian Cells" (Miller and Calos, 1987); "Current Protocols in Molecular Biology" (Ausubel, 1987); "PCR: The Polymerase Chain Reaction", (Mullis, 1994); "Current Protocols in Immunology" (Coligan, 1991). These techniques are applicable to the production of the polynucleotides and polypeptides of the invention, and, as such, may be considered in making and practicing the invention. Particularly useful techniques for particular embodiments will be discussed in the sections that follow.

The following examples are put forth so as to provide those of ordinary skill in the art with a complete disclosure and description of how to make and use the compositions, and assay, screening, and therapeutic methods of the invention, and are not intended to limit the scope of what the inventors regard as their invention.

Example 1

To identify the naturally processed and presented epitope of PIK3CA, the inventors generated transient transfectants by co-electroporating human HLA-A*03:01 with either wildtype (WT) or mutant PIK3CA in the COS-7 monkey cell line. See FIG. 1. Cell surface peptide-MHC complexes were then bound by an anti-Class I antibody, stripped off the cell surface and eluted peptides were purified and sequenced by LC/MS/MS.

As shown in FIG. 2 (upper panel), the skyline analysis depicts enriched signal in the transfectant group that was electroporated with the combination of mutated PIK3CA and HLA-A*03:01. No signal was detected in either WT+ PIK3CA or Mutated PIK3CA+HLA-A*69:01. As shown in FIG. 2 (lower panel), peptide fragmentation spectrum of the enriched signal detected in the mutated PIK3CA+HLA-A*03:01 group showed that the sequence of the enriched peptide is a 9 amino acid peptide with the sequence "ALHGGWTTK" (SEQ ID NO: 11). The amino acid in the peptide is substituted at the P2 position from a histidine to a leucine.

Figure 3:
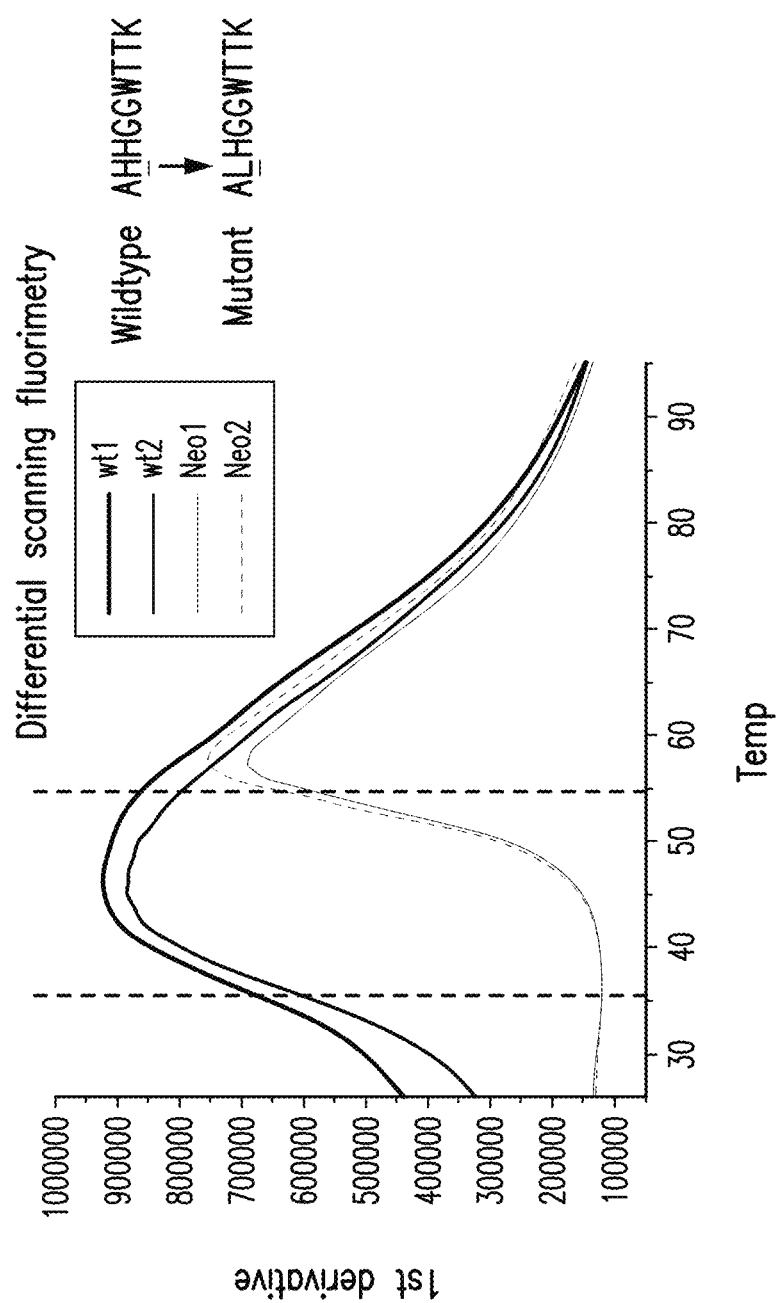
FIG. 3 depicts the results of the differential scanning fluorimetry that was designed to determine relative stability of interaction between HLA-A*03:01 and WT or mutated PIK3CA minimal peptide. Experiments included two technical replicates for each group. This technique used real-time PCR technology to monitor thermally induced protein denaturation. It measured the change in fluorescent signal of a dye that binds preferentially to hydrophobic resides that are exposed as an unstable protein unfolds. Data show stable binding of mutated peptide on the HLA-A*03:01 molecule that was retained even at high temperatures exceeding 54 degrees. In comparison, the WT epitope was not very stable on HLA-A*03:01 with a low melting temperature of 36 degrees. Mutant peptide consists of the sequence set forth in ALHGGWTTK [SEQ ID NO: 11]. Wildtype peptide consists of the sequence set forth in AHHGGWTTK [SEQ ID NO: 46].
Figure 4:
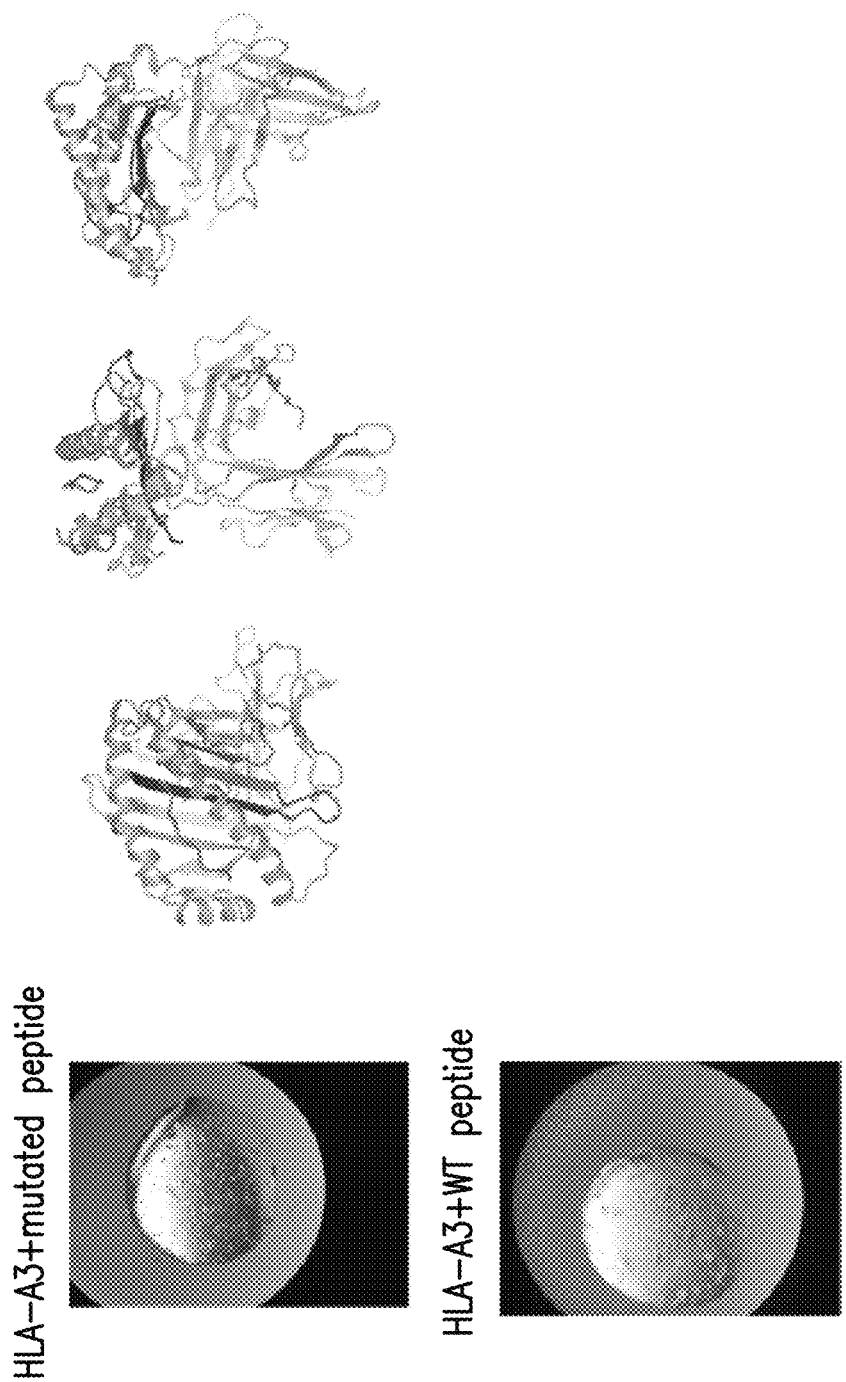
FIG. 4 depicts crystal structures of recombinant HLA-A*03:01 complexed to either the mutated or WT PIK3CA peptide. X-ray crystal structures on the right depict the topography of the mutated peptide sequence (red) contained within the alpha-helical domains (green and blue) of HLA-A*03:01.

Based on the sequence information of the minimal epitope that was loaded on to HLA-A*03:01, differential scanning fluorimetry assay was performed to determine the stability of the bio-physical interaction of the WT and mutant peptides to HLA-A*03:01. The results are shown in FIG. 3. As shown in FIG. 3, the binding of the mutated peptide was thermally significantly more stable than compared to WT peptide. In addition, crystal structures of the peptide-MHC complex for both WT and mutated peptide were generated, as shown in FIG. 4. By in vitro sensitizing healthy donor PBMCs with mutated PIK3CA, a mutation-specific CD8$^+$ T cell clone, 21LT2-2 was identified and isolated. Its TCR sequence was obtained by 10× genomics sequencing, the sequence was cloned into a retroviral vector and transduced to allogeneic donor PBMC.

Figure 5:
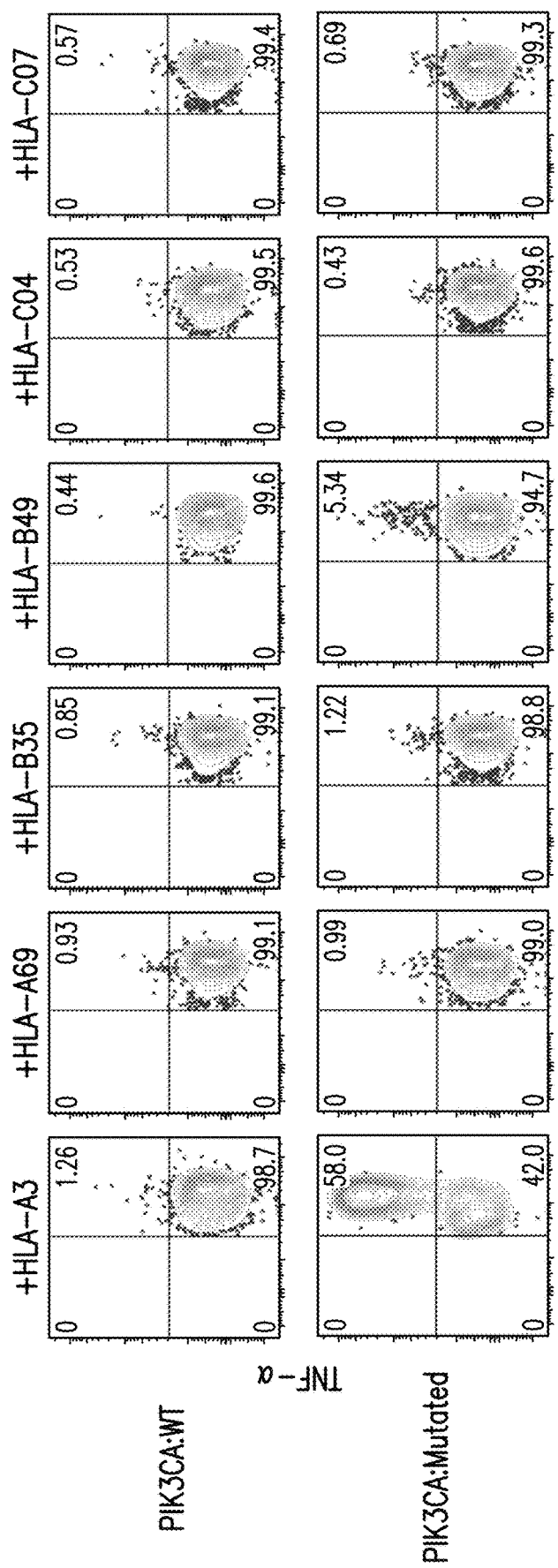
FIG. 5 depicts the identification of HLA-A3 as the restriction element for PIK3CA-mutation specific TCR, 21LT2-2. 21LT2-2 TCR were retrovirally integrated into the genome of non-specific healthy donor T cells. At day 4-6 post-transduction, T cells were incubated with monkey-derived antigen-presenting cells that have been co-electroporated with a single Class I HLA allele, and either the WT or mutated version of the PIK3CA. The mutated version had a histidine to leucine substitution at position 1047 (H1047L). Cells have been gated on CD8+ TCR+ expression. A change in production of the inflammatory cytokine, TNF-α, was used to indicate the presence of mutation-specific reactivity in the context of the right HLA allele. Data demonstrate that 21LT2-2 can recognize mutated H1047L in the context of HLA-A*03:01.

To test the reactivity and restriction element of the isolated TCR, COS-7 cells were electroporated with individual Class I HLA molecules and either WT or mutated PIK3CA, and cocultured with donor T cells that have been transduced with 21LT2-2 TCR. See FIG. 5. It was shown that 21LT2-2 TCR reactivity was specific to the combination of mutant H1047L PIK3CA in the context of HLA-A*03:01, as seen by the upregulation of the inflammatory cytokine, TNF-α.

Figure 7:
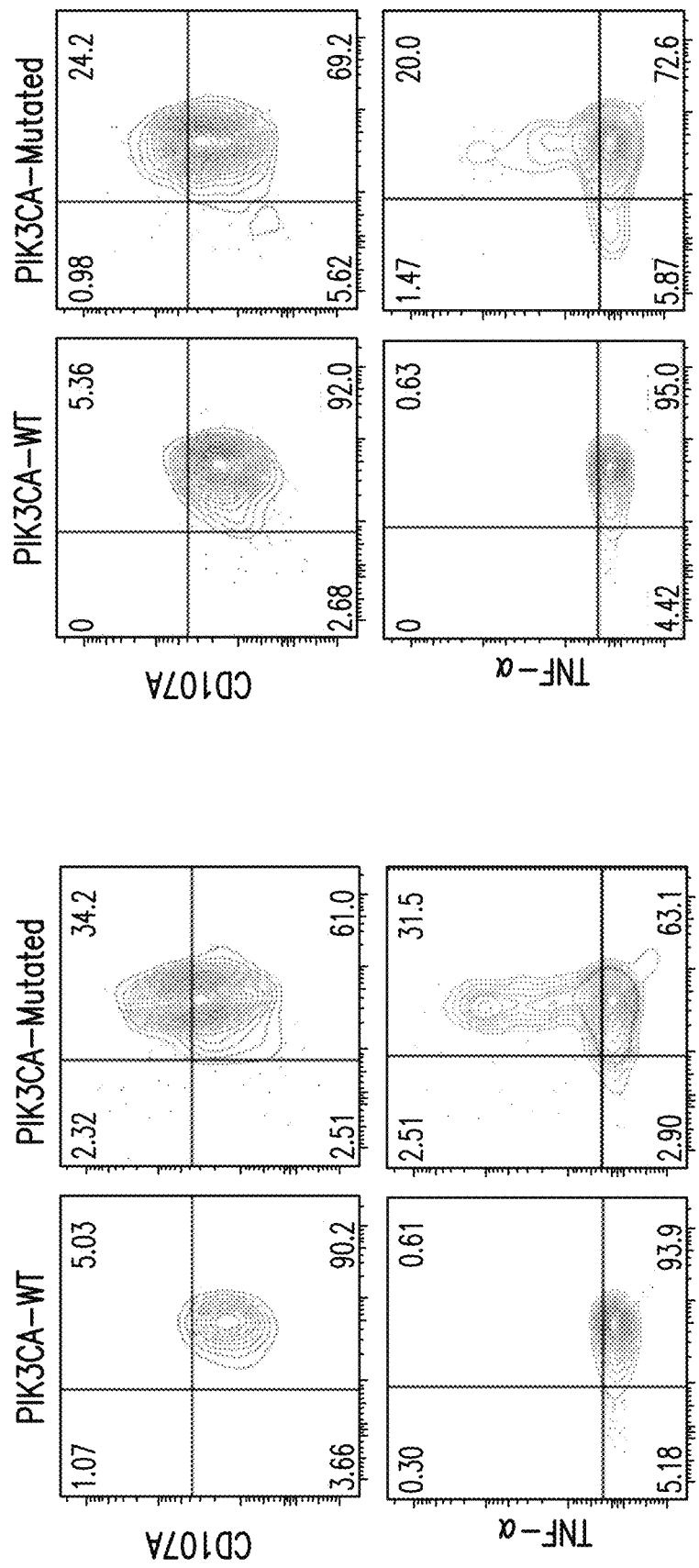
FIG. 7 depicts that PIK3CA-mutant specific TCR, 21LT2-2, was coreceptor-independent. 21LT2-2 TCR were retrovirally integrated into the genome of healthy donor T cells. At day 4-6 post-transduction, T cells were incubated with monkey-derived antigen-presenting cells that have been electroporated with RNA encoding HLA-A*03:01, and (left) either WT or mutated PIK3CA RNA, or (right) pulsed with the minimal 9aa peptide (1 ug/mL). Cells have been gated on CD4$^+$TCR$^+$ expression. A change in production of the CD107A and TNFα, was used to indicate the presence of mutation-specific reactivity in the context of the HLA-A*03: 01. Data demonstrate that 21LT2-2 was also functional within the CD4$^+$ T cell backbone, and did not require the presence of the CD8 coreceptor in order to recognize mutated H1047L.

Next, studies were conducted to determine if 21LT2-2 TCR that was originally isolated from a CD8$^+$ T cell was also functional within a CD4$^+$ T cell, in the absence of the CD8$^+$ coreceptor. TCR$^+$ CD8 and CD4 subsets were segregated and cocultured with two types of target—i) processed and presented antigen or ii) passively pulsed minimal peptide. It was shown that the isolated TCR was CD8 coreceptor independent, since it functioned in both CD8+ (see FIG. 6) and CD4+ (see FIG. 7) T cell subsets, as seen by mutation specific upregulation of CD107a and TNF-α. Lack of coreceptor dependence is generally associated with a high affinity TCR interaction. Further, it was shown that 21LT2-2 TCR can recognize, both, processed and presented antigen, as well as passively-pulsed minimal epitope.

Figure 8:
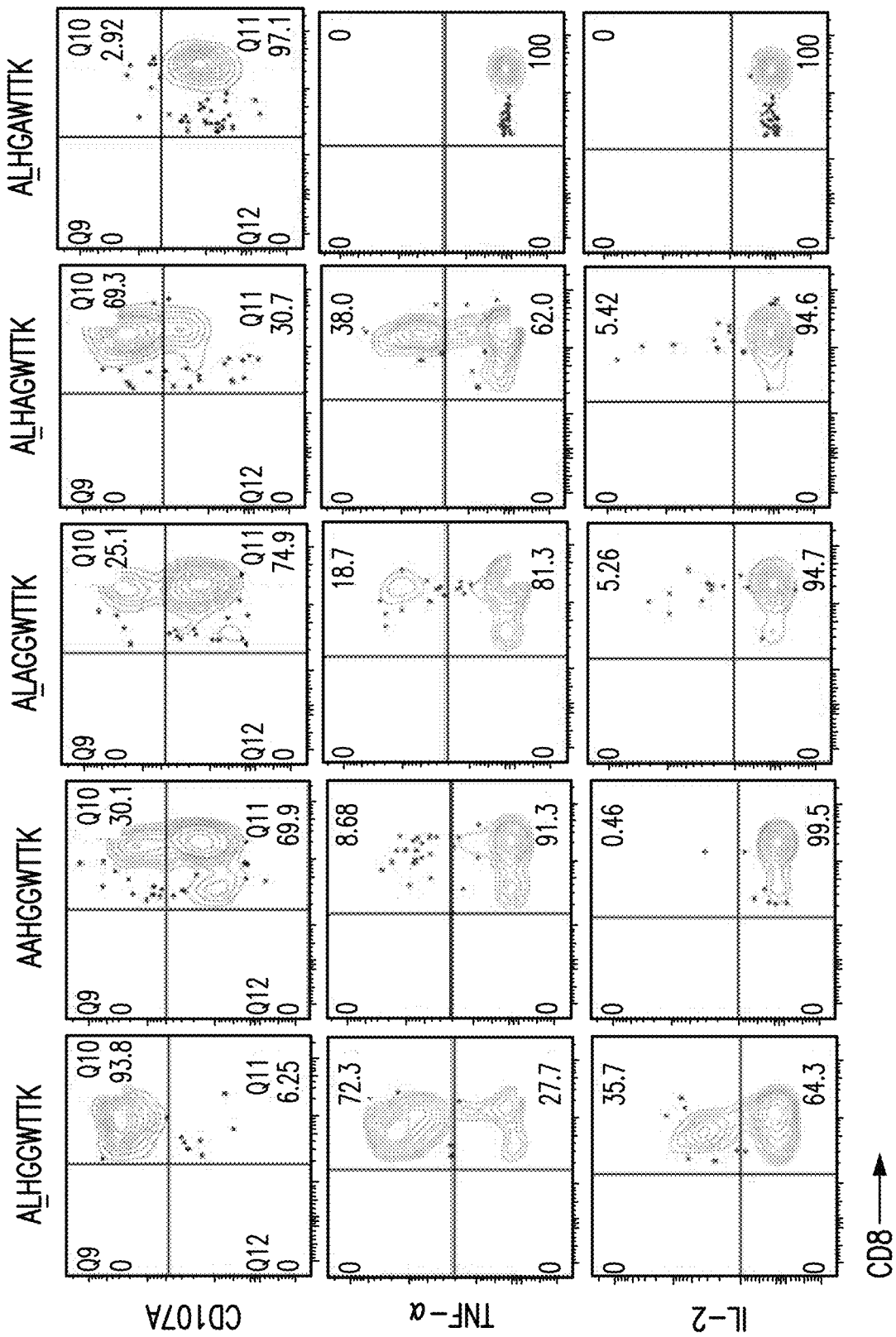
FIG. 8 depicts alanine substitutions showing that all positions except P4 were essential to pMHC:TCR interaction. 21LT2-2 TCR were retrovirally integrated into the genome of healthy donor T cells. At day 4-6 post-transduction, T cells are incubated with monkey-derived antigen-presenting cells that have been electroporated with RNA encoding HLA-A*03:01, and pulsed with alanine-substituted peptides (10 μg/mL). Cells have been gated on CD8$^+$ TCR$^+$ expression. Loss of >50% recognition when pulsed with an alanine-substituted peptide, as compared to the unmodified 9 amino acid mutated sequence (table; mutation in P2), would indicate the importance of the native amino acid at that position for TCR recognition. Data shown here demonstrates that, with the exception of the glycine residue at position 4, all amino acids in the 9 amino acid sequence appear to be critical to the pMHC-TCR interaction. The peptide sequences are, from left to right, SEQ ID NOs: 11-19, respectively.
Figure 8:
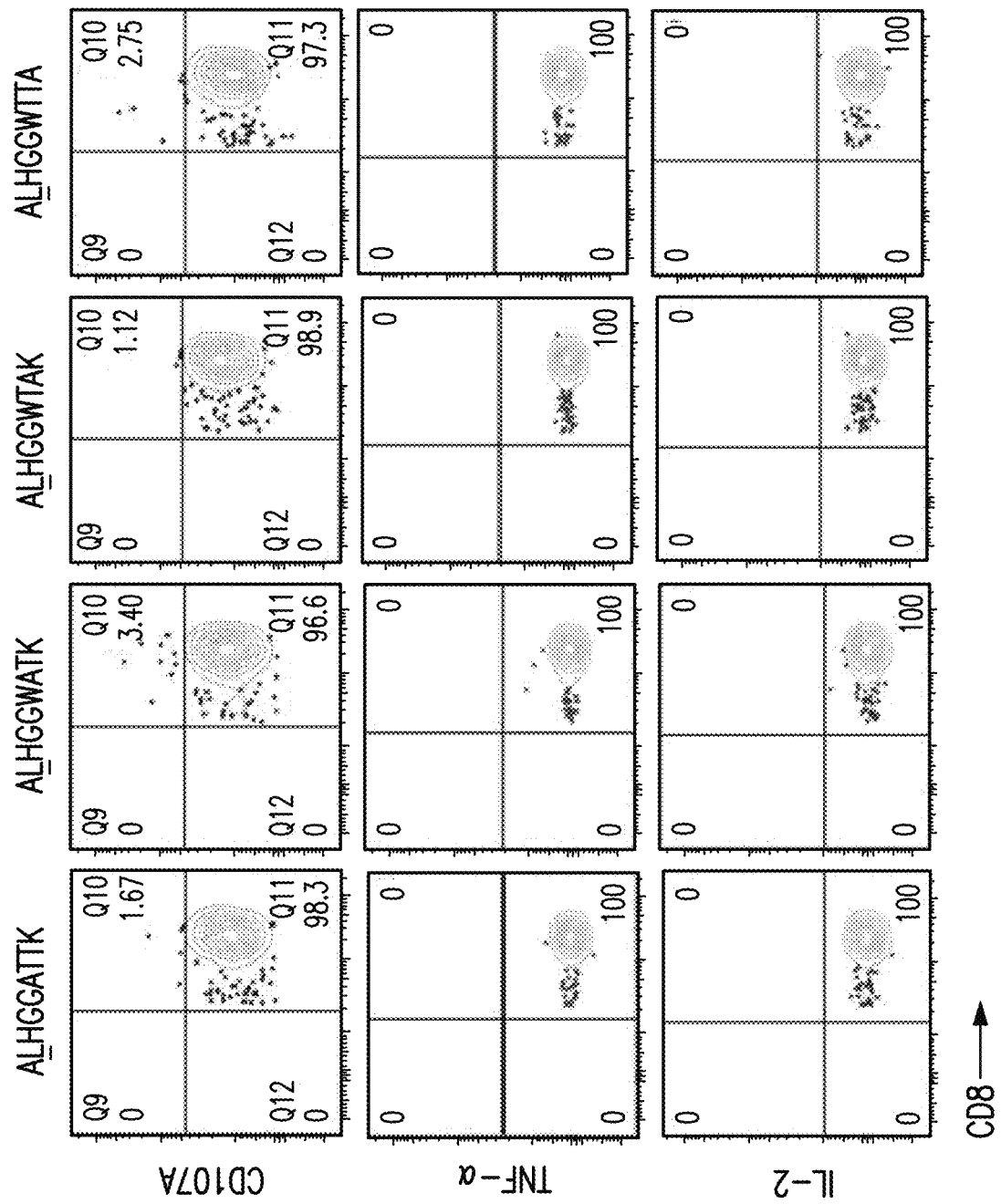

Next, studies were conducted to determine the amino acid residues contained within the minimal epitope that were critical to pMHC-TCR interaction and recognition (see FIG. 8). Alanine peptide substitutions were generated at each position across the 9 amino acid sequence and loss of recognition was investigated, when compared to the unsubstituted mutant sequence. Data show that all positions, except the glycine at P4, were critical to the pMHC-TCR interaction and recognition. Retention of a majority of critical residues, as observed here, potentially limits the number of cross-reactive peptides that could bind and trigger the 21LT2-2 TCR. As shown in FIG. 9, a search using the ScanProsite tool that scans the human proteome for matching sequences did not result in any hits.

Example 2

Figure 10:
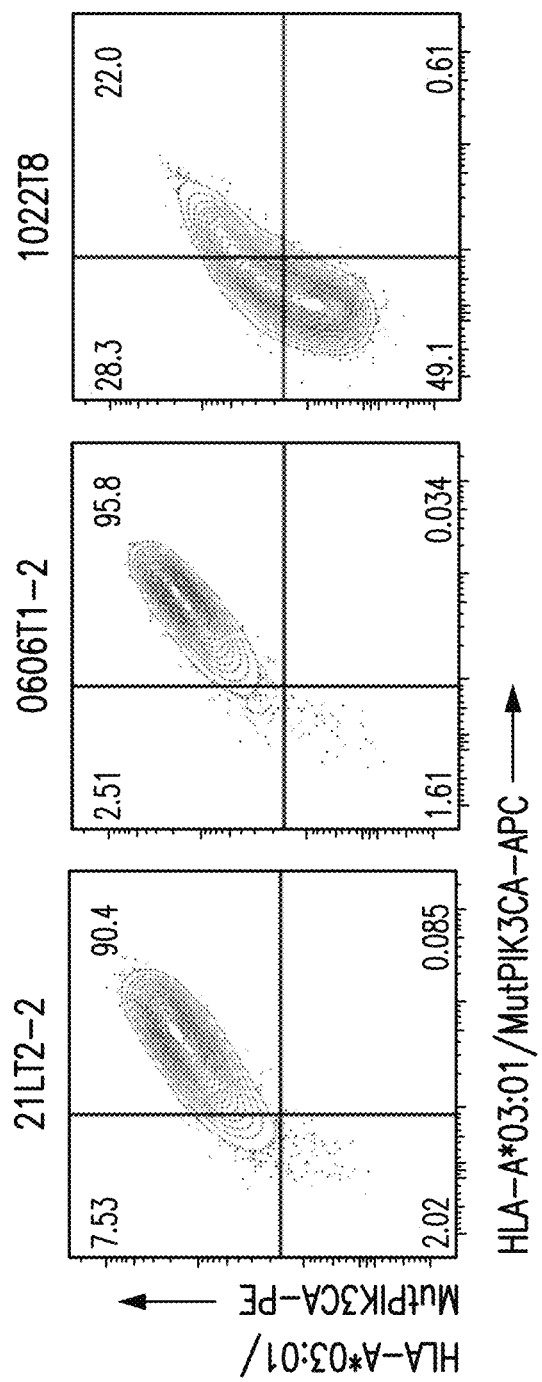
FIG. 10 depicts identification of additional unique T cell receptors that recognize mutated PIK3CA restricted by HLA-A*03:01.

The inventors aimed to establish a library of HLA-A*03:01 mutant-PIK3CA specific TCRs with unique immunological attributes to identify optimal candidates for clinical development. Based on the findings with 21LT2-2, a custom dextramer reagent (a higher order structure of peptide-MHC complexes that is conjugated to a fluorophore) of mutated PIK3CA peptide complexed to HLA-A*03:01 was generated. FIG. 10 shows the dextramer staining profiles of donor T cells retrovirally transduced with identified mutant PIK3CA-specific TCRs, gated on CD8+TCR+ T cells. The three TCRs 21LT2-2, 0606T1-2, 1022T8 were derived from three unique healthy donors. All of them stain positively with the dextramer. Staining profile of 1022T8 was distinct from 21LT2-2 and 0606T1-2 and might be indicative of a lower affinity TCR.

Figure 11:
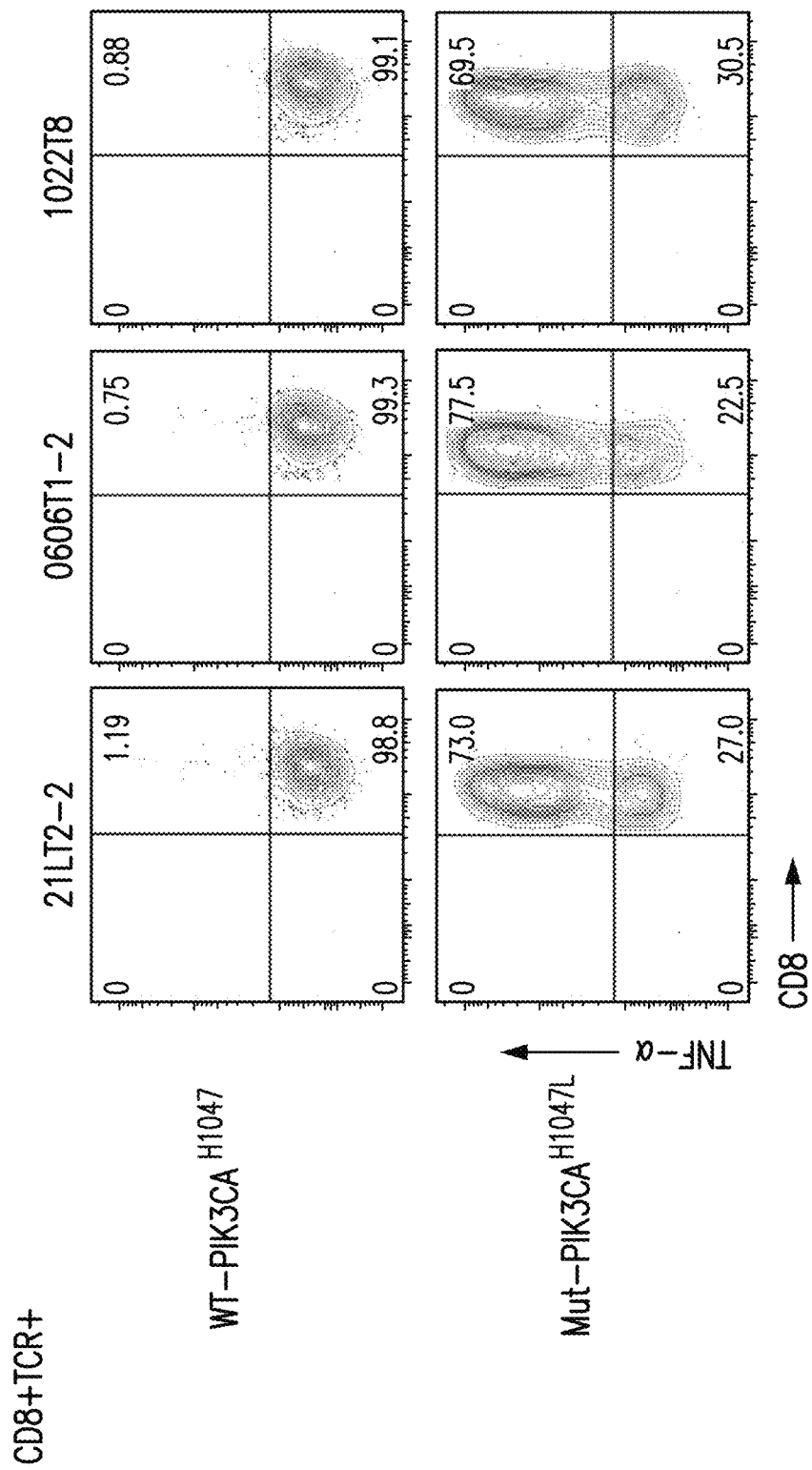
FIG. 11 depicts multiple unique T cell receptors that can recognize mutated PIK3CA restricted by HLA-A*03:01. Cells were gated on CD8+TCR+ cells.
Figure 12:
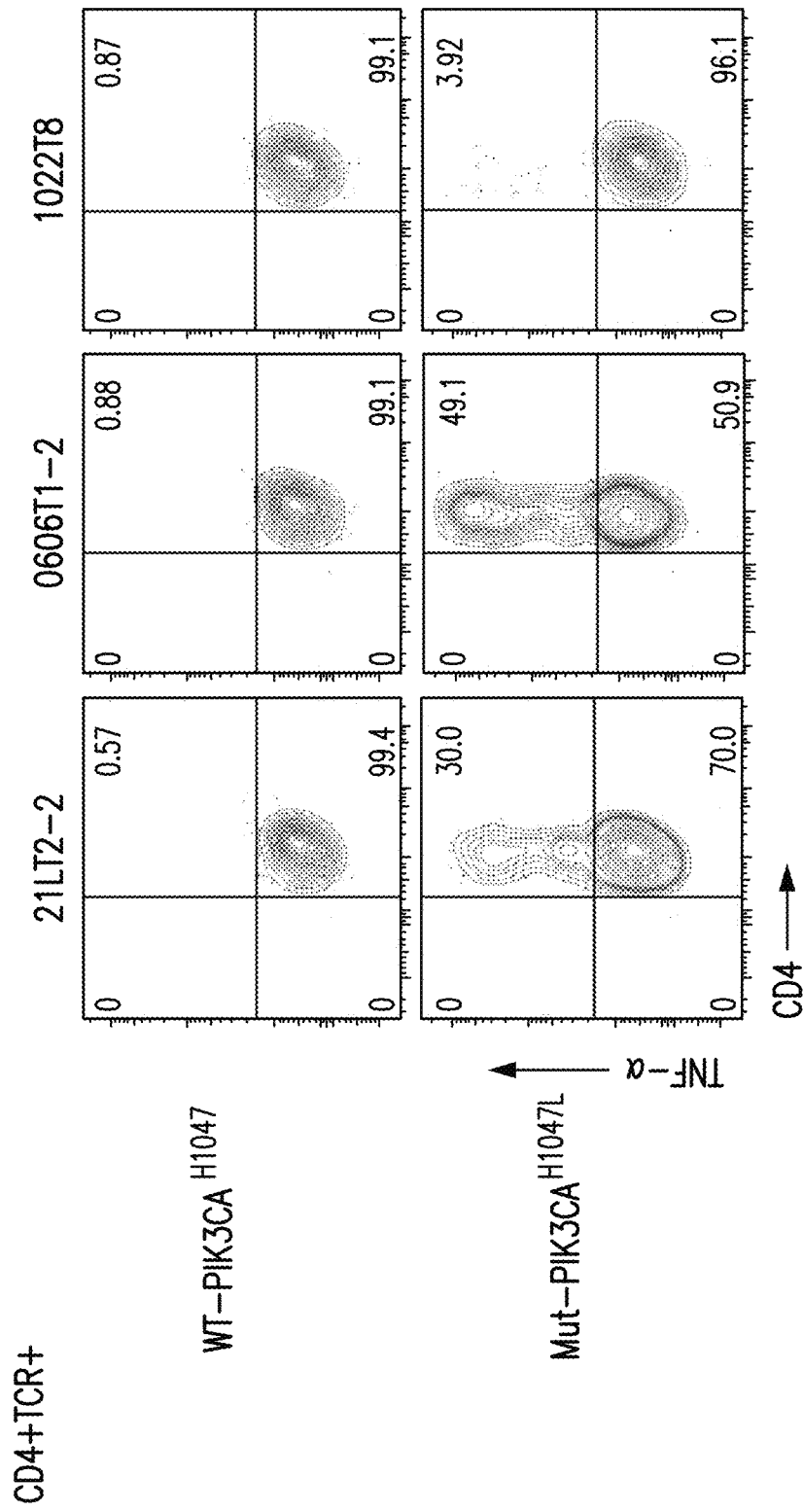
FIG. 12 depicts coreceptor dependence of mutated PIK3CA-specific T cell receptors. Cells were gated on CD4+TCR+ cells.

PIK3CA neoantigen-specific TCRs 21LT2-2, 0606T1-2, 1022T8 were retrovirally integrated into the genome of healthy donor T cells. At day 4-6 post-transduction, T cells are cocultured with artificial antigen presenting cells (aAPCs) that have been electroporated with RNA encoding HLA-A*03:01 with either WT or mutated PIK3CA RNA. Presence of mutation-specific reactivity was assessed by the production of the inflammatory cytokine, TNF-α. The results are shown in FIGS. 11 and 12. The cells shown in FIG. 11 were gated on CD8+TCR+ cells, and the cells shown in FIG. 12 were gated on CD4+TCR+ cells. As shown in FIG. 11, in addition to 21LT2-2, both 0606T1-2 and 1022T8 can recognize endogenously processed and presented mutated antigen that is presented by HLA-A*03:01. As shown in FIG. 12, similar to 21LT2-2, 0606T1-2 was coreceptor independent and can function in CD4+ T cells; and 1022-T8 was a coreceptor-dependent TCR, which suggests it might possess a lower affinity compared to 21LT2-2 and 0606T1-2.

Figure 13:
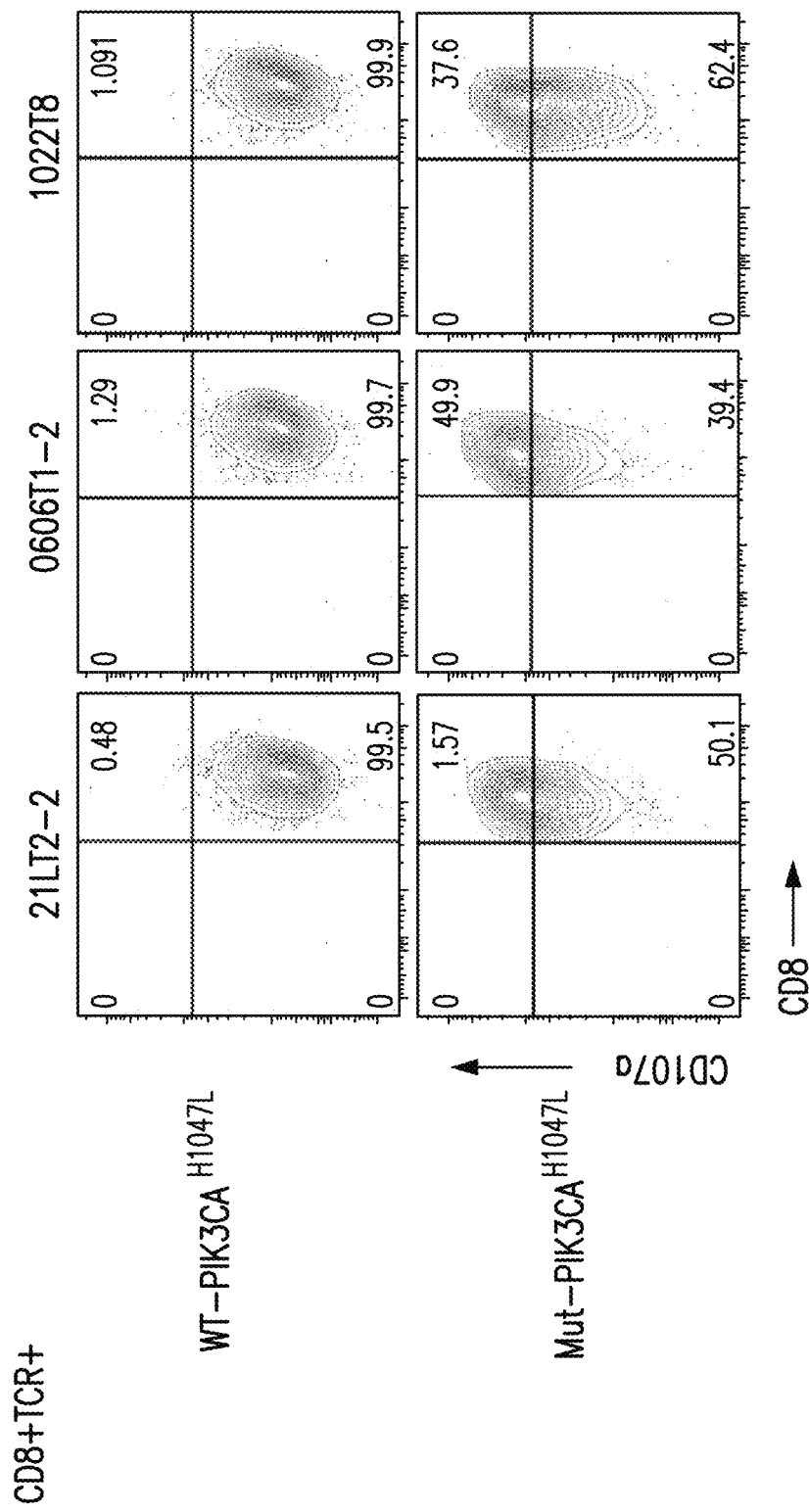
FIG. 13 shows that PIK3CA-neoantigen specific receptors exhibited cytolytic capabilities. Cells were gated on CD8+ TCR+ cells.

Furthermore, the expression of CD107a, a prototypic marker associated with the cytolytic ability, was measured. As shown in FIG. 13, in response to the co-expression of HLA-A*03:01 and mutated PIK3CA, TCR transduced cells upregulated expression of CD107a.

Figure 14A:
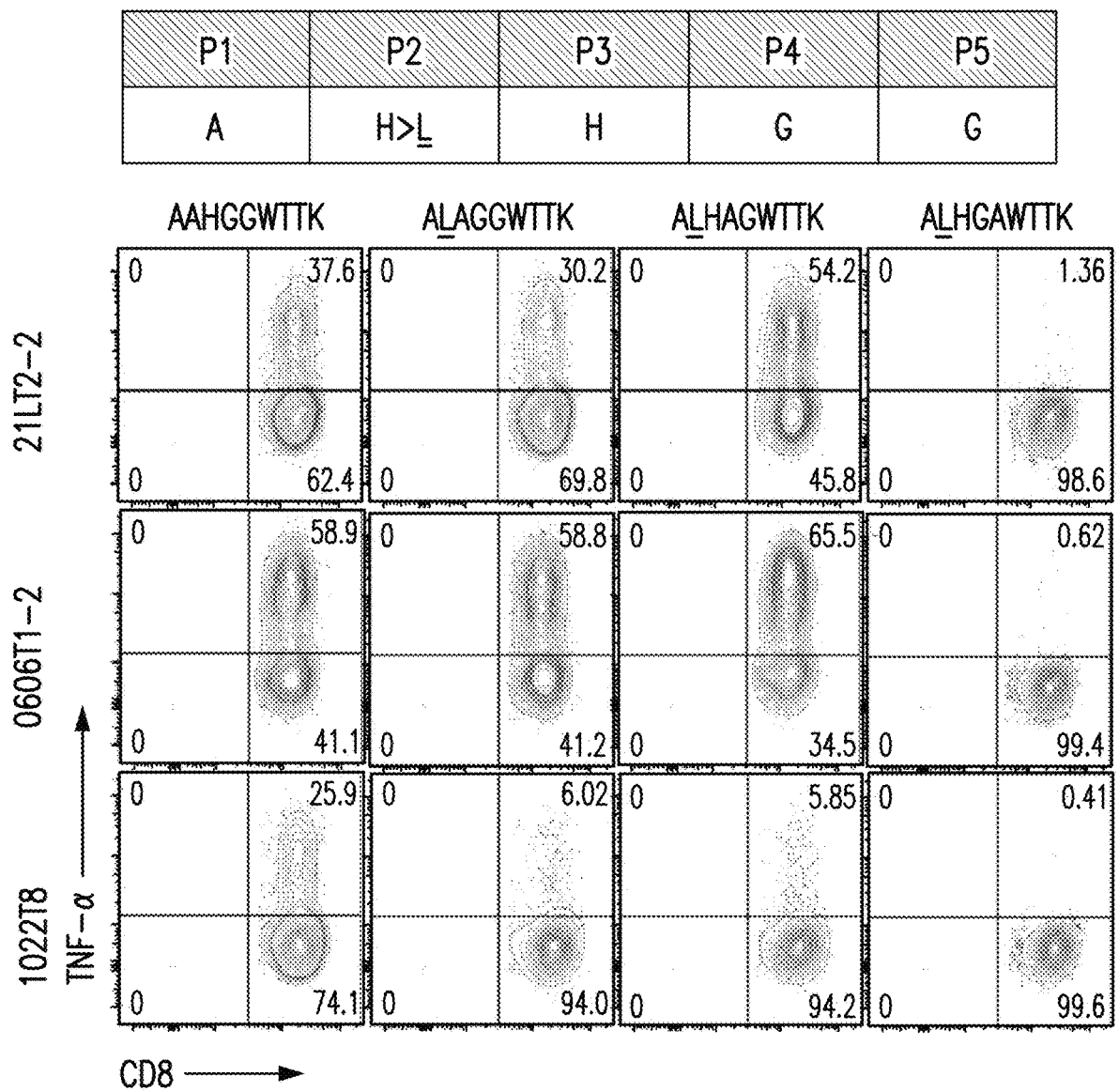
FIGS. 14A-14C depict alanine substituted peptides that showed distinct TCR-HLA/Peptide interaction profiles.
Figure 14B:
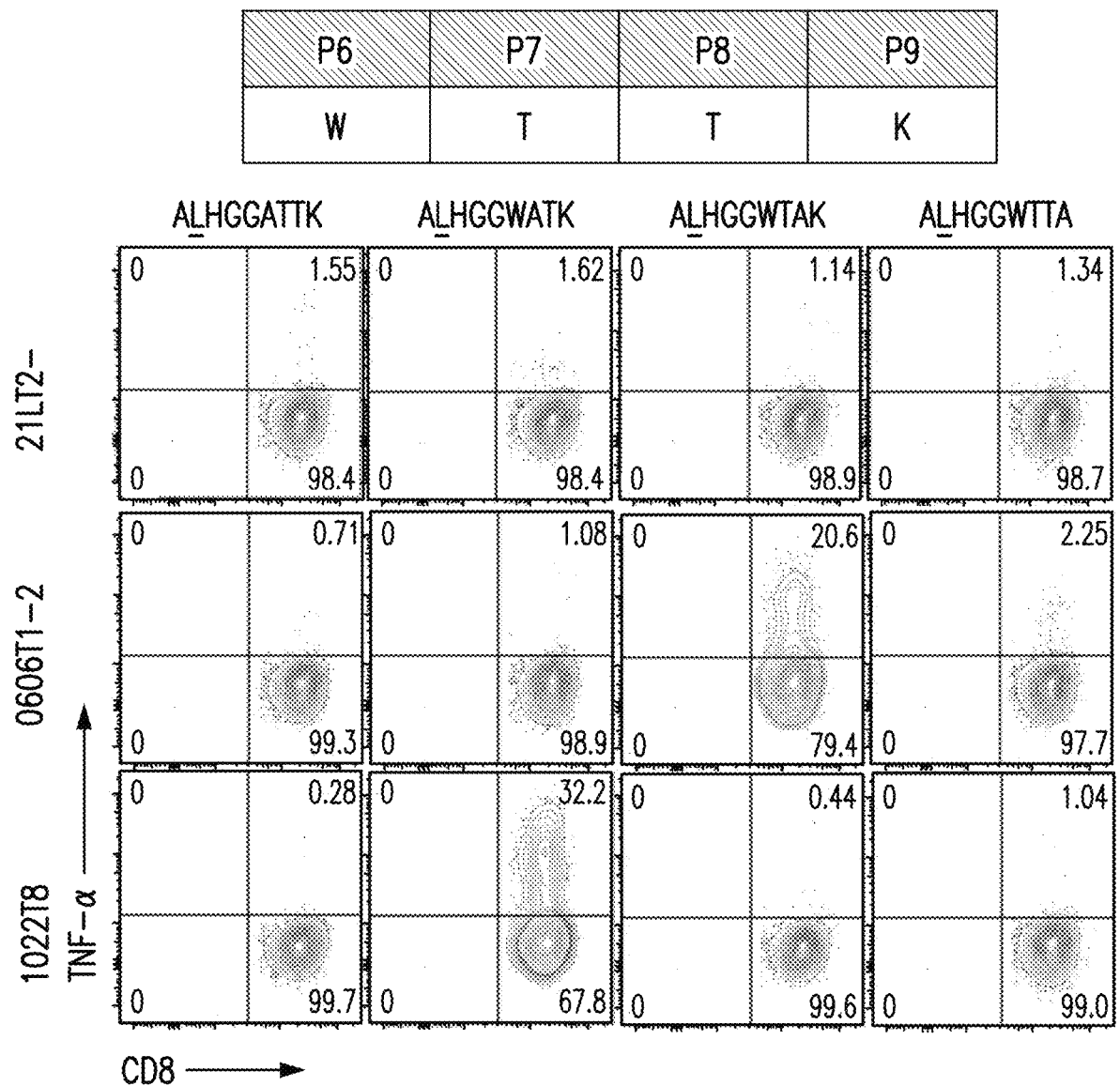
Figure 14C:
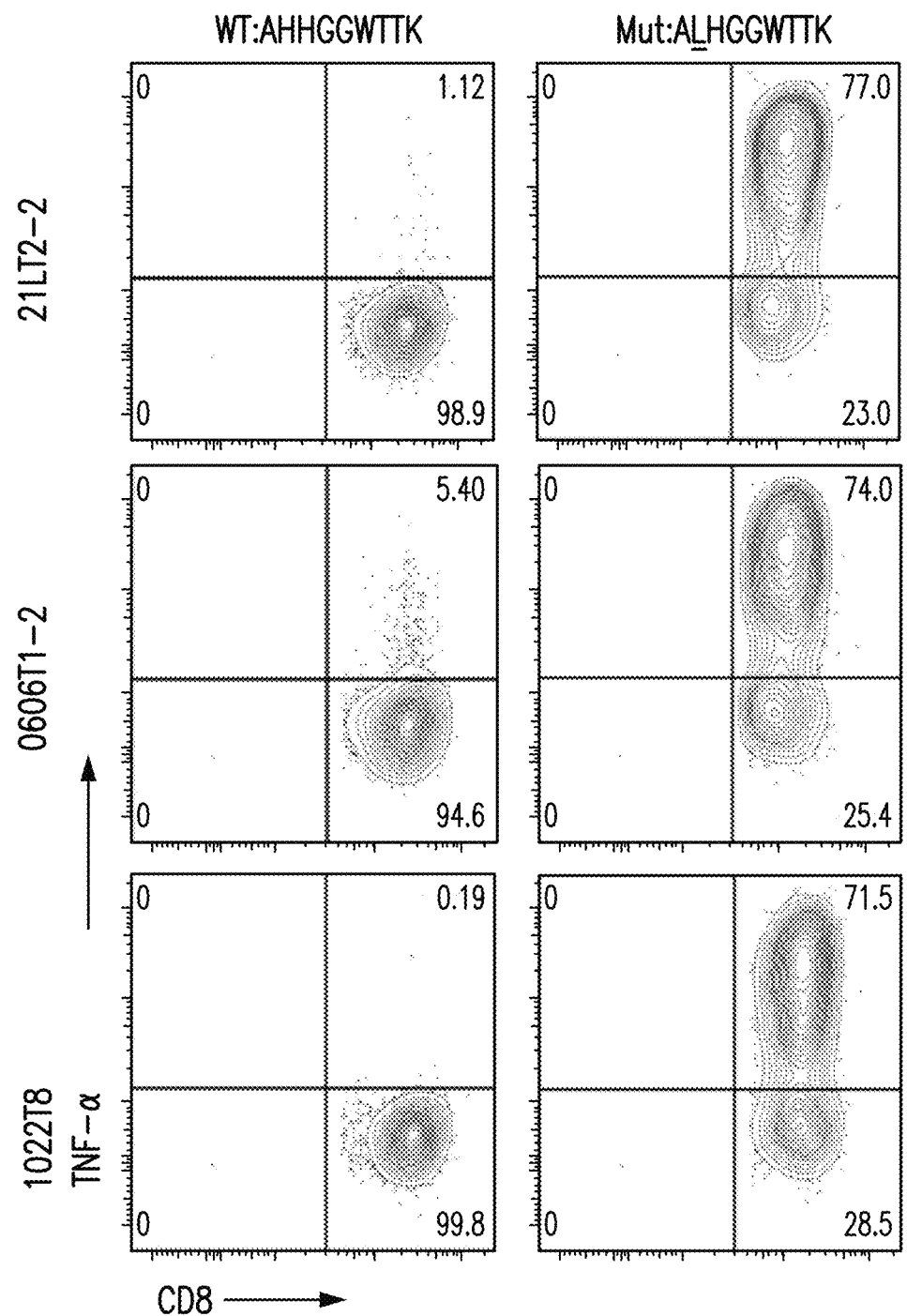

Mutated PIK3CA-specific TCRs were retrovirally integrated into the genome of healthy donor T cells. At day 4-6 post-transduction, T cells were incubated with target cells that express HLA-A*03:01 and were pulsed with alanine-substituted peptides (10 μg/mL). WT and native mutant PIK3CA 9-mer peptides were used as controls to establish the range of reactivity for each individual TCR. Cells have been gated on CD8+TCR+. Loss of >50% recognition when pulsed with an alanine-substituted peptide, as compared to the unmodified 9 amino acid mutated sequence (table; mutation in P2), indicates the importance of the native amino acid at that position for TCR recognition. The results are shown in FIGS. 14A-14C. As shown in FIGS. 14A-14C, for 21LT2-2, with the exception of the glycine residue at position 4, all amino acids in the 9 amino acid sequence appeared to be critical to the pMHC-TCR interaction. In addition, as shown in FIGS. 14A-14C, for 0606T1-2, P2, P3 and P4 substitutions appeared to be permissive to TCR function. Furthermore, as shown in FIGS. 14A-14C, for 1022T8, all positions appeared critical to TCR function, because the alanine substitution at every position results in a >50% loss in function.

Figure 15:
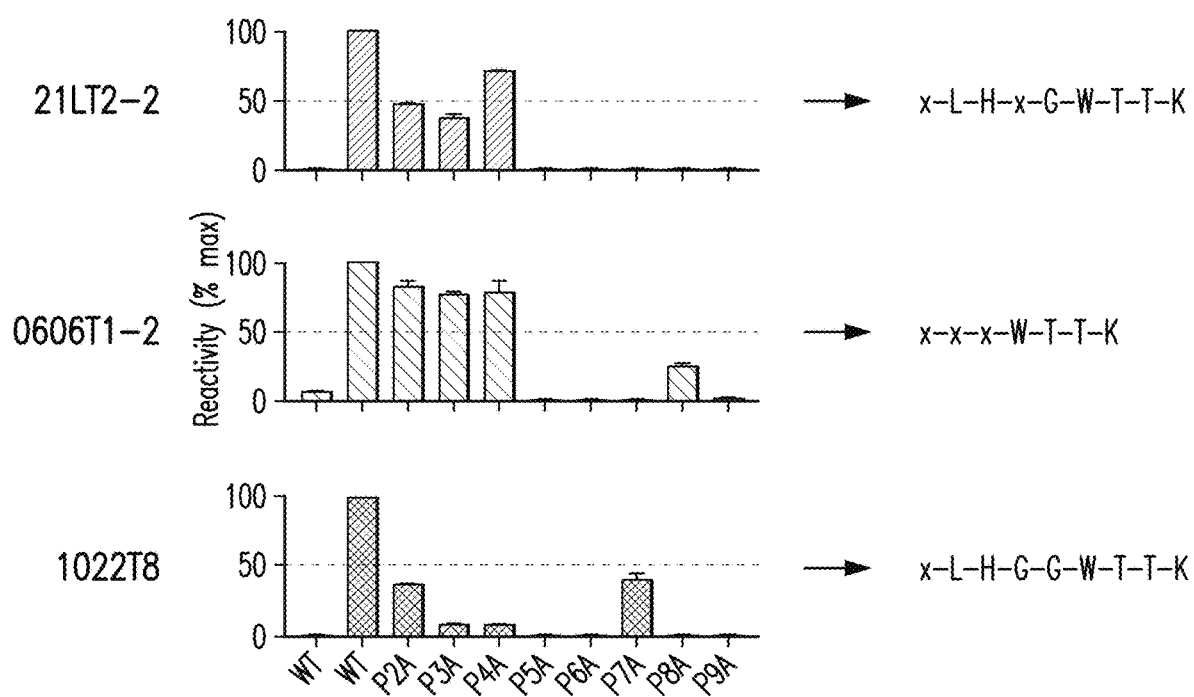
FIG. 15 depicts motifs assigned to establish critical residues for TCR recognition and determining cross-reactivity. Dotted line indicates 50% of maximal reactivity. Based on this, the motifs to determine potential cross-reactivities have been indicated to the right. "x" indicates a non-critical residue for TCR recognition. Position 1 has been assigned an "x" by default since the native amino acid at that position is alanine and is therefore not amenable to this test. XLHXGWTTK is SEQ ID NO: 48; XXXXGWTTK is SEQ ID NO: 49, and XLHGGWTTK is SEQ ID NO: 50.

The inventors derived positional motifs based on loss of TCR reactivity to establish critical residues for TCR recognition and determining cross-reactivity. Data from FIGS. 14A-14C are displayed in graphical format in FIG. 15. Dotted line indicates 50% of maximal reactivity. Based on this, the motifs to determine potential cross-reactivities have been indicated to the right. "x" indicates a non-critical residue for TCR recognition. Position 1 has been assigned an "x" by default since the native amino acid at that position is alanine and is therefore not amenable to this test.

Figure 16B:
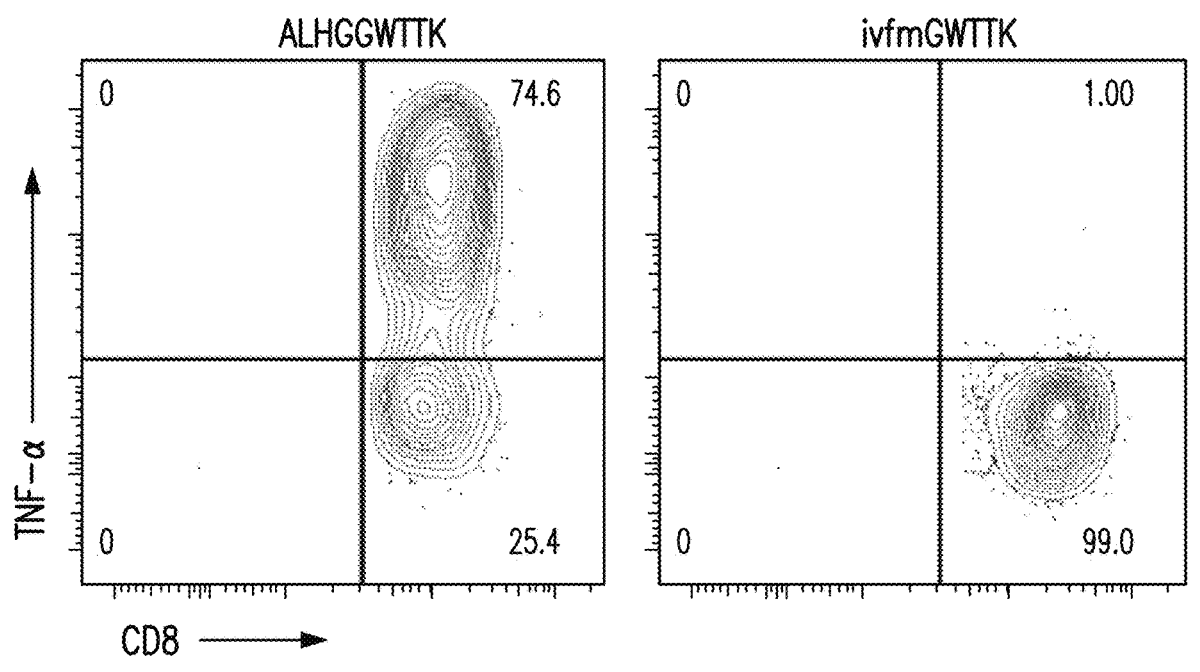

After identifying the critical residues in the minimal peptide sequence, the inventors used the ScanProsite tool to search all UniProtKB/Swiss-Prot (release 2019_03 of 10-Apr-19: 559,634 entries) database sequences for proteins that contain the motif x-L-H-x-G-W-T-T-K [SEQ ID NO: 48] for 21T2-2, x-x-x-x-G-W-T-T-K [SEQ ID NO: 49] for 0606T1-2 and x-L-H-G-G-W-T-T-K [SEQ ID NO: 50] for 1022T8 in the human proteome. See FIG. 16A. No hits matching potential cross-reactive sequences in the human proteome were detected for 21LT2-2 and 1022T8. One hit derived from the transmembrane protein 87B (ivfmGWTTK [SEQ ID NO; 47]) was obtained for 0606T1-2. See FIG. 16B. The inventors synthesized the peptide and pulsed on HLA-A*03:01+ target cells. The native mutant 9-mer peptide (ALHGGWTTK [SEQ ID NO: 11]) was used as a control. There was no recognition of the cross-reactive peptide by the 0606T1-2 TCR.

Figure 17:
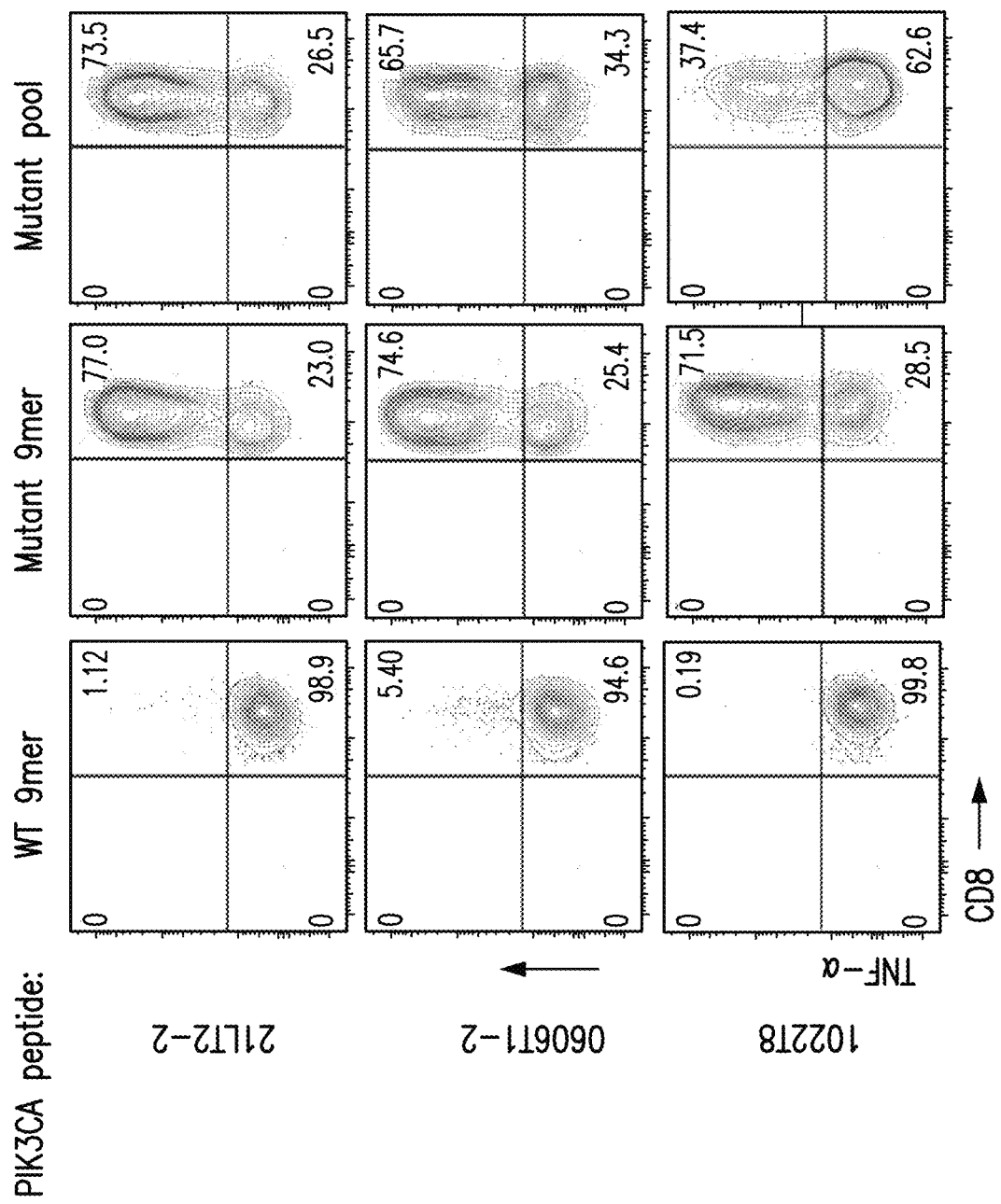
FIG. 17 depicts that PIK3CA-mutant specific TCRs can recognize alternative lengths of the mutated peptide. Mutated PIK3CA-specific TCR were retrovirally integrated into the genome of healthy donor T cells. At day 4-6 post-transduction, T cells were incubated with HLA-A*03:01+ antigen-presenting cells and pulsed with a 8-mer and 10-mer mutated PIK3CA peptide pool (1 ug/mL). WT and 9-mer peptides were used as controls. Cells have been gated on CD8+TCR+ expression. A mutant peptide-specific upregulation in production of TNFα indicates recognition of the alternate peptide lengths. WT 9-mer consists of the amino acid sequence set forth in SEQ ID NO: 46 (AHHGGWTTK). Mutant 9-mer consists of the amino acid sequence set forth in ALHGGWTTK (SEQ ID NO 11). Mutant pool includes a 8-mer peptide consisting of the amino acid sequence set forth in LHGGWTTK (SEQ ID NO: 51), and a 10-mer peptide consisting of the amino acid sequence set forth in DALHGGWTTK (SEQ ID NO: 52).

Furthermore, the inventors studied whether the PIK3CA-mutant specific TCRs can recognize alternative lengths of the mutated peptide. Mutated PIK3CA-specific TCR were retrovirally integrated into the genome of healthy donor T cells. At day 4-6 post-transduction, T cells were incubated with HLA-A*03:01+ antigen-presenting cells and pulsed with a 8-mer and 10-mer mutated PIK3CA peptide pool (1 μg/mL). WT and 9-mer peptides consisting of the amino acid sequence set forth in SEQ ID NO 11 were used as controls. Cells have been gated on CD8+TCR+ expression. A mutant peptide-specific upregulation in production of TNFα indicates recognition of the alternate peptide lengths. The 8-mer mutated PIK3CA peptide consists of the amino acid sequence set forth in LHGGWTTK [SEQ ID NO: 51]. The 10-mer mutated PIK3CA peptide consists of the amino acid sequence set forth in DALHGGWTTK [SEQ ID NO: 52]. The results are shown in FIG. 17. As shown in FIG. 17, all three TCRs can recognize both the 8-mer and 10-mer mutated PIK3CA peptides.

From the foregoing description, it will be apparent that variations and modifications may be made to the invention described herein to adopt it to various usages and conditions. Such embodiments are also within the scope of the following claims.

All patents and publications and sequences referred to by accession or reference number mentioned in this specification are herein incorporated by reference to the same extent as if each independent patent and publication and sequence was specifically and individually indicated to be incorporated by reference.

What is claimed is:

1. A recombinant T cell receptor (TCR) comprising an extracellular domain that specifically targets a PIK3CA peptide comprising a mutation of H1047L, wherein the extracellular domain comprises:
   a) an α chain variable region CDR1 comprising the amino acid sequence set forth in SEQ ID NO: 1; an α chain variable region CDR2 comprising the amino acid sequence set forth in SEQ ID NO: 2; an α chain variable region CDR3 comprising the amino acid sequence set forth in SEQ ID NO:3; a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6; b) an α chain variable region CDR1 comprising the amino acid sequence set forth in SEQ ID NO: 25; an α chain variable region CDR2 comprising the amino acid sequence set forth in SEQ ID NO: 26; an α chain variable region CDR3 comprising the amino acid sequence set forth in SEQ ID NO: 27; a β chain variable region CDR1 comprising the amino acid sequence set forth in SEQ ID NO: 28; a β chain variable region CDR2 comprising the amino acid sequence set forth in SEQ ID NO: 29; and a β chain variable region CDR3 comprising the amino acid sequence set forth in SEQ ID NO: 30; or c) an α chain variable region CDR1 comprising the amino acid sequence set forth in SEQ ID NO: 35; an α chain variable region CDR2 comprising the amino acid sequence set forth in SEQ ID NO: 36; an α chain variable region CDR3 comprising the amino acid sequence set forth in SEQ ID NO: 37; a β chain variable region CDR1 comprising the amino acid sequence set forth in SEQ ID NO: 38; a β chain variable region CDR2 comprising the amino acid sequence set forth in SEQ ID NO: 39; and a β chain variable region CDR3 comprising the amino acid sequence set forth in SEQ ID NO: 40.

2. The TCR of claim 1, wherein the PIK3CA peptide is an 8-mer, 9-mer, or 10-mer.

3. The TCR of claim 1, wherein the PIK3CA peptide comprises an amino acid sequence set forth in SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 51, or SEQ ID NO: 52.

4. The TCR of claim 1, wherein the PIK3CA peptide is associated with an HLA class I complex.

5. The TCR of claim 4, wherein the HLA class I complex is selected from an HLA-A, an HLA-B, and an HLA-C.

6. The TCR of claim 5, wherein the HLA-A is an HLA-A*03 superfamily.

7. The TCR of claim 6, wherein the HLA-A*03 superfamily is selected from the group consisting of HLA-A*03, HLA-A*11, HLA-A*31, HLA-A*33, HLA-A*66, HLA-A*68 and HLA-A*74.

8. The TCR of claim 1, wherein the extracellular domain comprises an α chain variable region CDR1 comprising the amino acid sequence set forth in SEQ ID NO: 1; an α chain variable region CDR2 comprising the amino acid sequence set forth in SEQ ID NO: 2; an α chain variable region CDR3 comprising the amino acid sequence set forth in SEQ ID NO: 3; a β chain variable region CDR1 comprising the amino acid sequence set forth in SEQ ID NO: 4; a β chain variable region CDR2 comprising the amino acid sequence set forth in SEQ ID NO: 5; and a β chain variable region CDR3 comprising the amino acid sequence set forth in SEQ ID NO: 6.

9. The TCR of claim 1, wherein the extracellular domain comprises an α chain variable region comprising the amino acid sequence set forth in SEQ ID NO: 7, SEQ ID NO: 31, or SEQ ID NO: 41.

10. The TCR of claim 9, wherein the extracellular domain comprises an α chain variable region comprising the amino acid sequence set forth in SEQ ID NO: 7.

11. The TCR of claim 1, wherein the extracellular domain comprises a β chain variable region comprising the amino acid sequence set forth in SEQ ID NO: 8, SEQ ID NO: 32, or SEQ ID NO: 42.

12. The TCR of claim 11, wherein the extracellular domain comprises a β chain variable region comprising the amino acid sequence set forth in SEQ ID NO: 8.

13. The TCR of claim 1, wherein the extracellular domain comprises:
   a) an α chain variable region comprising the amino acid sequence set forth in SEQ ID NO: 7, and a β chain variable region comprising the amino acid sequence set forth in SEQ ID NO: 8;
   b) an α chain variable region comprising the amino acid sequence set forth in SEQ ID NO: 31, and a β chain variable region comprising the amino acid sequence set forth in SEQ ID NO: 32;

c) an α chain variable region comprising the amino acid sequence set forth in SEQ ID NO: 41, and a β chain variable region comprising the amino acid sequence set forth in SEQ ID NO: 42.

14. The TCR of claim 13, wherein the extracellular domain comprises an α chain variable region comprising the amino acid sequence set forth in SEQ ID NO: 7, and a β chain variable region comprising the amino acid sequence set forth in SEQ ID NO: 8.

15. The TCR of claim 1, wherein the extracellular domain comprises:
   a) an α chain comprising the amino acid sequence set forth in SEQ ID NO: 9, and a β chain comprising the amino acid sequence set forth in SEQ ID NO: 10;
   b) an α chain comprising the amino acid sequence set forth in SEQ ID NO: 33, and a β chain comprising the amino acid sequence set forth in SEQ ID NO: 34; or
   c) an α chain comprising the amino acid sequence set forth in SEQ ID NO: 43, and a β chain comprising the amino acid sequence set forth in SEQ ID NO: 44.

16. The TCR of claim 15, wherein the extracellular domain comprises an α chain comprising the amino acid sequence set forth in SEQ ID NO: 9, and a β chain comprising the amino acid sequence set forth in SEQ ID NO: 10.

17. The TCR of claim 1, wherein the TCR is expressed from a vector.

18. The TCR of claim 1, wherein the extracellular domain of the TCR does not target a wildtype PIK3CA peptide.

19. The TCR of claim 1, wherein the TCR comprises a modified α-chain constant region and/or a modified β-chain constant region.

20. The TCR of claim 19, wherein the modified α-chain constant region comprises an amino acid sequence that is identical to the amino acid sequence set forth in SEQ ID NO: 20 or SEQ ID NO: 21.

21. The TCR of claim 19, wherein the modified β-chain constant region comprises an amino acid sequence that is identical to the amino acid sequence set forth in SEQ ID NO: 22, SEQ ID NO: 23, or SEQ ID NO: 45.

22. An immunoresponsive cell comprising the recombinant TCR of claim 1.

23. The immunoresponsive cell of claim 22, wherein the TCR is constitutively expressed on the surface of the immunoresponsive cell.

24. The immunoresponsive cell of claim 22, wherein the immunoresponsive cell is selected from the group consisting of a T cell, a Natural Killer (NK) cell, a lymphoid progenitor cell, a T cell-precursor cell, and a pluripotent stem cell.

25. The immunoresponsive cell of claim 24, wherein the immunoresponsive cell is a T cell.

26. The immunoresponsive cell of claim 25, wherein the T cell is selected from the group consisting of a cytotoxic T lymphocyte (CTL), a regulatory T cell, and a central memory T cell.

27. A composition comprising the immunoresponsive cell of claim 22, optionally wherein the composition is a pharmaceutical composition further comprising a pharmaceutically acceptable carrier.

28. A nucleic acid molecule encoding the recombinant TCR of claim 1.

29. A vector comprising the nucleic acid molecule of claim 28.

30. A host cell comprising the nucleic acid molecule of claim 28.

31. A method for producing an immunoresponsive cell that binds to a human mutant PIK3CA peptide, comprising introducing into the immunoresponsive cell the vector of claim 29.

32. A kit for treating and/or preventing a neoplasm comprising a PIK3CA mutation, comprising the immunoresponsive cell of claim 22.

* * * * *